US007495671B2

(12) United States Patent
Chemel et al.

(10) Patent No.: US 7,495,671 B2
(45) Date of Patent: *Feb. 24, 2009

(54) LIGHT SYSTEM MANAGER

(75) Inventors: Brian Chemel, Marblehead, MA (US); John Warwick, Somerville, MA (US); Frederick M. Morgan, Canton, MA (US); Michael K. Blackwell, Milton, MA (US); Kevin McCormick, Cambridge, MA (US); Ihor A. Lys, Milton, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 59 days.

This patent is subject to a terminal disclaimer.

(21) Appl. No.: 11/737,805

(22) Filed: Apr. 20, 2007

(65) Prior Publication Data

US 2007/0189026 A1 Aug. 16, 2007

Related U.S. Application Data

(63) Continuation of application No. 10/995,038, filed on Nov. 22, 2004.

(60) Provisional application No. 60/523,903, filed on Nov. 20, 2003, provisional application No. 60/608,624, filed on Sep. 10, 2004.

(51) Int. Cl.
*G09G 5/02* (2006.01)
*G05B 11/01* (2006.01)
*G06F 3/048* (2006.01)

(52) U.S. Cl. .......................... 345/594; 700/17; 715/764

(58) Field of Classification Search ................. 345/594; 700/17; 709/203-229

See application file for complete search history.

(56) References Cited

U.S. PATENT DOCUMENTS

| | | | |
|---|---|---|---|
| 3,898,643 | A | 8/1975 | Ettlinger |
| 4,918,690 | A | 4/1990 | Markkula, Jr. et al. |
| 4,947,302 | A | 8/1990 | Callahan |
| 4,962,687 | A | 10/1990 | Belliveau et al. |
| 5,307,295 | A | 4/1994 | Taylor et al. |
| 5,334,992 | A | 8/1994 | Rochat et al. |
| 5,406,176 | A | 4/1995 | Sugden |
| 5,519,878 | A | 5/1996 | Dolan, Jr. |
| 5,592,602 | A | 1/1997 | Edmunds et al. |
| 5,621,282 | A | 4/1997 | Haskell |
| 5,629,587 | A | 5/1997 | Gray et al. |
| 5,659,793 | A | 8/1997 | Escobar et al. |

(Continued)

FOREIGN PATENT DOCUMENTS

EP 0 495 305 A2 7/1992

(Continued)

OTHER PUBLICATIONS www.jandsvista.com/features.html, (Nov. 8, 2005).

(Continued)

*Primary Examiner*—Ryan R Yang
(74) *Attorney, Agent, or Firm*—Wolf, Greenfield & Sacks, P.C.

(57) ABSTRACT

Methods and systems are provided for lighting control, including a lighting system manager, a light show composer, a light system engine, and related facilities for the convenient authoring and execution of lighting shows using semiconductor-based illumination units.

24 Claims, 65 Drawing Sheets

U.S. PATENT DOCUMENTS

| | | | |
|---|---|---|---|
| 5,668,537 | A | 9/1997 | Chansky et al. |
| 5,739,823 | A | 4/1998 | Akaza et al. |
| 5,769,527 | A | 6/1998 | Taylor et al. |
| 5,844,532 | A | 12/1998 | Silverbrook et al. |
| 5,889,514 | A | 3/1999 | Boezman et al. |
| 5,945,993 | A | 8/1999 | Fleischman |
| 5,969,485 | A | 10/1999 | Hunt |
| 5,986,414 | A | 11/1999 | Bocchicchio et al. |
| 6,016,038 | A | 1/2000 | Mueller et al. |
| 6,031,343 | A | 2/2000 | Recknagel et al. |
| 6,150,774 | A | 11/2000 | Mueller et al. |
| 6,166,496 | A | 12/2000 | Lys et al. |
| 6,208,073 | B1 | 3/2001 | Wang et al. |
| 6,211,626 | B1 | 4/2001 | Lys et al. |
| 6,292,901 | B1 | 9/2001 | Lys et al. |
| 6,340,868 | B1 | 1/2002 | Lys et al. |
| 6,361,198 | B1 | 3/2002 | Reed |
| 6,374,079 | B1 | 4/2002 | Hsu |
| 6,430,603 | B2 | 8/2002 | Hunter |
| 6,459,919 | B1 | 10/2002 | Lys et al. |
| 6,466,234 | B1 | 10/2002 | Pyle et al. |
| 6,495,964 | B1 | 12/2002 | Muthu et al. |
| 6,528,954 | B1 | 3/2003 | Lys et al. |
| 6,548,967 | B1 | 4/2003 | Dowling et al. |
| 6,577,080 | B2 | 6/2003 | Lys et al. |
| 6,608,453 | B2 | 8/2003 | Morgan et al. |
| 6,624,597 | B2 | 9/2003 | Dowling et al. |
| 6,676,284 | B1 | 1/2004 | Wynne Wilson |
| 6,717,376 | B2 | 4/2004 | Lys et al. |
| 6,720,745 | B2 | 4/2004 | Mueller et al. |
| 6,774,584 | B2 | 8/2004 | Lys et al. |
| 6,777,891 | B2 | 8/2004 | Lys et al. |
| 6,781,329 | B2 | 8/2004 | Morgan et al. |
| 6,788,011 | B2 | 9/2004 | Mueller et al. |
| 6,801,003 | B2 | 10/2004 | Schanberger et al. |
| 6,806,659 | B1 | 10/2004 | Mueller et al. |
| 6,869,204 | B2 | 3/2005 | Morgan et al. |
| 6,883,929 | B2 | 4/2005 | Dowling |
| 6,888,322 | B2 | 5/2005 | Dowling et al. |
| 6,897,624 | B2 | 5/2005 | Ducharme et al. |
| 6,936,978 | B2 | 8/2005 | Morgan et al. |
| 6,965,205 | B2 | 11/2005 | Piepgras et al. |
| 6,967,448 | B2 | 11/2005 | Morgan et al. |
| 6,969,954 | B2 | 11/2005 | Lys |
| 6,975,079 | B2 | 12/2005 | Lys et al. |
| 7,015,825 | B2 | 3/2006 | Callahan |
| 2002/0038157 | A1 | 3/2002 | Dowling et al. |
| 2002/0044066 | A1 | 4/2002 | Dowling et al. |
| 2002/0048169 | A1 | 4/2002 | Dowling et al. |
| 2002/0070688 | A1 | 6/2002 | Dowling et al. |
| 2002/0074559 | A1 | 6/2002 | Dowling et al. |
| 2002/0078221 | A1 | 6/2002 | Blackwell et al. |
| 2002/0130627 | A1 | 9/2002 | Dowling et al. |
| 2002/0145394 | A1 | 10/2002 | Morgan et al. |
| 2002/0145869 | A1 | 10/2002 | Dowling |
| 2002/0152045 | A1 | 10/2002 | Dowling et al. |
| 2002/0158583 | A1 | 10/2002 | Lys et al. |
| 2002/0176259 | A1 | 11/2002 | Ducharme |
| 2003/0011538 | A1 | 1/2003 | Lys et al. |
| 2003/0018609 | A1 | 1/2003 | Phillips et al. |
| 2003/0028260 | A1 | 2/2003 | Blackwell |
| 2003/0057884 | A1 | 3/2003 | Dowling et al. |
| 2003/0057887 | A1 | 3/2003 | Dowling et al. |
| 2003/0076281 | A1 | 4/2003 | Morgan et al. |
| 2003/0100837 | A1 | 5/2003 | Lys et al. |
| 2003/0133292 | A1 | 7/2003 | Mueller et al. |
| 2003/0222587 | A1 | 12/2003 | Dowling et al. |
| 2004/0036006 | A1 | 2/2004 | Dowling |
| 2004/0052076 | A1 | 3/2004 | Mueller et al. |
| 2004/0090191 | A1 | 5/2004 | Mueller et al. |
| 2004/0090787 | A1 | 5/2004 | Dowling et al. |
| 2004/0105261 | A1 | 6/2004 | Ducharme et al. |
| 2004/0113568 | A1 | 6/2004 | Dowling et al. |
| 2004/0116039 | A1 | 6/2004 | Mueller et al. |
| 2004/0130909 | A1 | 7/2004 | Mueller et al. |
| 2004/0178751 | A1 | 9/2004 | Mueller et al. |
| 2004/0212320 | A1 | 10/2004 | Dowling et al. |
| 2004/0212321 | A1 | 10/2004 | Lys et al. |
| 2004/0212993 | A1 | 10/2004 | Morgan et al. |
| 2005/0099824 | A1 | 5/2005 | Dowling et al. |
| 2005/0116667 | A1 | 6/2005 | Mueller et al. |
| 2005/0151489 | A1 | 7/2005 | Lys et al. |
| 2005/0213352 | A1 | 9/2005 | Lys et al. |
| 2005/0213353 | A1 | 9/2005 | Lys |
| 2005/0218838 | A1 | 10/2005 | Lys |
| 2005/0218870 | A1 | 10/2005 | Lys |
| 2005/0219872 | A1 | 10/2005 | Lys |
| 2005/0231133 | A1 | 10/2005 | Lys |
| 2005/0236029 | A1 | 10/2005 | Dowling |
| 2005/0236998 | A1 | 10/2005 | Mueller |
| 2005/0253533 | A1 | 11/2005 | Lys et al. |
| 2005/0275626 | A1 | 12/2005 | Mueller |
| 2005/0276053 | A1 | 12/2005 | Nortrup |
| 2005/0289279 | A1 | 12/2005 | Fails et al. |

FOREIGN PATENT DOCUMENTS

| | | | |
|---|---|---|---|
| EP | 0 752 632 | A2 | 1/1997 |
| FR | 2 628 335 | A1 | 9/1989 |
| JP | 10208886 | | 8/1998 |
| WO | WO 99/31560 | A2 | 6/1999 |
| WO | WO 2004/100613 | A1 | 11/2004 |

OTHER PUBLICATIONS

Congo, The Avab Board by ETC, Datasheet from *Electronic Theatre Controls*, (Jun. 6, 2005).

"A Digital Video Primer," *Adobe* 31 pgs. (Jun. 2000).

Ettlinger et al., "A CBS Computerized Light Control System," *Journal of the SMPTE*, vol. 81, pp. 277-281 (Apr. 1972).

Irving, D.C., "Techniques of Stage and Studio Lighting Control," *Proceedings of the IREE*, pp. 359-364 (Nov. 1975).

Office Action Mailed May 7, 2008 from Co-Pending U.S. Appl. No. 10/995,038.

500

| LIGHT SYSTEM (502) | TIME (504) | POSITION (508) | LIT POSITION (510) | COLOR RANGE (512) | INTENSITY (514) | OTHER SYS. (518) | POSITION (520) |
|---|---|---|---|---|---|---|---|
| LS001 | T1 | (1,3,7) | POLY001 | 0–16000 | 0–100 | | |
| LS001 | T2 | (1,3,7) | POLY001 | 0–16000 | | | |
| LS001 | T3 | (1,3,7) | POLY002 | 0–16000 | | | |
| LS002 | T1 | (0,0,0) | POLY003 | 0–16000 | | | |
| LS002 | T2 | (0,0,0) | POLY004 | 0–16000 | | | |
| LS002 | T3 | (0,0,0) | POLY005 | 0–16000 | | | |
| | | | | | | | |
| | | | | | | | |
| | | | | | | | |
| | | | | | | | |
| LS00N | TN | | | | | | |

FIG. 5

LIGHT SYSTEM MANAGER

CROSS-REFERENCES TO RELATED APPLICATIONS

The present application claims the benefit under 35 U.S.C. §120, as a continuation (CON) of U.S. Non-provisional application Ser. No. 10/995,038, filed Nov. 22, 2004, entitled "Light System Manager."

Ser. No. 10/995,038 in turn claims the benefit under 35 U.S.C. §119(e) of the following U.S. Provisional Applications:

Ser. No. 60/523,903, filed Nov. 20, 2003, entitled "Light System Manager;" and

Ser. No. 60/608,624, filed Sep. 10, 2004, entitled "Light System Manager."

Each of the foregoing applications are incorporated herein by reference.

BACKGROUND

Methods and systems for semiconductor illumination have been provided, such as by Color Kinetics Incorporated of Boston, Mass., as described in documents, patent applications incorporated by reference herein. The existence of processor control enables the creation of illumination effects, such as color changes. When more than one lighting system is provided, coordination effects can also be created, such as having lighting units light in sequence, such as to create a color-chasing rainbow. Creating coordinated lighting effects presents many challenges, particularly in how to create complex effects that involve multiple lighting units in unusual geometries. A need exists for improved systems for creating and deploying lighting shows.

SUMMARY

Provided herein are methods and systems for managing control instructions for a plurality of light systems. The methods and systems may include providing a light system manager for mapping locations of a plurality of light systems. The methods and systems may include providing a light system composer for composing a lighting show. The methods and systems may include providing a light system engine for playing a lighting show on a plurality of light systems.

In embodiments the light system engine is connected to a network. In embodiments shows composed using the light system composer are delivered via the network to the light system engine. In embodiments, methods and systems are provided for providing a mapping facility of the light system manager for mapping locations of a plurality of light systems. In embodiments the mapping facility discovers lighting systems in an environment. In embodiments the mapping facility maps lights in a two-dimensional space. In embodiments the lighting systems are selected from the group consisting of an architectural lighting system, an entertainment lighting system, a restaurant lighting system, a stage lighting system, a theatrical lighting system, a concert lighting system, an arena lighting system, a signage system, a building exterior lighting system, a landscape lighting system, a pool lighting system, a spa lighting system, a transportation lighting system, a marine lighting system, a military lighting system, a stadium lighting system, a motion picture lighting system, photography lighting system, a medical lighting system, a residential lighting system, a studio lighting system, and a television lighting system. In embodiments light systems can be mapped into separate zones, such as separate DMX zones. In embodiments zones are located in different rooms of a building. In embodiments zones are located in the same location within an environment. In embodiments the environment is a stage lighting environment.

Methods and systems are included for providing a grouping facility for grouping light systems, wherein grouped light systems respond as a group to control signals. In embodiments the grouping facility is a directed graph, a drag and drop user interface, a dragging line interface. In embodiments the grouping facility permits grouping of any selected geometry, such as a two-dimensional representation of a three-dimensional space. In embodiments the two-dimensional representation is mapped to light systems in a three-dimensional space. In embodiments the grouping facility groups lights into groups of a predetermined conventional configuration, such as a rectangular, two-dimensional array, a square, a curvilinear configuration, a line, an oval, an oval-shaped array, a circle, a circular array, a triangle, a triangular array, a serial configuration, a helix, or a double helix.

Methods and systems are provided for providing a light system composer for allowing a user to author a lighting show using a graphical user interface. In embodiments, the light system composer includes an effect authoring system for allowing a user to generate a graphical representation of a lighting effect. In embodiments the effect authoring system allows a user to set parameters for a plurality of predefined types of lighting effects. In embodiments the effect authoring system allows a user to create user-defined effects. In embodiments the effect authoring system allows a user to link effects to other effects. In other embodiments the effect authoring system allows a user to set a timing parameter for a lighting effect. In embodiments the effect authoring system allows a user to generate meta effects comprised of more than one lighting effect. In embodiments the light system composer allows the user to generate shows comprised of more than one meta effect. In embodiments, the user can link meta effects. In embodiments the user may assign an effect to a group of light systems. In embodiments the effect is selected from the group consisting of a color chasing rainbow, a cross fade effect, a custom rainbow, a fixed color effect, an animation effect, a fractal effect, a random color effect, a sparkle effect, a streak effect, and a sweep effect. In embodiments the effect is an animation effect and the animation effect corresponds to an animation generated by an animation facility. In embodiments the animation effect is loaded from an animation file, such as a flash animation facility. In embodiments the animation facility is a multimedia animation facility. In embodiments the animation facility is a video animation facility. In embodiments the animation facility is a three-dimensional simulation animation facility. In embodiments the lighting show composer facilitates the creation of meta effects that comprise a plurality of linked effects. In embodiments the lighting show composer generates an XML file containing a lighting show. In embodiments, the lighting show composer includes stored effects that are designed to run on a predetermined configuration of lighting systems. The user can apply a stored effect to a configuration of lighting systems.

In embodiments the lighting system composer includes a graphical simulation of a lighting effect on a lighting configuration. In embodiments, the simulation reflects a parameter set by a user for an effect. The simulation may be an animation window of a graphical user interface.

In embodiments the light show composer allows synchronization of effects between different groups of lighting systems that are grouped using the grouping facility. In embodiments the lighting show composer includes a wizard for adding a predetermined configuration of light systems to a group and for generating effects that are suitable for the predetermined configuration. In embodiments the predetermined configuration is a rectangular array or a string.

Methods and systems are included for providing a light system engine for relaying control signals to a plurality of light systems, wherein the light system engine plays back shows. The light system engine may include a processor, a data facility, an operating system and/or a communication facility. The light system engine may be configured to communicate with a lighting control facility. In embodiments the lighting control facility may be a DALI facility or a DMX facility. In embodiments the lighting control facility operates with a serial communication protocol. In embodiments the lighting control facility is a power/data supply.

In embodiments the light system engine executes lighting shows downloaded from the light system composer. In embodiments shows are delivered as XML files from the lighting show composer to the light system engine. In embodiments shows are delivered to the light system engine over a network, Ethernet facility, wireless facility, Firewire facility, the Internet, or a different facility.

In embodiments, the lighting shows composed by the lighting show composer are combined with other files from another computer system. In embodiments the lighting shows are combined by adding additional elements to an XML file that contains a lighting show. In embodiments the other computer system includes an XML parser for handling XML files. In embodiments the other computer system is selected from the group consisting of a sound system, and entertainment system, a multimedia system, a video system, an audio system, a sound-effect system, a smoke effect system, a vapor effect system, a dry-ice effect system, another lighting system, a security system, an information system, a sensor-feedback system, a sensor system, a browser, a network, a server, a wireless computer system, a building information technology system, and a communication system. In embodiments the other computer system comprises a browser, wherein the user of the browser can edit the XML file using the browser to edit the lighting show generated by the lighting show composer. In embodiments, the light system engine includes a server, wherein the server is capable of receiving data over the Internet.

In embodiments, the light system engine is capable of handling multiple zones of light systems, wherein each zone of light systems has a distinct mapping. In embodiments the multiple zones are synchronized using the internal clock of the light system engine.

Methods and systems are included for providing a user interface for triggering shows downloaded on a light system engine. In embodiments the user interface is a knob, a dial, a button, a touch screen, a serial keypad, a slide mechanism, a switch, a sliding switch, a switch/slide combination, a sensor, a decibel meter, an inclinometer, a thermometer, an anemometer, a barometer, or another item capable of generating a signal. In embodiments the user interface is a serial keypad and wherein initiating a button on the keypad initiates a show in at least one zone of a lighting system governed by a light system engine connected to the keypad.

In embodiments, the light system engine comprises a personal computer with a Linux operating system. In embodiments the light system engine is associated with a bridge to a DMX system or a DALI system.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein.

Definitions used herein are for purposes of illustration and are not intended to be limiting in any way.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication and/or illumination. An "illumination source" is a light source that is particularly configured to generate radiation having a sufficient intensity to effectively illuminate an interior or exterior space.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. The color temperature of white light generally falls within a range of from approximately 700 degrees K (generally considered the first visible to the human eye) to over 10,000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The terms "processor" or "controller" are used herein interchangeably to describe various apparatus relating to the operation of one or more light sources. A processor or controller can be implemented in numerous ways, such as with dedicated hardware, using one or more microprocessors that are programmed using software (e.g., microcode) to perform the various functions discussed herein, or as a combination of dedicated hardware to perform some functions and programmed microprocessors and associated circuitry to perform other functions.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present invention, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The following patents and patent applications are hereby incorporated herein by reference:

U.S. Pat. No. 6,016,038, issued Jan. 18, 2000, entitled "Multicolored LED Lighting Method and Apparatus";

U.S. Pat. No. 6,211,626, issued Apr. 3, 2001 to Lys et al., entitled "Illumination Components";

U.S. Pat. No. 6,608,453, issued Aug. 19, 2003, entitled "Methods and Apparatus for Controlling Devices in a Networked Lighting System";

U.S. Pat. No. 6,548,967, issued Apr. 15, 2003, entitled "Universal Lighting Network Methods and Systems";

U.S. patent application Ser. No. 09/886,958, filed Jun. 21, 2001, entitled Method and Apparatus for Controlling a Lighting System in Response to an Audio Input";

U.S. patent application Ser. No. 10/078,221, filed Feb. 19, 2002, entitled "Systems and Methods for Programming Illumination Devices";

U.S. patent application Ser. No. 09/344,699, filed Jun. 25, 1999, entitled "Method for Software Driven Generation of Multiple Simultaneous High Speed Pulse Width Modulated Signals";

U.S. patent application Ser. No. 09/805,368, filed Mar. 13, 2001, entitled "Light-Emitting Diode Based Products";

U.S. patent application Ser. No. 09/716,819, filed Nov. 20, 2000, entitled "Systems and Methods for Generating and Modulating Illumination Conditions";

U.S. patent application Ser. No. 09/675,419, filed Sep. 29, 2000, entitled "Systems and Methods for Calibrating Light Output by Light-Emitting Diodes";

U.S. patent application Ser. No. 09/870,418, filed May 30, 2001, entitled "A Method and Apparatus for Authoring and Playing Back Lighting Sequences";

U.S. patent application Ser. No. 10/045,629, filed Oct. 25, 2001, entitled "Methods and Apparatus for Controlling Illumination";

U.S. patent application Ser. No. 10/158,579, filed May 30, 2002, entitled "Methods and Apparatus for Controlling Devices in a Networked Lighting System"; U.S. patent application Ser. No. 10/163,085, filed Jun. 5, 2002, entitled "Systems and Methods for Controlling Programmable Lighting Systems";

U.S. patent application Ser. No. 10/325,635, filed Dec. 19, 2002, entitled "Controlled Lighting Methods and Apparatus"; and U.S. patent application Ser. No. 10/360,594, filed Feb. 6, 2003, entitled "Controlled Lighting Methods and Apparatus."

BRIEF DESCRIPTION OF THE DRAWINGS

FIG. 5 illustrates a configuration file for data relating to light systems in an environment.

DETAILED DESCRIPTION

Methods and systems are provided herein for supplying control signals for lighting systems, including methods and systems for authoring effects and shows for lighting systems.

Various embodiments of the present invention are described below, including certain embodiments relating particularly to LED-based light sources. It should be appreciated, however, that the present invention is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Figure 1:
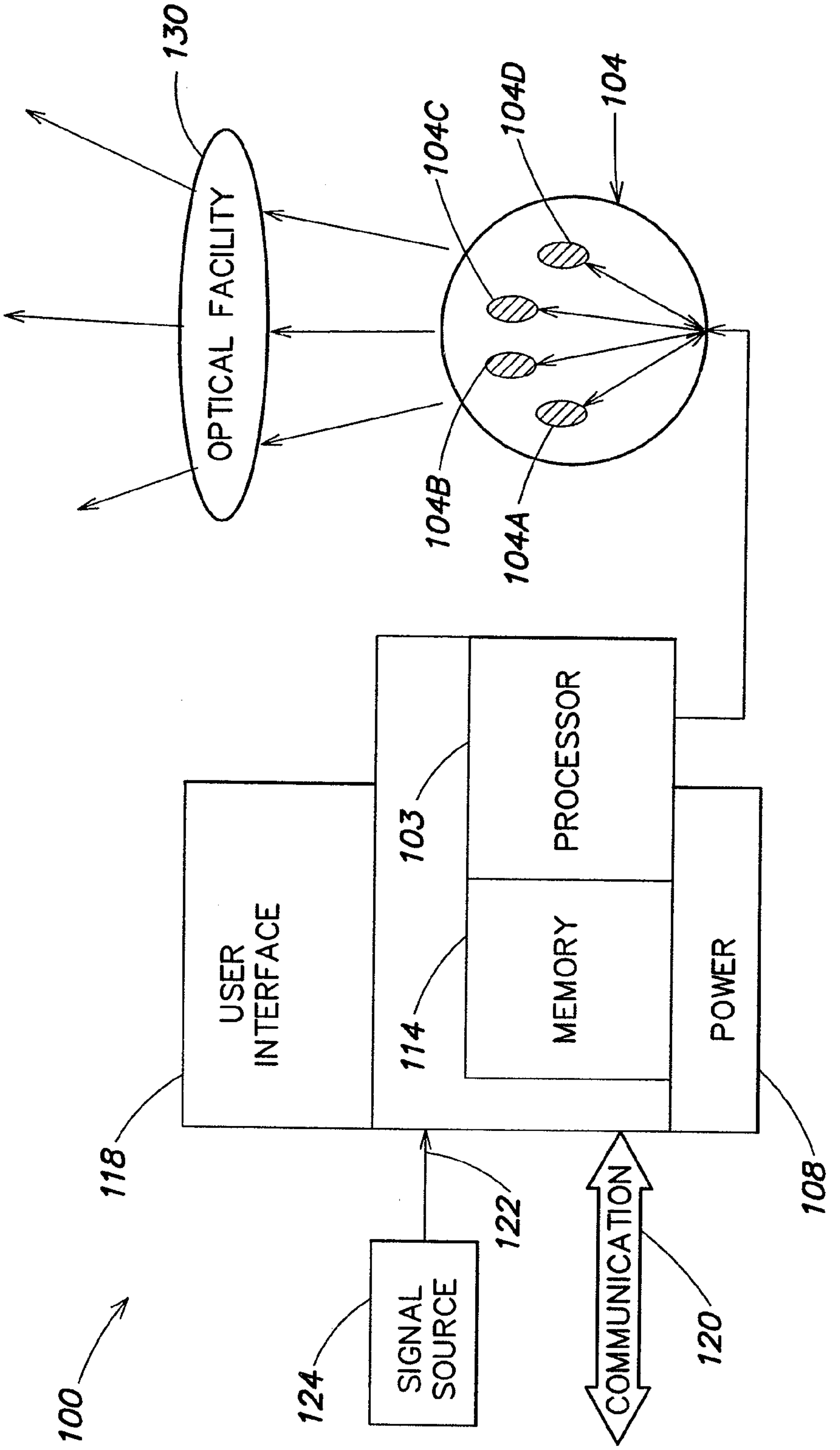
FIG. 1 is a diagram illustrating a lighting unit according to one embodiment of the invention.

FIG. 1 illustrates one example of a lighting unit 100 that may serve as a device in a lighting environment according t one embodiment of the present invention. Some examples of LED-based lighting units similar to those that are described below in connection with FIG. 1 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al., entitled "Illumination Components," which patents are both hereby incorporated herein by reference.

In various embodiments of the present invention, the lighting unit 100 shown in FIG. 1 may be used alone or together with other similar lighting units in a system of lighting units (e.g., as discussed further below in connection with FIG. 2). Used alone or in combination with other lighting units, the lighting unit 100 may be employed in a variety of applications including, but not limited to, interior or exterior space illumination in general, direct or indirect illumination of objects or spaces, theatrical or other entertainment-based/special effects illumination, decorative illumination, safety-oriented illumination, vehicular illumination, illumination of displays and/or merchandise (e.g. for advertising and/or in retail/consumer environments), combined illumination and communication systems, etc., as well as for various indication and informational purposes.

Additionally, one or more lighting units similar to that described in connection with FIG. 1 may be implemented in a variety of products including, but not limited to, various forms of light modules or bulbs having various shapes and electrical/mechanical coupling arrangements (including replacement or "retrofit" modules or bulbs adapted for use in conventional sockets or fixtures), as well as a variety of consumer and/or household products (e.g., night lights, toys, games or game components, entertainment components or systems, utensils, appliances, kitchen aids, cleaning products, etc.).

In one embodiment, the lighting unit 100 shown in FIG. 1 may include one or more light sources 104A, 104B, and 104C (shown collectively as 104), wherein one or more of the light sources may be an LED-based light source that includes one or more light emitting diodes (LEDs). In one aspect of this embodiment, any two or more of the light sources 104A, 104B, and 104C may be adapted to generate radiation of different colors (e.g. red, green, and blue, respectively). Although FIG. 1 shows three light sources 104A, 104B, and 104C, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

As shown in FIG. 1, the lighting unit 100 also may include a processor 102 that is configured to output one or more control signals to drive the light sources 104A, 104B, and 104C so as to generate various intensities of light from the light sources. For example, in one implementation, the processor 102 may be configured to output at least one control signal for each light source so as to independently control the intensity of light generated by each light source. Some examples of control signals that may be generated by the processor to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In one aspect, the processor 102 may control other dedicated circuitry (not shown in FIG. 1) which in turn controls the light sources so as to vary their respective intensities.

In one embodiment of the lighting unit 100, one or more of the light sources 104A, 104B, and 104C shown in FIG. 1 may include a group of multiple LEDs or other types of light sources (e.g., various parallel and/or serial connections of LEDs or other types of light sources) that are controlled together by the processor 102. Additionally, it should be appreciated that one or more of the light sources 104A, 104B, and 104C may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 100.

In another aspect of the lighting unit 100 shown in FIG. 1, the lighting unit 100 may be constructed and arranged to produce a wide range of variable color radiation. For example, the lighting unit 100 may be particularly arranged such that the processor-controlled variable intensity light generated by two or more of the light sources combines to produce a mixed colored light (including essentially white light having a variety of color temperatures). In particular, the color (or color temperature) of the mixed colored light may be varied by varying one or more of the respective intensities of the light sources (e.g., in response to one or more control signals output by the processor 103). Furthermore, the processor 102 may be particularly configured (e.g., programmed) to provide control signals to one or more of the light sources so as to generate a variety of static or time-varying (dynamic) multi-color (or multi-color temperature) lighting effects.

Thus, the lighting unit 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Such combinations of differently colored LEDs in the lighting unit 100 can facilitate accurate reproduction of a host of desirable spectrums of lighting conditions, examples of which includes, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments. Water, for example tends to absorb and attenuate most non-blue and non-green colors of light, so underwater applications may benefit from lighting conditions that are tailored to emphasize or attenuate some spectral elements relative to others.

As shown in FIG. 1, the lighting unit 100 also may include a memory 114 to store various information. For example, the memory 114 may be employed to store one or more lighting programs for execution by the processor 103 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

One issue that may arise in connection with controlling multiple light sources in the lighting unit 100 of FIG. 1, and controlling multiple lighting units 100 in a lighting system (e.g., as discussed below in connection with FIG. 2), relates to potentially perceptible differences in light output between substantially similar light sources. For example, given two virtually identical light sources being driven by respective identical control signals, the actual intensity of light output by each light source may be perceptibly different. Such a difference in light output may be attributed to various factors including, for example, slight manufacturing differences between the light sources, normal wear and tear over time of the light sources that may differently alter the respective spectrums of the generated radiation, etc. For purposes of the present discussion, light sources for which a particular relationship between a control signal and resulting intensity are not known are referred to as "uncalibrated" light sources.

The use of one or more uncalibrated light sources in the lighting unit 100 shown in FIG. 1 may result in generation of light having an unpredictable, or "uncalibrated," color or color temperature. For example, consider a first lighting unit including a first uncalibrated red light source and a first uncalibrated blue light source, each controlled by a corresponding control signal having an adjustable parameter in a range of from zero to 255 (0-255). For purposes of this example, if the red control signal is set to zero, blue light is generated, whereas if the blue control signal is set to zero, red light is generated. However, if both control signals are varied from non-zero values, a variety of perceptibly different colors may be produced (e.g., in this example, at very least, many different shades of purple are possible). In particular, perhaps a particular desired color (e.g., lavender) is given by a red control signal having a value of 125 and a blue control signal having a value of 200.

Now consider a second lighting unit including a second uncalibrated red light source substantially similar to the first uncalibrated red light source of the first lighting unit, and a second uncalibrated blue light source substantially similar to the first uncalibrated blue light source of the first lighting unit. As discussed above, even if both of the uncalibrated red light sources are driven by respective identical control signals, the actual intensity of light output by each red light source may be perceptibly different. Similarly, even if both of the uncalibrated blue light sources are driven by respective identical control signals, the actual intensity of light output by each blue light source may be perceptibly different.

With the foregoing in mind, it should be appreciated that if multiple uncalibrated light sources are used in combination in lighting units to produce a mixed colored light as discussed above, the observed color (or color temperature) of light produced by different lighting units under identical control conditions may be perceivably different. Specifically, consider again the "lavender" example above; the "first lavender" produced by the first lighting unit with a red control signal of 125 and a blue control signal of 200 indeed may be perceptibly different than a "second lavender" produced by the second lighting unit with a red control signal of 125 and a blue control signal of 200. More generally, the first and second lighting units generate uncalibrated colors by virtue of their uncalibrated light sources.

In view of the foregoing, in one embodiment of the present invention, the lighting unit 100 includes calibration means to facilitate the generation of light having a calibrated (e.g., predictable, reproducible) color at any given time. In one aspect, the calibration means is configured to adjust the light output of at least some light sources of the lighting unit so as to compensate for perceptible differences between similar light sources used in different lighting units.

For example, in one embodiment, the processor 103 of the lighting unit 100 is configured to control one or more of the light sources 104A, 104B, and 104C so as to output radiation at a calibrated intensity that substantially corresponds in a predetermined manner to a control signal for the light source (s). As a result of mixing radiation having different spectra and respective calibrated intensities, a calibrated color is produced. In one aspect of this embodiment, at least one calibration value for each light source is stored in the memory 114, and the processor is programmed to apply the respective calibration values to the control signals for the corresponding light sources so as to generate the calibrated intensities.

In one aspect of this embodiment, one or more calibration values may be determined once (e.g., during a lighting unit manufacturing/testing phase) and stored in the memory 114 for use by the processor 103. In another aspect, the processor 103 may be configured to derive one or more calibration values dynamically (e.g. from time to time) with the aid of one or more photosensors, for example. In various embodiments, the photosensor(s) may be one or more external components coupled to the lighting unit, or alternatively may be integrated as part of the lighting unit itself. A photosensor is one example of a signal source that may be integrated or otherwise associated with the lighting unit 100, and monitored by the processor 103 in connection with the operation of the lighting unit. Other examples of such signal sources are discussed further below, in connection with the signal source 124 shown in FIG. 1.

One exemplary method that may be implemented by the processor 103 to derive one or more calibration values includes applying a reference control signal to a light source, and measuring (e.g., via one or more photosensors) an intensity of radiation thus generated by the light source. The processor may be programmed to then make a comparison of the measured intensity and at least one reference value (e.g., representing an intensity that nominally would be expected in response to the reference control signal). Based on such a comparison, the processor may determine one or more calibration values for the light source. In particular, the processor may derive a calibration value such that, when applied to the reference control signal, the light source outputs radiation having an intensity the corresponds to the reference value (i.e., the "expected" intensity).

In various aspects, one calibration value may be derived for an entire range of control signal/output intensities for a given light source. Alternatively, multiple calibration values may be derived for a given light source (i.e., a number of calibration value "samples" may be obtained) that are respectively applied over different control signal/output intensity ranges, to approximate a nonlinear calibration function in a piecewise linear manner.

In another aspect, as also shown in FIG. 1, the lighting unit 100 optionally may include one or more user interfaces 118 that are provided to facilitate any of a number of user-selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

In one implementation, the processor 103 of the lighting unit monitors the user interface 118 and controls one or more of the light sources 104A, 104B, and 104C based at least in part on a user's operation of the interface. For example, the processor 103 may be configured to respond to operation of the user interface by originating one or more control signals for controlling one or more of the light sources. Alternatively, the processor 103 may be configured to respond by selecting one or more pre-programmed control signals stored in memory, modifying control signals generated by executing a lighting program, selecting and executing a new lighting program from memory, or otherwise affecting the radiation generated by one or more of the light sources.

In particular, in one implementation, the user interface 118 may constitute one or more switches (e.g., a standard wall switch) that interrupt power to the processor 103. In one aspect of this implementation, the processor 103 is configured to monitor the power as controlled by the user interface, and in turn control one or more of the light sources 104A, 104B, and 104C based at least in part on a duration of a power interruption caused by operation of the user interface. As discussed above, the processor may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

FIG. 1 also illustrates that the lighting unit 100 may be configured to receive one or more signals 122 from one or more other signal sources 124. In one implementation, the processor 103 of the lighting unit may use the signal(s) 122, either alone or in combination with other control signals (e.g., signals generated by executing a lighting program, one or more outputs from a user interface, etc.), so as to control one or more of the light sources 104A, 104B and 104C in a manner similar to that discussed above in connection with the user interface.

Examples of the signal(s) 122 that may be received and processed by the processor 103 include, but are not limited to, one or more audio signals, video signals, power signals, various types of data signals, signals representing information obtained from a network (e.g., the Internet), signals representing one or more detectable/sensed conditions, signals from lighting units, signals consisting of modulated light, etc. In various implementations, the signal source(s) 124 may be located remotely from the lighting unit 100, or included as a component of the lighting unit. For example, in one embodiment, a signal from one lighting unit 100 could be sent over a network to another lighting unit 100.

Some examples of a signal source 124 that may be employed in, or used in connection with, the lighting unit 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., sensors that are sensitive to one or more particular spectra of electromagnetic radiation), various types of cameras, sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting unit 100, a processor 103, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

In one embodiment, the lighting unit 100 shown in FIG. 1 also may include one or more optical elements 130 to optically process the radiation generated by the light sources 104A, 104B, and 104C. For example, one or more optical elements may be configured so as to change one or both of a spatial distribution and a propagation direction of the generated radiation. In particular, one or more optical elements may be configured to change a diffusion angle of the generated radiation. In one aspect of this embodiment, one or more optical elements 130 may be particularly configured to variably change one or both of a spatial distribution and a propagation direction of the generated radiation (e.g., in response to some electrical and/or mechanical stimulus). Examples of optical elements that may be included in the lighting unit 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation.

As also shown in FIG. 1, the lighting unit 100 may include one or more communication ports 120 to facilitate coupling of the lighting unit 100 to any of a variety of other devices. For example, one or more communication ports 120 may facilitate coupling multiple lighting units together as a networked lighting system, in which at least some of the lighting units are addressable (e.g., have particular identifiers or addresses) and are responsive to particular data transported across the network.

In particular, in a networked lighting system environment, as discussed in greater detail further below (e.g., in connection with FIG. 2), as data is communicated via the network, the processor 103 of each lighting unit coupled to the network may be configured to be responsive to particular data (e.g., lighting control commands) that pertain to it (e.g., in some cases, as dictated by the respective identifiers of the networked lighting units). Once a given processor identifies particular data intended for it, it may read the data and, for example, change the lighting conditions produced by its light sources according to the received data (e.g., by generating appropriate control signals to the light sources). In one aspect, the memory 114 of each lighting unit coupled to the network may be loaded, for example, with a table of lighting control signals that correspond with data the processor 103 receives. Once the processor 103 receives data from the network, the processor may consult the table to select the control signals that correspond to the received data, and control the light sources of the lighting unit accordingly.

In one aspect of this embodiment, the processor 103 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. However, it should be appreciated that lighting units suitable for purposes of the present invention are not limited in this respect, as lighting units according to various embodiments may be configured to be responsive to other types of communication protocols so as to control their respective light sources.

In one embodiment, the lighting unit 100 of FIG. 1 may include and/or be coupled to one or more power sources 108. In various aspects, examples of power source(s) 108 include, but are not limited to, AC power sources, DC power sources, batteries, solar-based power sources, thermoelectric or mechanical-based power sources and the like. Additionally, in one aspect, the power source(s) 108 may include or be associated with one or more power conversion devices that convert power received by an external power source to a form suitable for operation of the lighting unit 100.

While not shown explicitly in FIG. 1, the lighting unit 100 may be implemented in any one of several different structural configurations according to various embodiments of the present invention. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like.

A given lighting unit also may have any one of a variety of mounting arrangements for the light source(s), enclosure/housing arrangements and shapes to partially or fully enclose the light sources, and/or electrical and mechanical connection configurations. In particular, a lighting unit may be configured as a replacement or "retrofit" to engage electrically and mechanically in a conventional socket or fixture arrangement (e.g., an Edison-type screw socket, a halogen fixture arrangement, a fluorescent fixture arrangement, etc.).

Additionally, one or more optical elements as discussed above may be partially or fully integrated with an enclosure/housing arrangement for the lighting unit. Furthermore, a given lighting unit optionally may be associated with (e.g., include, be coupled to and/or packaged together with) various other components (e.g., control circuitry such as the processor and/or memory, one or more sensors/transducers/signal sources, user interfaces, displays, power sources, power conversion devices, etc.) relating to the operation of the light source(s).

Figure 2:
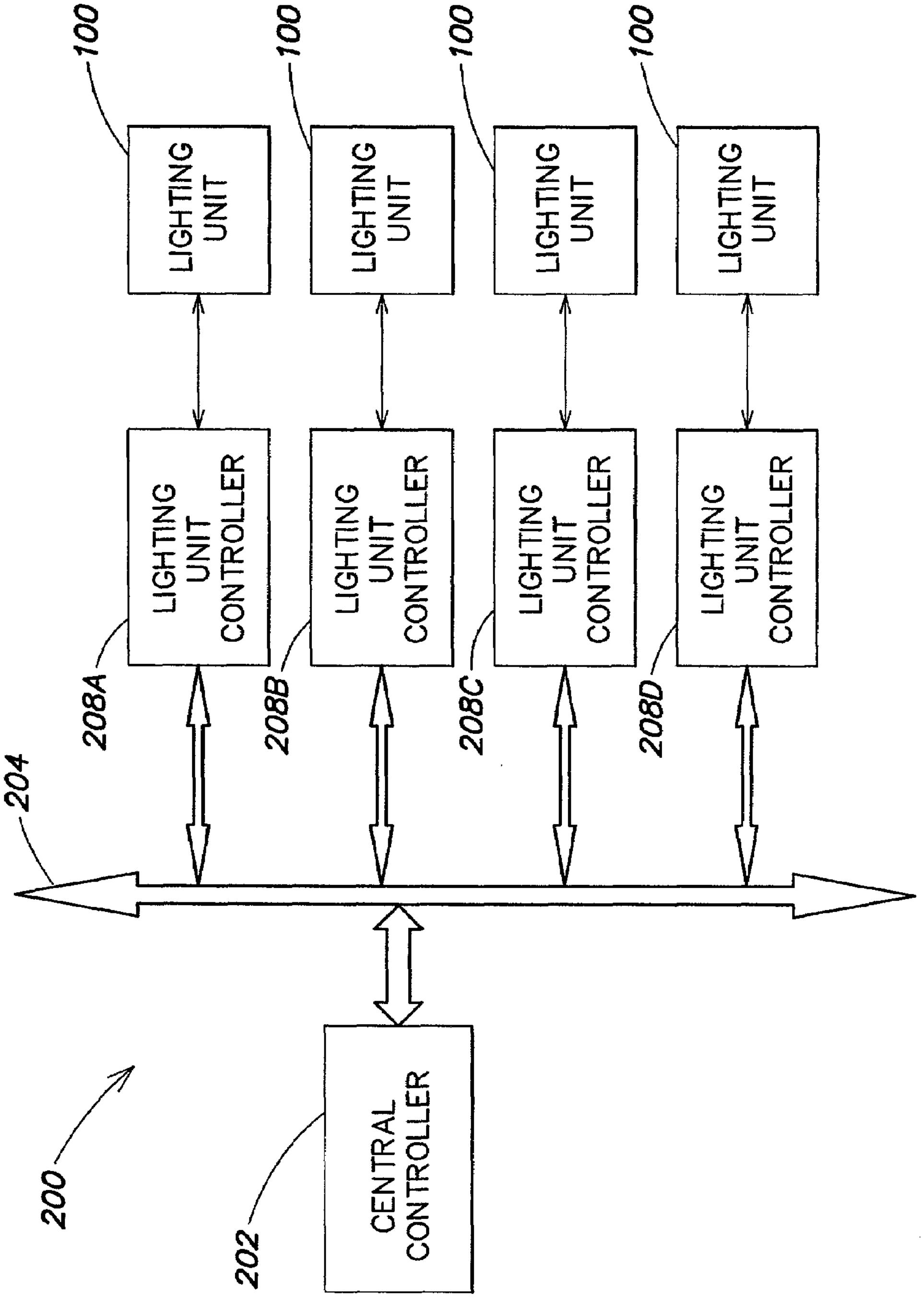
FIG. 2 is a diagram illustrating a networked lighting system according to one embodiment of the invention.

FIG. 2 illustrates an example of a networked lighting system 200 according to one embodiment of the present invention. In the embodiment of FIG. 2, a number of lighting units 100, similar to those discussed above in connection with FIG. 1, are coupled together to form the networked lighting system. It should be appreciated, however, that the particular configuration and arrangement of lighting units shown in FIG. 2 is for purposes of illustration only, and that the invention is not limited to the particular system topology shown in FIG. 2.

Additionally, while not shown explicitly in FIG. 2, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting units of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting units 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

As shown in the embodiment of FIG. 2, the lighting system 200 may include one or more lighting unit controllers (hereinafter "LUCs") 208A, 208B, 208C, and 208D, wherein each LUC is responsible for communicating with and generally controlling one or more lighting units 100 coupled to it. Although FIG. 2 illustrates one lighting unit 100 coupled to each LUC, it should be appreciated that the invention is not limited in this respect, as different numbers of lighting units 100 may be coupled to a given LUC in a variety of different configurations (serially connections, parallel connections, combinations of serial and parallel connections, etc.) using a variety of different communication media and protocols.

In the system of FIG. 2, each LUC in turn may be coupled to a central controller 202 that is configured to communicate with one or more LUCs. Although FIG. 2 shows four LUCs coupled to the central controller 202 via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present invention, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, according to one embodiment of the present invention, the central controller 202 shown in FIG. 2 may by configured to implement Ethernet-based communications with the LUCs, and in turn the LUCs may be configured to implement DMX-based communications with the lighting units 100. In particular, in one aspect of this embodiment, each LUC may be configured as an addressable Ethernet-based controller and accordingly may be identifiable to the central controller 202 via a particular unique address (or a unique group of addresses) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting units coupled to it, for example, via a DMX protocol, based on the Ethernet communications with the central controller 202.

More specifically, according to one embodiment, the LUCs 208A, 208B, and 208C shown in FIG. 2 may be configured to be "intelligent" in that the central controller 202 may be configured to communicate higher level commands to the LUCs that need to be interpreted by the LUCs before lighting control information can be forwarded to the lighting units 100. For example, a lighting system operator may want to generate a color changing effect that varies colors from lighting unit to lighting unit in such a way as to generate the appearance of a propagating rainbow of colors ("rainbow chase"), given a particular placement of lighting units with respect to one another. In this example, the operator may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command so as to generate the appropriate lighting control signals which it then communicates using a DMX protocol via any of a variety of signaling techniques (e.g., PWM) to one or more lighting units that it controls.

It should again be appreciated that the foregoing example of using multiple different communication implementations (e.g., Ethernet/DMX) in a lighting system according to one embodiment of the present invention is for purposes of illustration only, and that the invention is not limited to this particular example.

Figure 3:
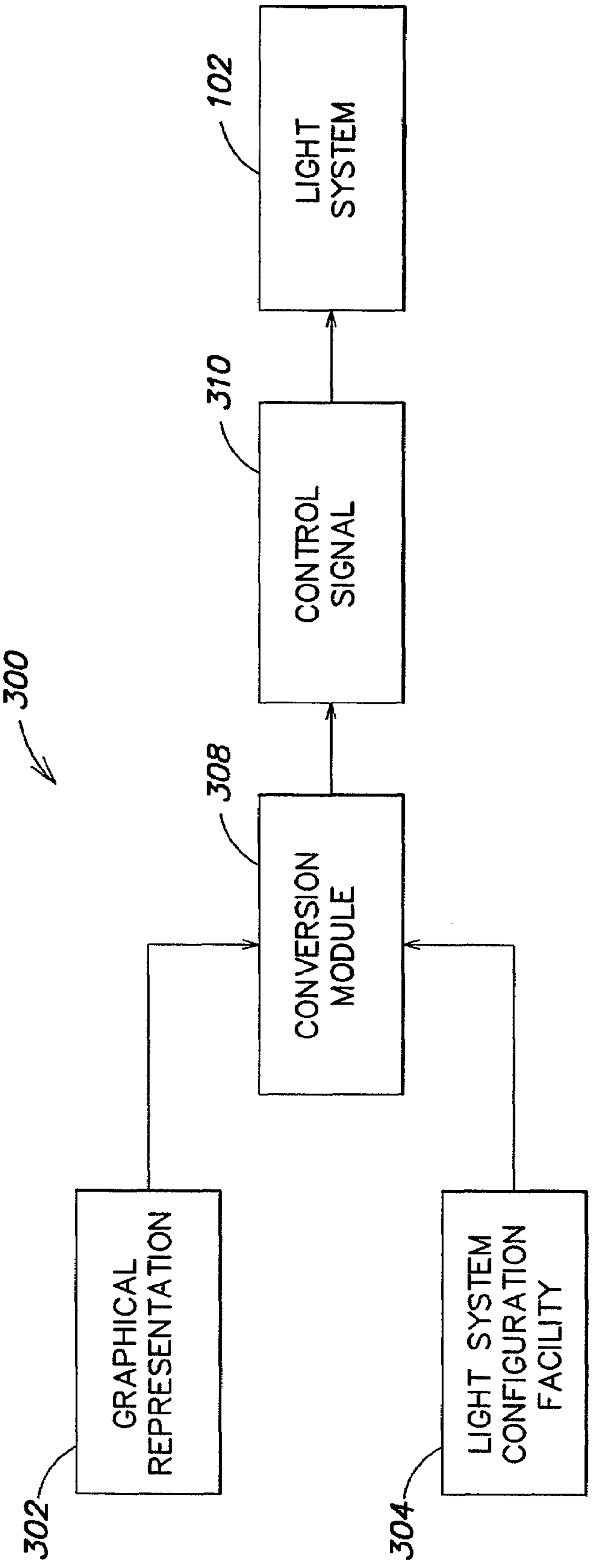
FIG. 3 is a schematic diagram showing elements for generating a lighting control signal using a configuration facility and a graphical representation facility.

An embodiment of the present invention describes a method 300 for generating control signals as illustrated in the block diagram in FIG. 3. The method may involve providing or generating an image or representation of an image, i.e., a graphical representation 302. The graphical representation may be a static image such as a drawing, photograph, generated image, or image that is or appears to be static. The static image may include images displayed on a computer screen or other screen even though the image is continually being refreshed on the screen. The static image may also be a hard copy of an image.

Providing a graphical representation 302 may also involve generating an image or representation of an image. For example, a processor may be used to execute software to generate the graphical representation 302. Again, the image that is generated may be or appear to be static or the image may be dynamic. An example of software used to generate a dynamic image is Flash 5 computer software offered by Macromedia, Incorporated. Flash 5 is a widely used computer program to generate graphics, images and animations. Other useful products used to generate images include, for example, Adobe Illustrator, Adobe Photoshop, and Adobe LiveMotion. There are many other programs that can be used to generate both static and dynamic images. For example, Microsoft Corporation makes a computer program Paint. This software is used to generate images on a screen in a bit map format. Other software programs may be used to generate images in bitmaps, vector coordinates, or other techniques. There are also many programs that render graphics in three dimensions or more. Direct X libraries, from Microsoft Corporation, for example generate images in three-dimensional space. The output of any of the foregoing software programs or similar programs can serve as the graphical representation 302.

In embodiments the graphical representation 302 may be generated using software executed on a processor but the graphical representation 302 may never be displayed on a screen. In an embodiment, an algorithm may generate an image or representation thereof, such as an explosion in a room for example. The explosion function may generate an image and this image may be used to generate control signals as described herein with or without actually displaying the image on a screen. The image may be displayed through a lighting network for example without ever being displayed on a screen.

In an embodiment, generating or representing an image may be accomplished through a program that is executed on a processor. In an embodiment, the purpose of generating the image or representation of the image may be to provide information defined in a space. For example, the generation of an image may define how a lighting effect travels through a room. The lighting effect may represent an explosion, for example. The representation may initiate bright white light in the corner of a room and the light may travel away from this corner of the room at a velocity (with speed and direction) and the color of the light may change as the propagation of the effect continues. An illustration of an environment 100 showing vectors 104 demonstrating the velocity of certain lighting effects is illustrated in FIG. 1. In an embodiment, an image generator may generate a function or algorithm. The function or algorithm may represent an event such as an explosion, lighting strike, headlights, train passing through a room, bullet shot through a room, light moving through a room, sunrise across a room, or other event. The function or algorithm may represent an image such as lights swirling in a room, balls of light bouncing in a room, sounds bouncing in a room, or other images. The function or algorithm may also represent randomly generated effects or other effects.

Referring again to FIG. 3, a light system configuration facility 304 may accomplish further steps for the methods and systems described herein. The light system configuration facility may generate a system configuration file, configuration data or other configuration information for a lighting system, such as the one depicted in connection with FIG. 1.

The light system configuration facility can represent or correlate a system, such as a light system 102, sound system or other system as described herein with a position or positions in the environment 100. For example, an LED light system 102 may be correlated with a position within a room. In an embodiment, the location of a lighted surface 107 may also be determined for inclusion into the configuration file. The position of the lighted surface may also be associated with a light system 102. In embodiments, the lighted surface 107 may be the desired parameter while the light system 102 that generates the light to illuminate the surface is also important. Lighting control signals may be communicated to a light system 102 when a surface is scheduled to be lit by the light system 102. For example, control signals may be communicated to a lighting system when a generated image calls for a particular section of a room to change in hue, saturation or brightness. In this situation, the control signals may be used to control the lighting system such that the lighted surface 107 is illuminated at the proper time. The lighted surface 107 may be located on a wall but the light system 102 designed to project light onto the surface 107 may be located on the ceiling. The configuration information could be arranged to initiate the light system 102 to activate or change when the surface 107 is to be lit.

Referring still to FIG. 3, the graphical representation 302 and the configuration information from the light system configuration facility 304 can be delivered to a conversion module 308, which associates position information from the configuration facility with information from the graphical representation and converts the information into a control signal, such as a control signal 310 for a light system 102. Then the conversion module can communicate the control signal, such as to the light system 102. In embodiments the conversion module maps positions in the graphical representation to positions of light systems 102 in the environment, as stored in a configuration file for the environment (as described below). The mapping might be a one-to-one mapping of pixels or groups of pixels in the graphical representation to light systems 102 or groups of light systems 102 in the environment 100. It could be a mapping of pixels in the graphical representation to surfaces 107, polygons, or objects in the environment that are lit by light systems 102. It could be a mapping of vector coordinate information, a wave function, or algorithm to positions of light systems 102. Many different mapping relations can be envisioned and are encompassed herein.

Figure 4:
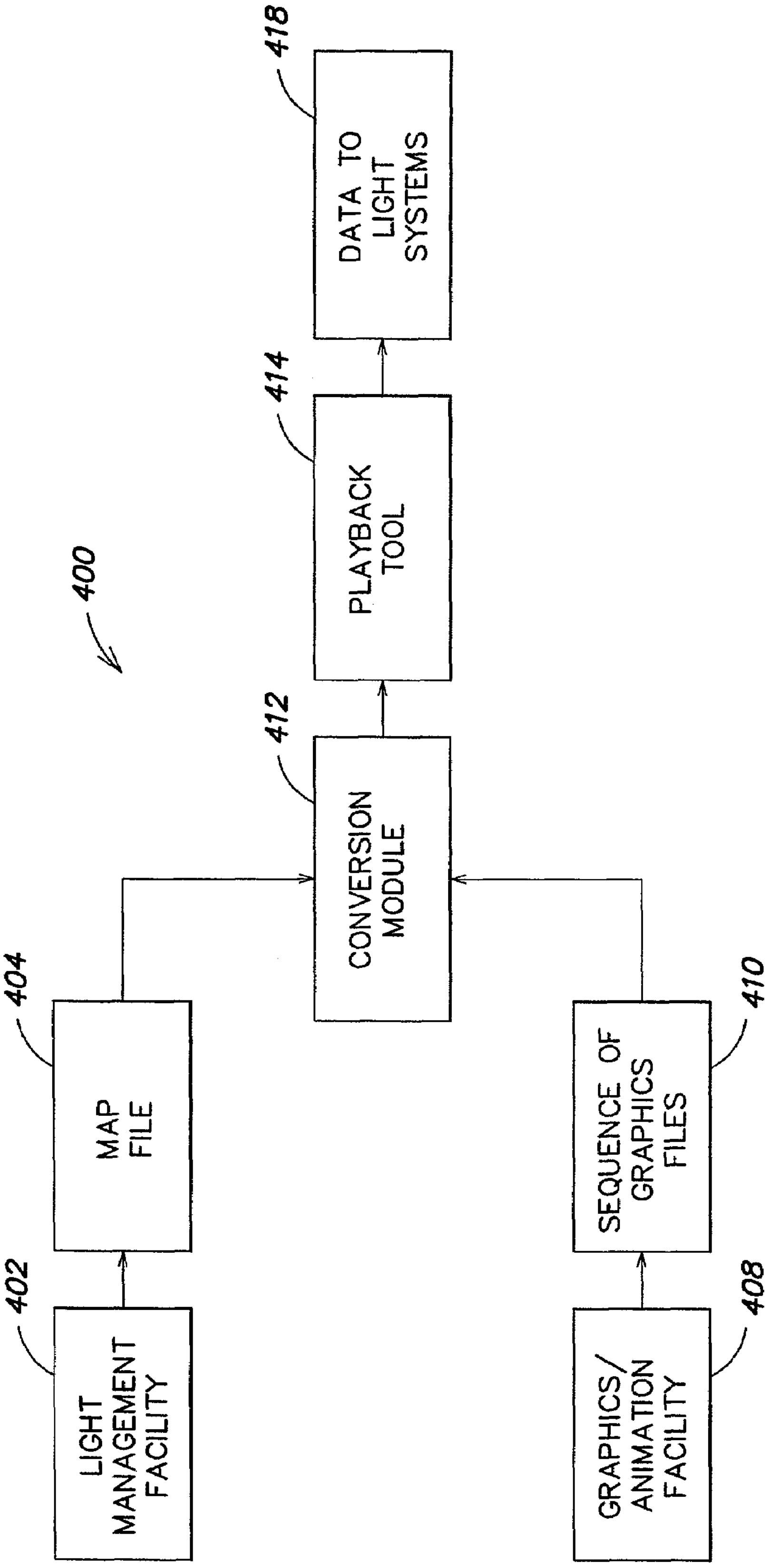
FIG. 4 is a schematic diagram showing elements for generating a lighting control signal from an animation facility and light management facility.

Referring to FIG. 4, another embodiment of a block diagram for a method and system for generating a control signal is depicted. A light management facility 402 is used to generate a map file 404 that maps light systems 102 to positions in an environment, to surfaces that are lit by the light systems, and the like. An animation facility 408 generates a sequence of graphics files 410 for an animation effect. A conversion module 412 relates the information in the map file 404 for the light systems 102 to the graphical information in the graphics files. For example, color information in the graphics file may be used to convert to a color control signal for a light system to generate a similar color. Pixel information for the graphics file may be converted to address information for light systems which will correspond to the pixels in question. In embodiments, the conversion module 412 includes a lookup table for converting particular graphics file information into particular lighting control signals, based on the content of a configuration file for the lighting system and conversion algorithms appropriate for the animation facility in question. The converted information can be sent to a playback tool 414, which may in turn play the animation and deliver control signals 418 to light systems 102 in an environment.

Referring to FIG. 5, an embodiment of a configuration file 500 is depicted, showing certain elements of configuration information that can be stored for a light system 102 or other system. Thus, the configuration file 500 can store an identifier 502 for each light system 102, as well as the position 508 of that light system in a desired coordinate or mapping system for the environment 100 (which may be (x,y,z) coordinates, polar coordinates, (x,y) coordinates, or the like). The position 508 and other information may be time-dependent, so the configuration file 500 can include an element of time 504. The configuration file 500 can also store information about the position 510 that is lit by the light system 102. That information can consist of a set of coordinates, or it may be an identified surface, polygon, object, or other item in the environment. The configuration file 500 can also store information about the available degrees of freedom for use of the light system 102, such as available colors in a color range 512, available intensities in an intensity range 514, or the like. The configuration file 500 can also include information about other systems 518 in the environment that are controlled by the control systems disclosed herein, information about the characteristics of surfaces 107 in the environment, and the like. Thus, the configuration file 500 can map a set of light systems 102 to the conditions that they are capable of generating in an environment 100.

Figure 6:
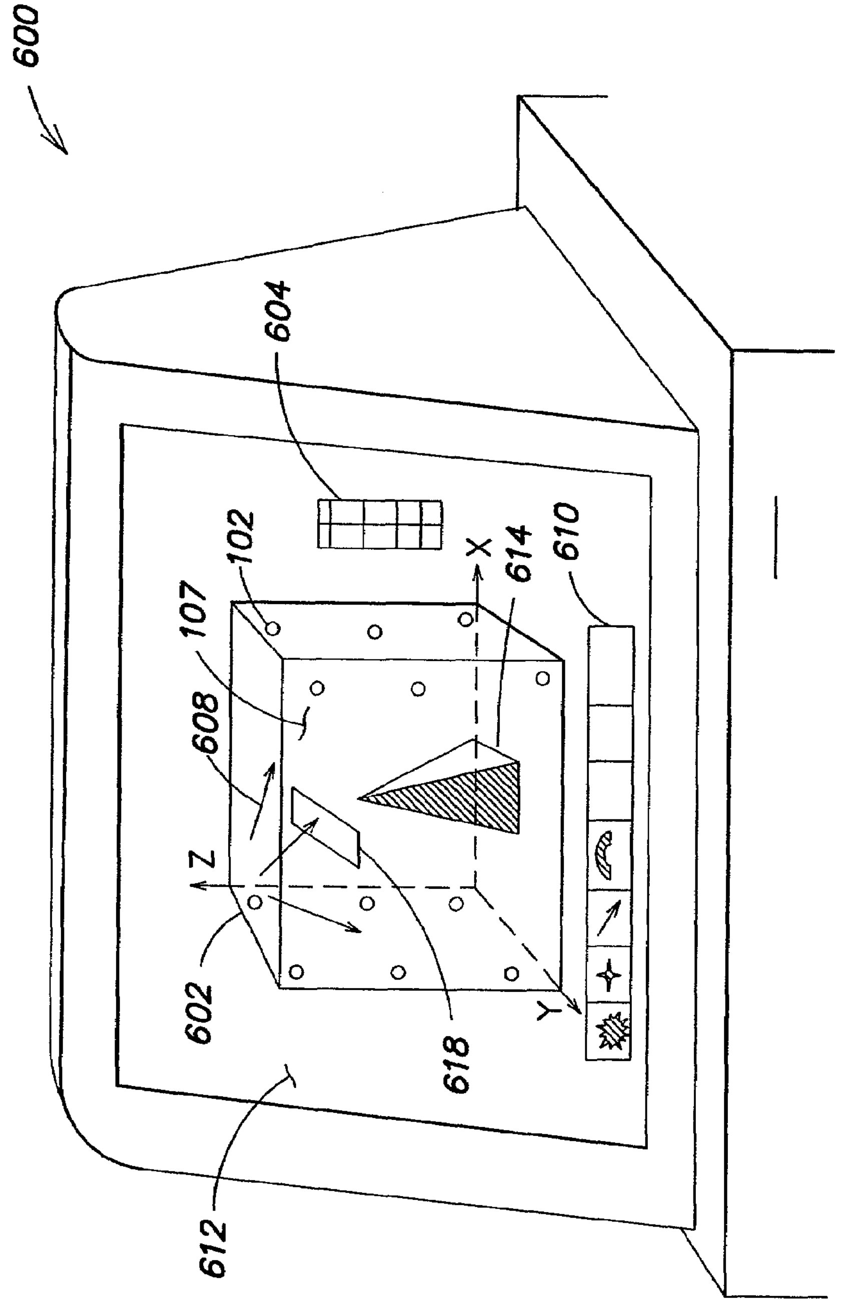
FIG. 6 illustrates a virtual representation of an environment using a computer screen.

In an embodiment, configuration information such as the configuration file 500 may be generated using a program executed on a processor. Referring to FIG. 6, the program may run on a computer 600 with a graphical user interface 612 where a representation of an environment 602 can be displayed, showing light systems 102, lit surfaces 107 or other elements in a graphical format. The interface may include a representation 602 of a room for example. Representations of lights, lighted surfaces or other systems may then be presented in the interface 612 and locations can be assigned to the system. In an embodiment, position coordinates or a position map may represent a system, such as a light system. A position map may also be generated for the representation of a lighted surface for example. FIG. 6 illustrates a room with light systems 102.

The representation 602 can also be used to simplify generation of effects. For example, a set of stored effects can be represented by icons 610 on the screen 612. An explosion icon can be selected with a cursor or mouse, which may prompt the user to click on a starting and ending point for the explosion in the coordinate system. By locating a vector in the representation, the user can cause an explosion to be initiated in the upper corner of the room 602 and a wave of light and or sound may propagate through the environment. With all of the light systems 102 in predetermined positions, as identified in the configuration file 500, the representation of the explosion can be played in the room by the light system and or another system such as a sound system.

In use, a control system such as used herein can be used to provide information to a user or programmer from the light systems 102 in response to or in coordination with the information being provided to the user of the computer 600. One example of how this can be provided is in conjunction with the user generating a computer animation on the computer 600. The light system 102 may be used to create one or more light effects in response to displays 612 on the computer 600. The lighting effects, or illumination effects, can produce a vast variety of effects including color-changing effects; stroboscopic effects; flashing effects; coordinated lighting effects; lighting effects coordinated with other media such as video or audio; color wash where the color changes in hue, saturation or intensity over a period of time; creating an ambient color; color fading; effects that simulate movement such as a color chasing rainbow, a flare streaking across a room, a sun rising, a plume from an explosion, other moving effects; and many other effects. The effects that can be generated are nearly limitless. Light and color continually surround the user, and controlling or changing the illumination or color in a space can change emotions, create atmosphere, provide enhancement of a material or object, or create other pleasing and or useful effects. The user of the computer 600 can observe the effects while modifying them on the display 612, thus enabling a feedback loop that allows the user to conveniently modify effects.

Figure 7:
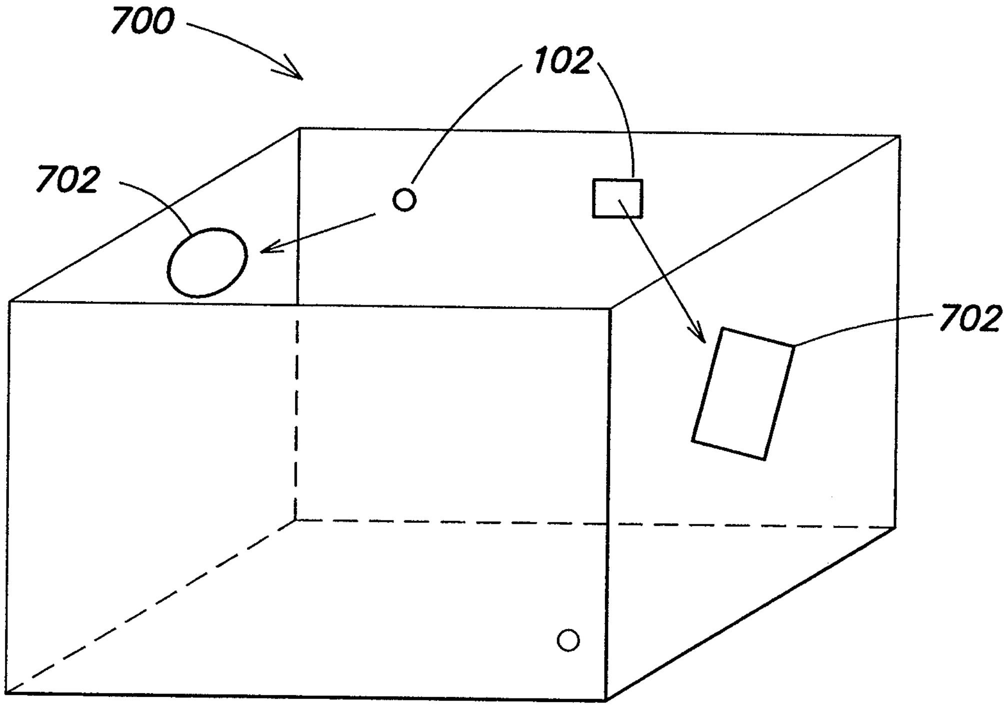
FIG. 7 is a representation of an environment with light systems that project light onto portions of the environment.

FIG. 7 illustrates how the light from a given light system 102 may be displayed on a surface. A light system 102, sound system, or other system may project onto a surface. In the case of a light system 102, this may be an area 702 that is illuminated by the light system 102. The light system 102, or other system, may also move, so the area 702 may move as well. In the case of a sound system, this may be the area where the user desires the sound to emanate from.

In an embodiment, the information generated to form the image or representation may be communicated to a light system 102 or plurality of light systems 102. The information may be sent to lighting systems as generated in a configuration file. For example, the image may represent an explosion that begins in the upper right hand corner of a room and the explosion may propagate through the room. As the image propagates through its calculated space, control signals can be communicated to lighting systems in the corresponding space. The communication signal may cause the lighting system to generate light of a given hue, saturation and intensity when the image is passing through the lighted space the lighting systems projects onto. An embodiment of the invention projects the image through a lighting system. The image may also be projected through a computer screen or other screen or projection device. In an embodiment, a screen may be used to visualize the image prior or during the playback of the image on a lighting system. In an embodiment, sound or other effects may be correlated with the lighting effects. For example, the peak intensity of a light wave propagating through a space may be just ahead of a sound wave. As a result, the light wave may pass through a room followed by a sound wave. The light wave may be played back on a lighting system and the sound wave may be played back on a sound system. This coordination can create effects that appear to be passing through a room or they can create various other effects.

Referring to FIG. 6, an effect can propagate through a virtual environment that is represented in 3D on the display screen 612 of the computer 600. In embodiments, the effect can be modeled as a vector or plane moving through space over time. Thus, all light systems 102 that are located on the plane of the effect in the real world environment can be controlled to generate a certain type of illumination when the effect plane propagates through the light system plane. This can be modeled in the virtual environment of the display screen, so that a developer can drag a plane through a series of positions that vary over time. For example, an effect plane 618 can move with the vector 608 through the virtual environment. When the effect plan 618 reaches a polygon 614, the polygon can be highlighted in a color selected from the color palette 604. A light system 102 positioned on a real world object that corresponds to the polygon can then illuminate in the same color in the real world environment. Of course, the polygon could be any configuration of light systems on any object, plane, surface, wall, or the like, so the range of 3D effects that can be created is unlimited.

In an embodiment, the image information may be communicated from a central controller. The information may be altered before a lighting system responds to the information. For example, the image information may be directed to a position within a position map. All of the information directed at a position map may be collected prior to sending the information to a lighting system. This may be accomplished every time the image is refreshed or every time this section of the image is refreshed or at other times. In an embodiment, an algorithm may be performed on information that is collected. The algorithm may average the information, calculate and select the maximum information, calculate and select the minimum information, calculate and select the first quartile of the information, calculate and select the third quartile of the information, calculate and select the most used information calculate and select the integral of the information or perform another calculation on the information. This step may be completed to level the effect of the lighting system in response to information received. For example, the information in one refresh cycle may change the information in the map several times and the effect may be viewed best when the projected light takes on one value in a given refresh cycle.

In an embodiment, the information communicated to a lighting system may be altered before a lighting system responds to the information. The information format may change prior to the communication for example. The information may be communicated from a computer through a USB port or other communication port and the format of the information may be changed to a lighting protocol such as DMX when the information is communicated to the lighting system. In an embodiment, the information or control signals may be communicated to a lighting system or other system through a communications port of a computer, portable computer, notebook computer, personal digital assistant or other system. The information or control signals may also be stored in memory, electronic or otherwise, to be retrieved at a later time. Systems such the iplayer and SmartJack systems manufactured and sold by Color Kinetics Incorporated can be used to communicate and or store lighting control signals.

In an embodiment, several systems may be associated with position maps and the several systems may a share position map or the systems may reside in independent position areas. For example, the position of a lighted surface from a first lighting system may intersect with a lighted surface from a second lighting system. The two systems may still respond to information communicated to the either of the lighting systems. In an embodiment, the interaction of two lighting systems may also be controlled. An algorithm, function or other technique may be used to change the lighting effects of one or more of the lighting systems in a interactive space. For example, if the interactive space is greater than half of the non-interactive space from a lighting system, the lighting system's hue, saturation or brightness may be modified to compensate the interactive area. This may be used to adjust the overall appearance of the interactive area or an adjacent area for example.

Control signals generated using methods and or systems according to the principles of the present invention can be used to produce a vast variety of effects. Imagine a fire or explosion effect that one wishes to have move across a wall or room. It starts at one end of the room as a white flash that quickly moves out followed by a high brightness yellow wave whose intensity varies as it moves through the room. When generating a control signal according to the principles of the present invention, a lighting designer does not have to be concerned with the lights in the room and the timing and generation of each light system's lighting effects. Rather the designer only needs to be concerned with the relative position or actual position of those lights in the room. The designer can lay out the lighting in a room and then associate the lights in the room with graphical information, such as pixel information, as described above. The designer can program the fire or explosion effect on a computer, using Flash 5 for example, and the information can be communicated to the light systems 102 in an environment. The position of the lights in the environment may be considered as well as the surfaces 107 or areas 702 that are going to be lit.

In an embodiment, the lighting effects could also be coupled to sound that will add to and reinforce the lighting effects. An example is a 'red alert' sequence where a 'whoop whoop' siren-like effect is coupled with the entire room pulsing red in concert with the sound. One stimulus reinforces the other. Sounds and movement of an earthquake using low frequency sound and flickering lights is another example of coordinating these effects. Movement of light and sound can be used to indicate direction.

In an embodiment the lights are represented in a two-dimensional or plan view. This allows representation of the lights in a plane where the lights can be associated with various pixels. Standard computer graphics techniques can then be used for effects. Animation tweening and even standard tools may be used to create lighting effects. Macromedia Flash works with relatively low-resolution graphics for creating animations on the web. Flash uses simple vector graphics to easily create animations. The vector representation is efficient for streaming applications such as on the World Wide Web for sending animations over the net. The same technology can be used to create animations that can be used to derive lighting commands by mapping the pixel information or vector information to vectors or pixels that correspond to positions of light systems 102 within a coordinate system for an environment 100.

For example, an animation window of a computer 600 can represent a room or other environment of the lights. Pixels in that window can correspond to lights within the room or a low-resolution averaged image can be created from the higher resolution image. In this way lights in the room can be activated when a corresponding pixel or neighborhood of pixels turn on. Because LED-based lighting technology can create any color on demand using digital control information, see U.S. Pat. Nos. 6,016,038, 6,150,774, and 6,166,496, the lights can faithfully recreate the colors in the original image.

Some examples of effects that could be generated using systems and methods according to the principles of the invention include, but are not limited to, explosions, colors, underwater effects, turbulence, color variation, fire, missiles, chases, rotation of a room, shape motion, tinkerbell-like shapes, lights moving in a room, and many others. Any of the effects can be specified with parameters, such as frequencies, wavelengths, wave widths, peak-to-peak measurements, velocities, inertia, friction, speed, width, spin, vectors, and the like. Any of these can be coupled with other effects, such as sound.

In computer graphics, anti-aliasing is a technique for removing staircase effects in imagery where edges are drawn and resolution is limited. This effect can be seen on television when a narrow striped pattern is shown. The edges appear to crawl like ants as the lines approach the horizontal. In a similar fashion, the lighting can be controlled in such a way as to provide a smoother transition during effect motion. The effect parameters such as wave width, amplitude, phase or frequency can be modified to provide better effects.

Figure 8:
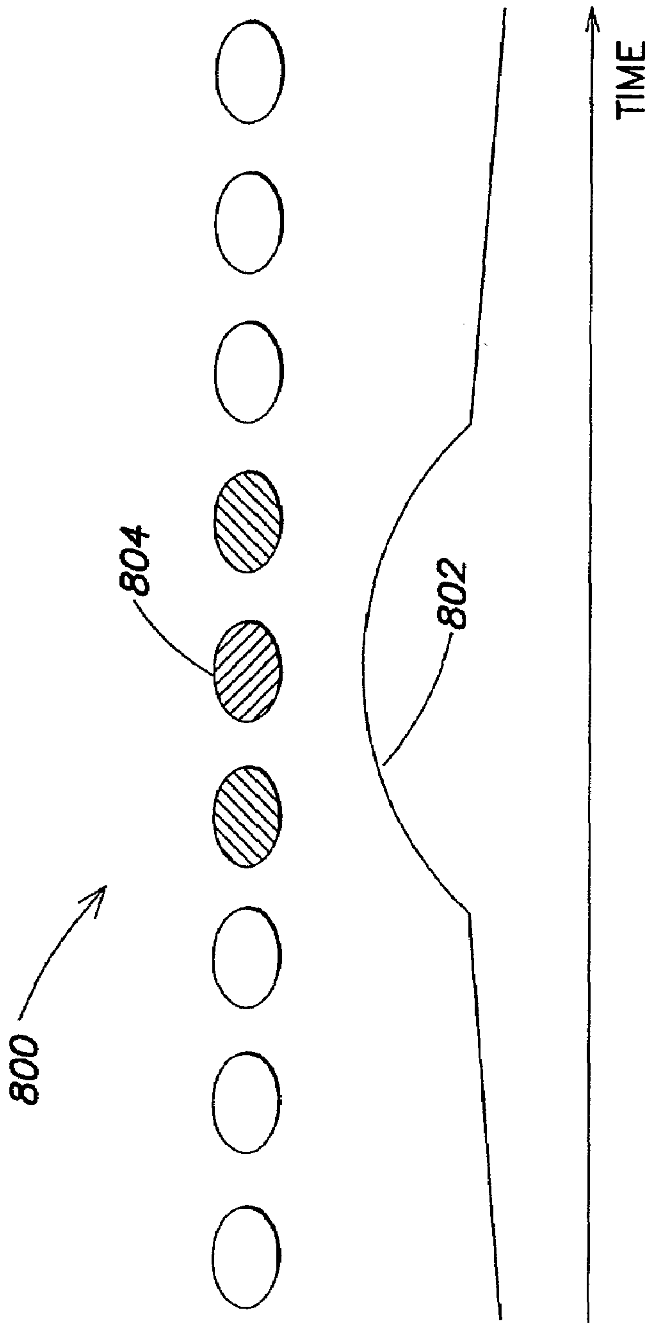
FIG. 8 is a schematic diagram showing the propagation of an effect through a light system.

For example, referring to FIG. 8, a schematic diagram 800 has circles that represent a single light 804 over time. For an effect to 'traverse' this light, it might simply have a step function that causes the light to pulse as the wave passes through the light. However, without the notion of width, the effect might be indiscernible. The effect preferably has width. If however, the effect on the light was simply a step function that turned on for a period of time, then might appear to be a harsh transition, which may be desirable in some cases but for effects that move over time (i.e., have some velocity associated with them) then this would not normally be the case.

The wave 802 shown in FIG. 8 has a shape that corresponds to the change. In essence it is a visual convolution of the wave 802 as it propagates through a space. So as a wave, such as from an explosion, moves past points in space, those points rise in intensity from zero, and can even have associated changes in hue or saturation, which gives a much more realistic effect of the motion of the effect. At some point, as the number and density of lights increases, the room then becomes an extension of the screen and provides large sparse pixels. Even with a relatively small number of light systems 102 the effect eventually can serve as a display similar to a large screen display.

Effects can have associated motion and direction, i.e., a velocity. Even other physical parameters can be described to give physical parameters such as friction, inertia, and momentum. Even more than that, the effect can have a specific trajectory. In an embodiment, each light may have a representation that gives attributes of the light. This can take the form of 2D position, for example. A light system 102 can have all various degrees of freedom assigned (e.g., xyz-rpy), or any combination.

The techniques listed here are not limited to lighting. Control signals can be propagated through other devices based on their positions, such as special effects devices such as pyrotechnics, smell-generating devices, fog machines, bubble machines, moving mechanisms, acoustic devices, acoustic effects that move in space, or other systems.

Figure 9:
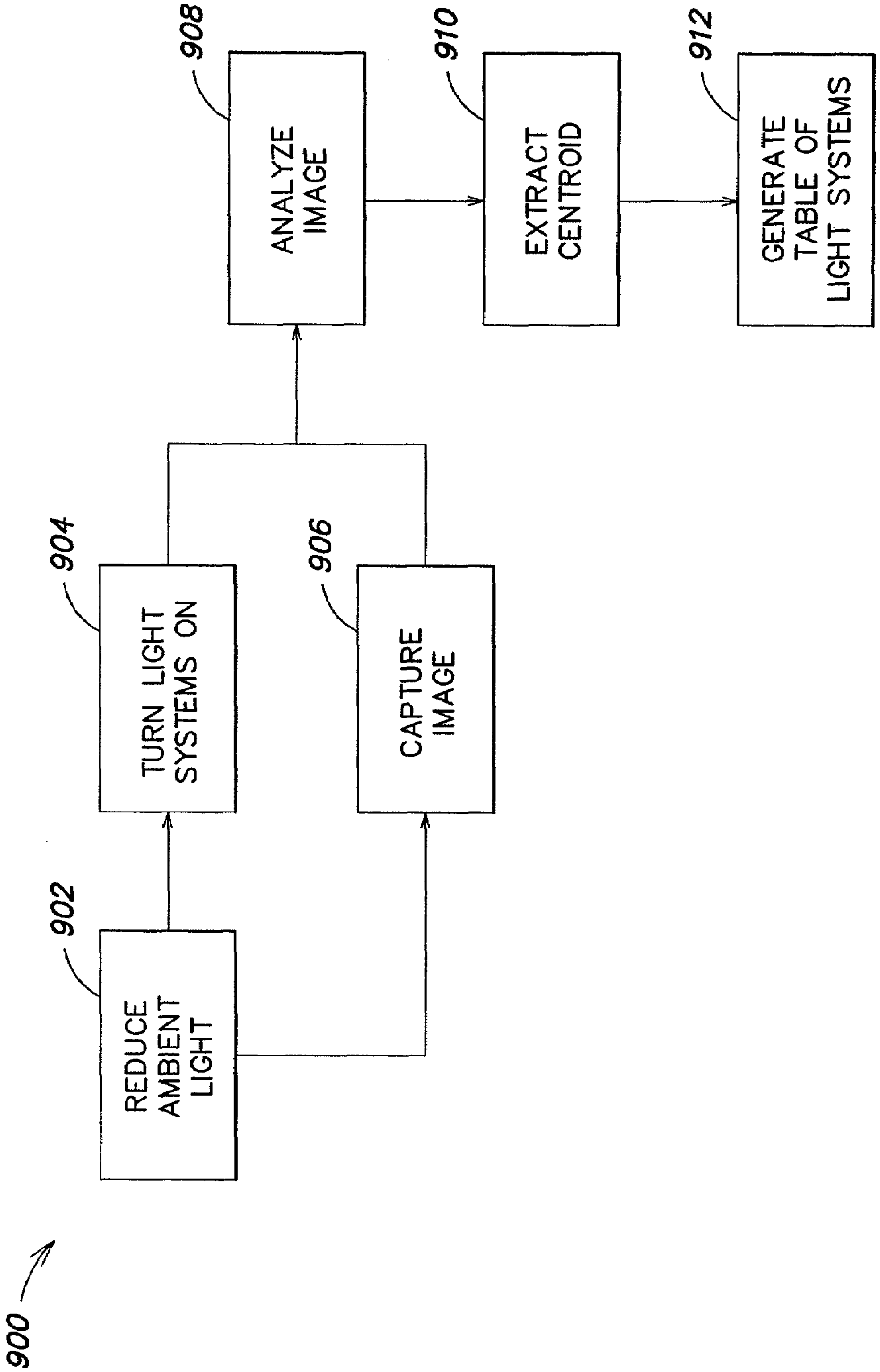
FIG. 9 is a flow diagram showing steps for using an image capture device to determine the positions of a plurality of light systems in an environment.

An embodiment of the present invention is a method of automatically capturing the position of the light systems 102 within an environment. An imaging device may be used as a means of capturing the position of the light. A camera, connected to a computing device, can capture the image for analysis can calculation of the position of the light. FIG. 9 depicts a flow diagram 900 that depicts a series of steps that may be used to accomplish this method. First, at a step 902, the environment to be mapped may be darkened by reducing ambient light. Next, at a step 904, control signals can be sent to each light system 102, commanding the light system 102 to turn on and off in turn. Simultaneously, the camera can capture an image during each "on" time at a step 906. Next, at a step 908, the image is analyzed to locate the position of the "on" light system 102. At a step 910 a centroid can be extracted. Because no other light is present when the particular light system 102 is on, there is little issue with other artifacts to filter and remove from the image. Next, at a step 912, the centroid position of the light system 102 is stored and the system generates a table of light systems 102 and centroid positions. This data can be used to populate a configuration file, such as that depicted in connection with FIG. 5. In sum, each light system 102, in turn, is activated, and the centroid measurement determined. This is done for all of the light systems 102. An image thus gives a position of the light system in a plane, such as with (x,y) coordinates.

Where a 3D position is desired a second image may be captured to triangulate the position of the light in another coordinate dimension. This is the stereo problem. In the same way human eyes determine depth through the correspondence and disparity between the images provided by each eye, a second set of images may be taken to provide the correspondence. The camera is either duplicated at a known position relative to the first camera or the first camera is moved a fixed distance and direction. This movement or difference in position establishes the baseline for the two images and allows derivation of a third coordinate (e.g., (x,y, z)) for the light system 102.

Figure 10:
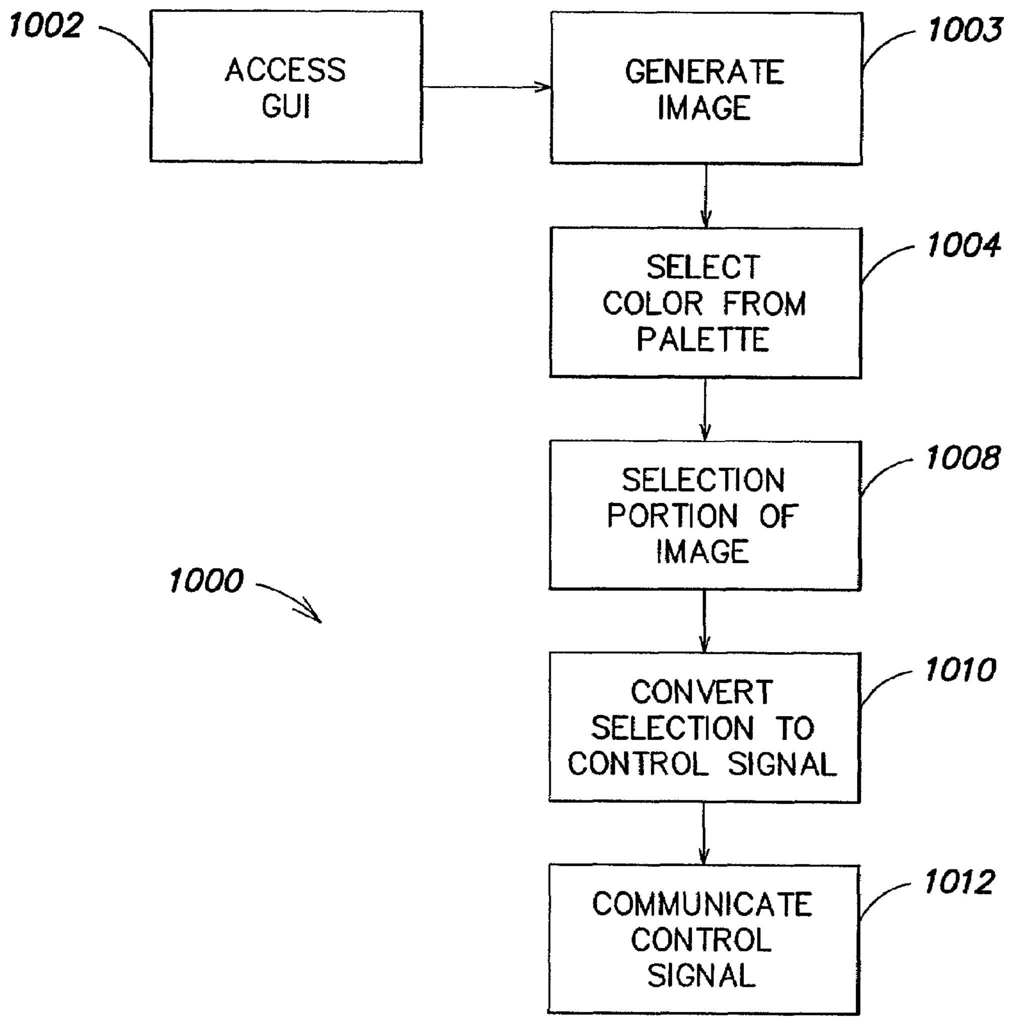
FIG. 10 is a flow diagram showing steps for interacting with a graphical user interface to generate a lighting effect in an environment.
Figure 11:
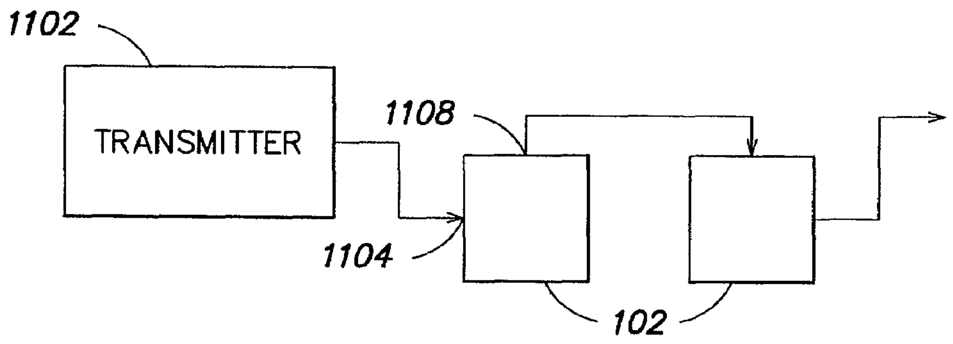
FIG. 11 is a schematic diagram depicting light systems that transmit data that is generated by a network transmitter.

Another embodiment of the invention is depicted in FIG. 10, which contains a flow diagram 1000 with steps for generating a control signal. First, at a step 1002 a user can access a graphical user interface, such as the display 612 depicted in FIG. 6. Next, at a step 1003, the user can generate an image on the display, such as using a graphics program or similar facility. The image can be a representation of an environment, such as a room, wall, building, surface, object, or the like, in which light systems 102 are disposed. It is assumed in connection with FIG. 10 that the configuration of the light systems 102 in the environment is known and stored, such as in a table or configuration file 500. Next, at a step 1004, a user can select an effect, such as from a menu of effects. In an embodiment, the effect may be a color selected from a color palette. The color might be a color temperature of white. The effect might be another effect, such as described herein. In an embodiment, generating the image 1003 may be accomplished through a program executed on a processor. The image may then be displayed on a computer screen. Once a color is selected from the palette at the step 1004, a user may select a portion of the image at a step 1008. This may be accomplished by using a cursor on the screen in a graphical user interface where the cursor is positioned over the desired portion of the image and then the portion is selected with a mouse. Following the selection of a portion of the image, the information from that portion can be converted to lighting control signals at a step 1010. This may involve changing the format of the bit stream or converting the information into other information. The information that made the image may be segmented into several colors such as red, green, and blue. The information may also be communicated to a lighting system in, for example, segmented red, green, and blue signals. The signal may also be communicated to the lighting system as a composite signal at a step 1012. This technique can be useful for changing the color of a lighting system. For example, a color palette may be presented in a graphical user interface and the palette may represent millions of different colors. A user may want to change the lighting in a room or other area to a deep blue. To accomplish her task, the user can select the color from the screen using a mouse and the lighting in the room changes to match the color of the portion of the screen she selected. Generally, the information on a computer screen is presented in small pixels of red, green and blue. LED systems, such as those found in U.S. Pat. Nos. 6,016,038, 6,150,774 and 6,166,496, may include red, green and blue lighting elements as well. The conversion process from the information on the screen to control signals may be a format change such that the lighting system understands the commands. However, in an embodiment, the information or the level of the separate lighting elements may be the same as the information used to generate the pixel information. This provides for an accurate duplication of the pixel information in the lighting system.

Using the techniques described herein, including techniques for determining positions of light systems in environments, techniques for modeling effects in environments (including time- and geometry-based effects), and techniques for mapping light system environments to virtual environments, it is possible to model an unlimited range of effects in an unlimited range of environments. Effects need not be limited to those that can be created on a square or rectangular display. Instead, light systems can be disposed in a wide range of lines, strings, curves, polygons, cones, cylinders, cubes, spheres, hemispheres, non-linear configurations, clouds, and arbitrary shapes and configurations, then modeled in a virtual environment that captures their positions in selected coordinate dimensions. Thus, light systems can be disposed in or on the interior or exterior of any environment, such as a room, building, home, wall, object, product, retail store, vehicle, ship, airplane, pool, spa, hospital, operating room, or other location.

In embodiments, the light system may be associated with code for the computer application, so that the computer application code is modified or created to control the light system. For example, object-oriented programming techniques can be used to attach attributes to objects in the computer code, and the attributes can be used to govern behavior of the light system. Object oriented techniques are known in the field, and can be found in texts such as "Introduction to Object-Oriented Programming" by Timothy Budd, the entire disclosure of which is herein incorporated by reference. It should be understood that other programming techniques may also be used to direct lighting systems to illuminate in coordination with computer applications, object oriented programming being one of a variety of programming techniques that would be understood by one of ordinary skill in the art to facilitate the methods and systems described herein.

In an embodiment, a developer can attach the light system inputs to objects in the computer application. For example, the developer may have an abstraction of a light system 102 that is added to the code construction, or object, of an application object. An object may consist of various attributes, such as position, velocity, color, intensity, or other values. A developer can add light as an instance in the object in the code of a computer application. For example, the object could be vector in an object-oriented computer animation program or solid modeling program, with attributes, such as direction and velocity. A light system 102 can be added as an instance of the object of the computer application, and the light system can have attributes, such as intensity, color, and various effects. Thus, when events occur in the computer application that call on the object of the vector, a thread running through the program can draw code to serve as an input to the processor of the light system. The light can accurately represent geometry, placement, spatial location, represent a value of the attribute or trait, or provide indication of other elements or objects.

Figure 12:
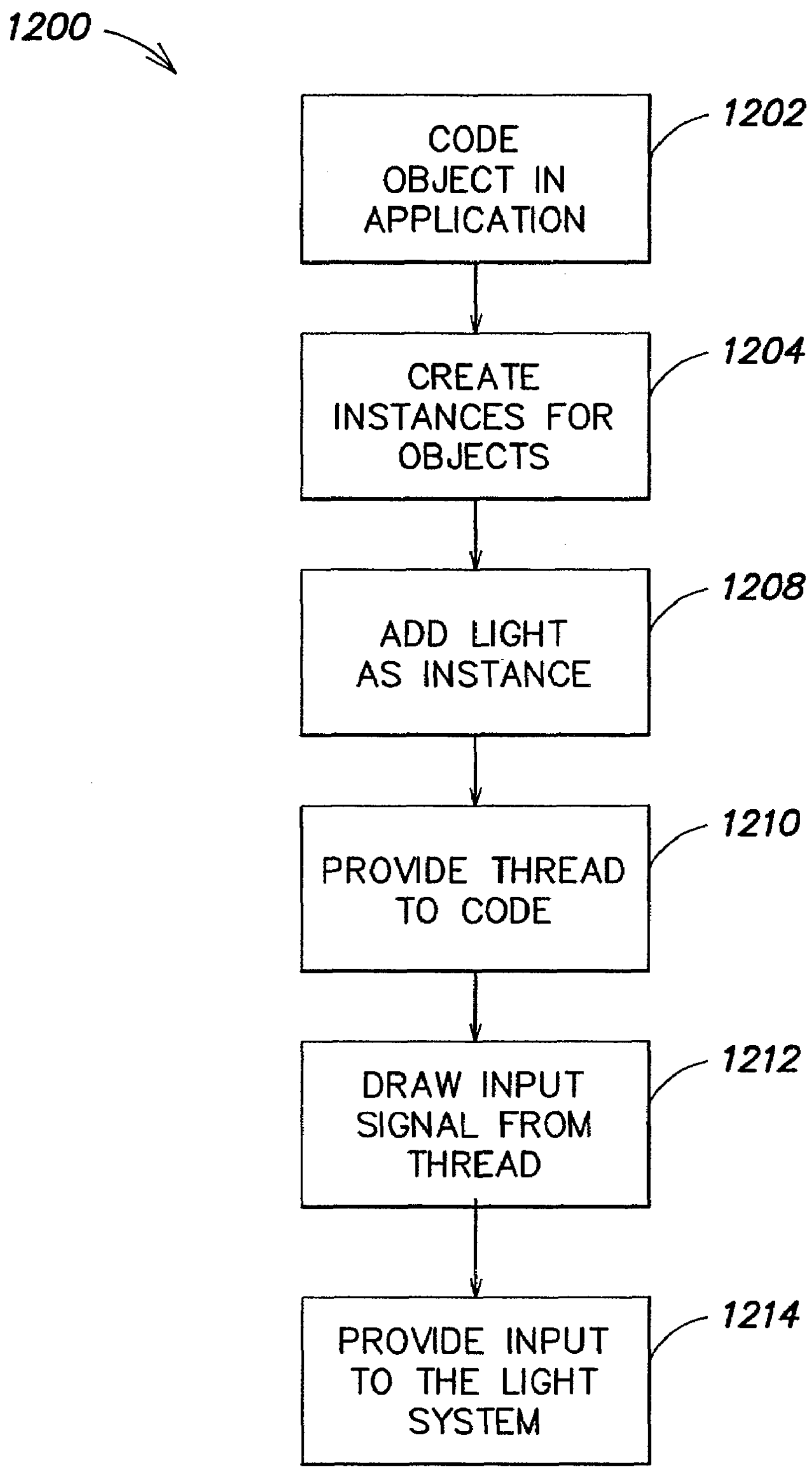
FIG. 12 is a flow diagram showing steps for generating a control signal for a light system using an object-oriented programming technique.

Referring to FIG. 12, a flow chart 1200 provides steps for a method of providing for coordinated illumination. At the step 1202, the programmer codes an object for a computer application, using, for example, object-oriented programming techniques. At a step 1204, the programming creates instances for each of the objects in the application. At a step 1208, the programmer adds light as an instance to one or more objects of the application. At a step 1210, the programmer provides for a thread, running through the application code. At a step 1212, the programmer provides for the thread to draw lighting system input code from the objects that have light as an instance. At a step 1214, the input signal drawn from the thread at the step 1212 is provided to the light system, so that the lighting system responds to code drawn from the computer application.

Using such object-oriented light input to the light system 102 from code for a computer application, various lighting effects can be associated in the real world environment with the virtual world objects of a computer application. For example, in animation of an effect such as explosion of a polygon, a light effect can be attached with the explosion of the polygon, such as sound, flashing, motion, vibration and other temporal effects. Further, the light system 102 could include other effects devices including sound producing devices, motion producing devices, fog machines, rain machines or other devices which could also produce indications related to that object.

Figure 13:
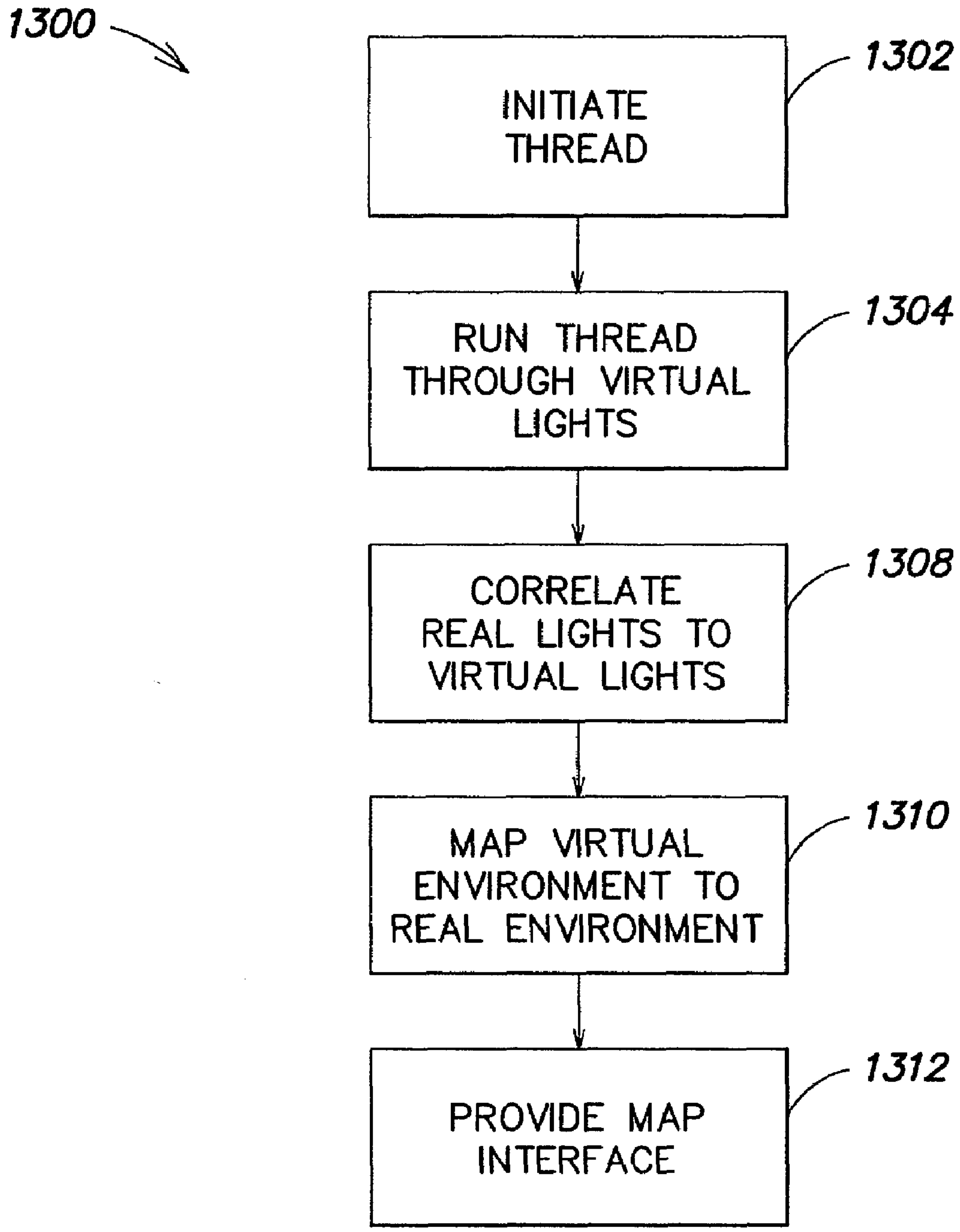
FIG. 13 is a flow diagram for executing a thread to generate a lighting signal for a real world light system based on data from a computer application.

Referring to FIG. 13, a flow diagram 1300 depicts steps for coordinated illumination between a representation on virtual environment of a computer screen and a light system 102 or set of light systems 102 in a real environment. In embodiments, program code for control of the light system 102 has a separate thread running on the machine that provides its control signals. At a step 1302 the program initiates the thread. At a step 1304 the thread as often as possible runs through a list of virtual lights, namely, objects in the program code that represent lights in the virtual environment. At a step 1308 the thread does three-dimensional math to determine which real-world light systems 102 in the environment are in proximity to a reference point in the real world (e.g., a selected surface 107) that is projected as the reference point of the coordinate system of objects in the virtual environment of the computer representation. Thus, the (0,0,0) position can be a location in a real environment and a point on the screen in the display of the computer application (for instance the center of the display. At a step 1310, the code maps the virtual environment to the real world environment, including the light systems 102, so that events happening outside the computer screen are similar in relation to the reference point as are virtual objects and events to a reference point on the computer screen.

At a step 1312, the host of the method may provide an interface for mapping. The mapping function may be done with a function, e.g., "project-all-lights," as described in Directlight API described below and in Appendix A, that maps real world lights using a simple user interface, such as drag and drop interface. The placement of the lights may not be as important as the surface the lights are directed towards. It may be this surface that reflects the illumination or lights back to the environment and as a result it may be this surface that is the most important for the mapping program. The mapping program may map these surfaces rather than the light system locations or it may also map both the locations of the light systems and the light on the surface.

A system for providing the code for coordinated illumination may be any suitable computer capable of allowing programming, including a processor, an operating system, and memory, such as a database, for storing files for execution.

Each real light 102 may have attributes that are stored in a configuration file. An example of a structure for a configuration file is depicted in FIG. 5. In embodiments, the configuration file may include various data, such as a light number, a position of each light, the position or direction of light output, the gamma (brightness) of the light, an indicator number for one or more attributes, and various other attributes. By changing the coordinates in the configuration file, the real world lights can be mapped to the virtual world represented on the screen in a way that allows them to reflect what is happening in the virtual environment. The developer can thus create time-based effects, such as an explosion. There can then be a library of effects in the code that can be attached to various application attributes. Examples include explosions, rainbows, color chases, fades in and out, etc. The developer attaches the effects to virtual objects in the application. For example, when an explosion is done, the light goes off in the display, reflecting the destruction of the object that is associated with the light in the configuration file.

To simplify the configuration file, various techniques can be used. In embodiments, hemispherical cameras, sequenced in turn, can be used as a baseline with scaling factors to triangulate the lights and automatically generate a configuration file without ever having to measure where the lights are. In embodiments, the configuration file can be typed in, or can be put into a graphical user interface that can be used to drag and drop light sources onto a representation of an environment. The developer can create a configuration file that matches the fixtures with true placement in a real environment. For example, once the lighting elements are dragged and dropped in the environment, the program can associate the virtual lights in the program with the real lights in the environment. An example of a light authoring program to aid in the configuration of lighting is included in U.S. patent application Ser. No. 09/616,214 "Systems and Methods for Authoring Lighting Sequences." Color Kinetics Inc. also offers a suitable authoring and configuration program called "Color Play."

Further details as to the implementation of the code can be found in the Directlight API document attached hereto as Appendix A. Directlight API is a programmer's interface that allows a programmer to incorporate lighting effects into a program. Directlight API is attached in Appendix A and the disclosure incorporated by reference herein. Object oriented programming is just one example of a programming technique used to incorporate lighting effects. Lighting effects could be incorporated into any programming language or method of programming. In object oriented programming, the programmer is often simulating a 3D space.

In the above examples, lights were used to indicate the position of objects which produce the expected light or have light attached to them. There are many other ways in which light can be used. The lights in the light system can be used for a variety of purposes, such as to indicate events in a computer application (such as a game), or to indicate levels or attributes of objects.

Simulation types of computer applications are often 3D rendered and have objects with attributes as well as events. A programmer can code events into the application for a simulation, such as a simulation of a real world environment. A programmer can also code attributes or objects in the simulation. Thus, a program can track events and attributes, such as explosions, bullets, prices, product features, health, other people, patterns of light, and the like. The code can then map from the virtual world to the real world. In embodiments, at an optional step, the system can add to the virtual world with real world data, such as from sensors or input devices. Then the system can control real and virtual world objects in coordination with each other. Also, by using the light system as an indicator, it is possible to give information through the light system that aids a person in the real world environment.

Architectural visualization, mechanical engineering models, and other solid modeling environments are encompassed herein as embodiments. In these virtual environments lighting is often relevant both in a virtual environment and in a solid model real world visualization environment. The user can thus position and control a light system 102 the illuminates a real world sold model to illuminate the real world solid model in correspondence to illumination conditions that are created in the virtual world modeling environment. Scale physical models in a room of lights can be modeled for lighting during the course of a day or year or during different seasons for example, possibly to detect previously unknown interaction with the light and various building surfaces. Another example would be to construct a replica of a city or portion of a city in a room with a lighting system such as those discussed above. The model could then be analyzed for color changes over a period of time, shadowing, or other lighting effects. In an embodiment, this technique could be used for landscape design. In an embodiment, the lighting system is used to model the interior space of a room, building, or other piece of architecture. For example, an interior designer may want to project the colors of the room, or fabric or objects in the room with colors representing various times of the day, year, or season. In an embodiment, a lighting system is used in a store near a paint section to allow for simulation of lighting conditions on paint chips for visualization of paint colors under various conditions. These types of real world modeling applications can enable detection of potential design flaws, such as reflective buildings reflecting sunlight in the eyes of drivers during certain times of the year. Further, the three-dimensional visualization may allow for more rapid recognition of the aesthetics of the design by human beings, than by more complex computer modeling.

Solid modeling programs can have virtual lights. One can light a model in the virtual environment while simultaneously lighting a real world model the same way. For example, one can model environmental conditions of the model and recreate them in the real world modeling environment outside the virtual environment. For example, one can model a house or other building and show how it would appear in any daylight environment. A hobbyist could also model lighting for a model train set (for instance based on pictures of an actual train) and translate that lighting into the illumination for the room wherein the model train exists. Therefore the model train may not only be a physical representation of an actual train, but may even appear as that train appeared at a particular time. A civil engineering project could also be assembled as a model and then a lighting system according to the principles of the invention could be used to simulate the lighting conditions over the period of the day. This simulation could be used to generate lighting conditions, shadows, color effects or other effects. This technique could also be used in Film/Theatrical modeling or could be used to generate special effects in filmmaking. Such a system could also be used by a homeowner, for instance by selecting what they want their dwelling to look like from the outside and having lights be selected to produce that look. This is a possibility for safety when the owner is away. Alternatively, the system could work in reverse where the owner turns on the lights in their house and a computer provides the appearance of the house from various different directions and distances.

Although the above examples discuss modeling for architecture, one of skill in the art would understand that any device, object, or structure where the effect of light on that device, object, or structure can be treated similarly.

Medical or other job simulation could also be performed. A lighting system according to the principles of the present invention may be used to simulate the lighting conditions during a medical procedure. This may involve creating an operating room setting or other environment such as an auto accident at night, with specific lighting conditions. For example, the lighting on highways is generally high-pressure sodium lamps which produce nearly monochromatic yellow light and as a result objects and fluids may appear to be a non-normal color. Parking lots generally use metal halide lighting systems and produce a broad spectrum light that has spectral gaps. Any of these environments could be simulated using a system according to the principles of the invention. These simulators could be used to train emergency personnel how to react in situations lit in different ways. They could also be used to simulate conditions under which any job would need to be performed. For instance, the light that will be experienced by an astronaut repairing an orbiting satellite can be simulated on earth in a simulation chamber.

Lights can also be used to simulate travel in otherwise inaccessible areas such as the light that would be received traveling through space or viewing astronomical phenomena, or lights could be used as a three dimensional projection of an otherwise unviewable object. For instance, a lighting system attached to a computing device could provide a three dimensional view from the inside of a molecular model. Temporal Function or other mathematical concepts could also be visualized.

Figure 14:
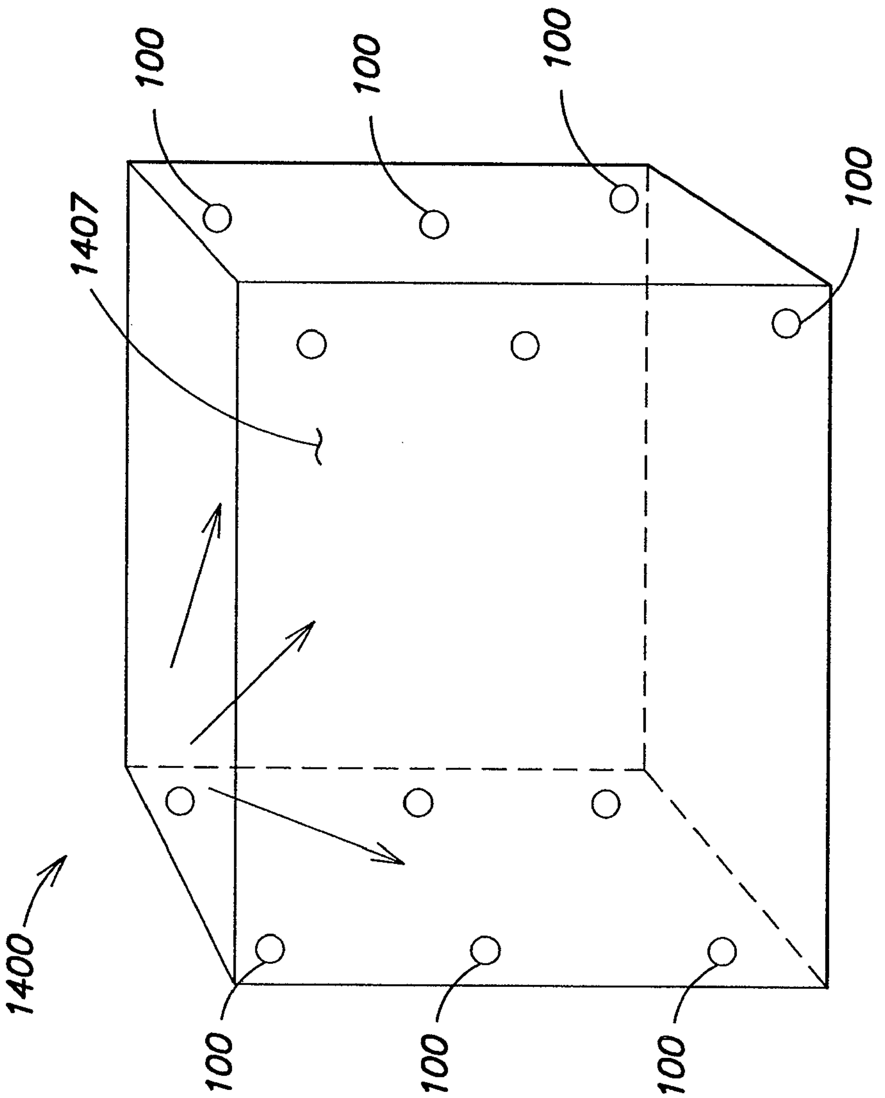
FIG. 14 illustrates an environment in which light may be generated according to various embodiments of the present disclosure.

Referring to FIG. 14, in embodiments of the invention, the lighting system may be used to illuminate an environment. One such environment 1400 is shown in FIG. 14. The environment has at least one lighting unit 100 mounted therein, and in a preferred embodiment may have multiple lighting units 100 therein. The lighting unit 100 may be a controllable lighting unit 100, such as described above in connection with FIG. 2, with lights 208 that illuminate portions of the environment 100.

Referring still to FIG. 14, the environment 1400 may include a surface 1407 that is lit by one or more lighting units 100. In the depicted embodiment the surface 1407 comprises a wall or other surface upon which light could be reflected. In another embodiment, the surface could be designed to absorb and retransmit light, possibly at a different frequency. For instance the surface 1407 could be a screen coated with a phosphor where illumination of a particular color could be projected on the screen and the screen could convert the color of the illumination and provide a different color of illumination to a viewer in the environment 1400. For instance the projected illumination could primarily be in the blue, violet or ultraviolet range while the transmitted light is more of a white. In embodiments, the surface 1407 may also include one or more colors, figures, lines, designs, figures, pictures, photographs, textures, shapes or other visual or graphical elements that can be illuminated by the lighting system. The elements on the surface can be created by textures, materials, coatings, painting, dyes, pigments, coverings, fabrics, or other methods or mechanisms for rendering graphical or visual effects. In embodiments, changing the illumination from the lighting system may create visual effects. For example, a picture on the surface 1407 may fade or disappear, or become more apparent or reappear, based on the color of the light from the lighting system that is rendered on the surface 1407. Thus, effects can be created on the surface 1407 not only by shining light on a plain surface, but also through the interaction of light with the visual or graphical elements on the surface.

In certain preferred embodiments, the lighting units 1400 are networked lighting systems where the lighting control signals are packaged into packets of addressed information. The addressed information may then be communicated to the lighting systems in the lighting network. Each of the lighting systems may then respond to the control signals that are addressed to the particular lighting system. This is an extremely useful arrangement for generating and coordinating lighting effects in across several lighting systems. Embodiments of U.S. patent application Ser. No. 09/616,214 "Systems and Methods for Authoring Lighting Sequences" describe systems and methods for generating system control signals and is hereby incorporated by reference herein.

A lighting system, or other system according to the principles of the present invention, may be associated with an addressable controller. The addressable controller may be arranged to "listen" to network information until it "hears" its address. Once the systems address is identified, the system may read and respond to the information in a data packet that is assigned to the address. For example, a lighting system may include an addressable controller. The addressable controller may also include an alterable address and a user may set the address of the system. The lighting system may be connected to a network where network information is communicated. The network may be used to communicate information to many controlled systems such as a plurality of lighting systems for example. In such an arrangement, each of the plurality of lighting systems may be receiving information pertaining to more than one lighting system. The information may be in the form of a bit stream where information for a first addressed lighting system is followed by information directed at a second addressed lighting system. An example of such a lighting system can be found in U.S. Pat. No. 6,016,038, which is hereby incorporated by reference herein.

In an embodiment, the lighting unit 100 is placed in a real world environment 1400. The real world environment 1400 could be a room. The lighting system could be arranged, for example, to light the walls, ceiling, floor or other sections or objects in a room, or particular surfaces 1407 of the room. The lighting system may include several addressable lighting units 100 with individual addresses. The illumination can be projected so as to be visible to a viewer in the room either directly or indirectly. That is a light of a lighting unit 100 could shine so that the light is projected to the viewer without reflection, or could be reflected, refracted, absorbed and reemitted, or in any other manner indirectly presented to the viewer.

Figure 15:
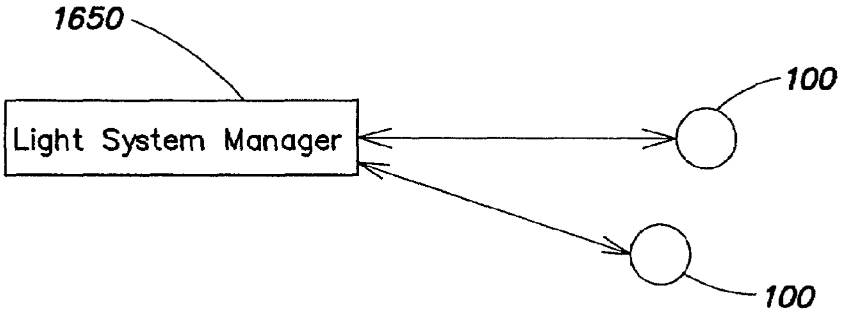
FIG. 15 is a schematic diagram setting out high-level system elements for a light system manager for a plurality of elements.

Referring to FIG. 15, it is desirable to provide a light system manager 1650 to manage a plurality of lighting units 100 or other light systems.

Figure 16:
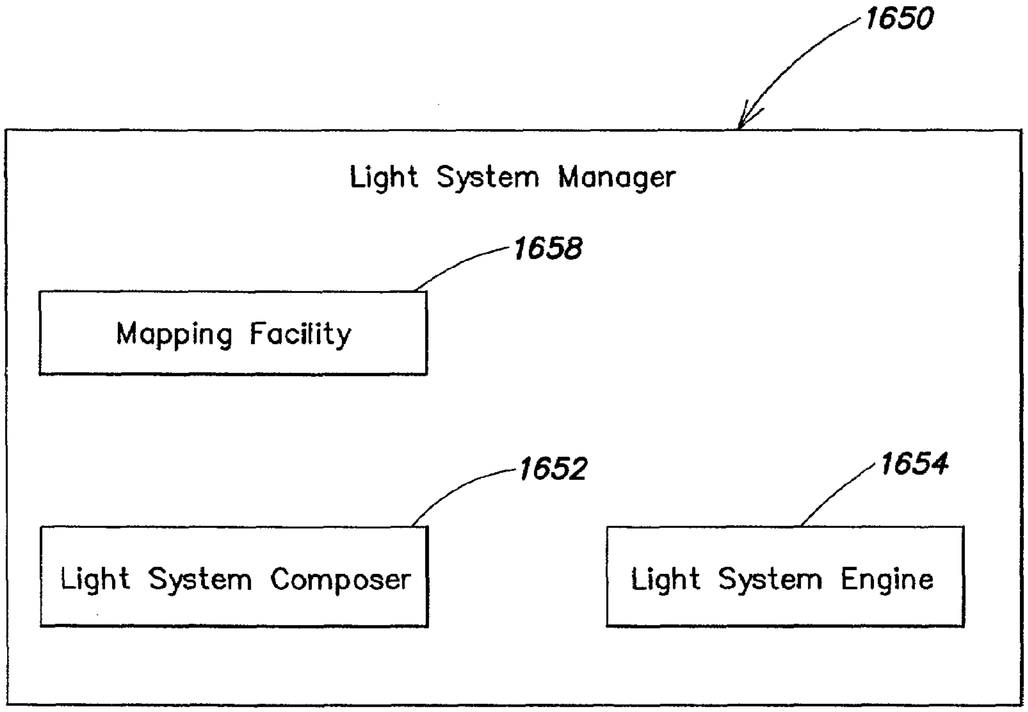
FIG. 16 provides a schematic diagram with system elements for a light system manager.

Referring to FIG. 16, a light system manager 1650 is provided, which may consist of a combination of hardware and software components. Included is a mapping facility 1658 for mapping the locations of a plurality of light systems. The mapping facility 1658 may use various techniques for discovering and mapping lights, such as described herein or as known to those of skill in the art. Also provided is a light system composer 1652 for composing one or more lighting shows that can be displayed on a light system. The authoring of the shows may be based on geometry and an object-oriented programming approach, such as the geometry of the light systems that are discovered and mapped using the mapping facility 1658, according to various methods and systems disclosed herein or known in the art. Also provided is a light system engine 1654, for playing lighting shows by executing code for lighting shows and delivering lighting control signals, such as to one or more lighting systems, or to related systems, such as power/data systems, that govern lighting systems. Further details of the light system manager 1650, mapping facility 1658, light system composer 1652 and light system engine 1654 are provided herein.

The light system manager 1650, mapping facility 1658, light system composer 1652 and light system engine 1654 may be provided through a combination of computer hardware, telecommunications hardware and computer software components. The different components may be provided on a single computer system or distributed among separate computer systems.

Figure 17:
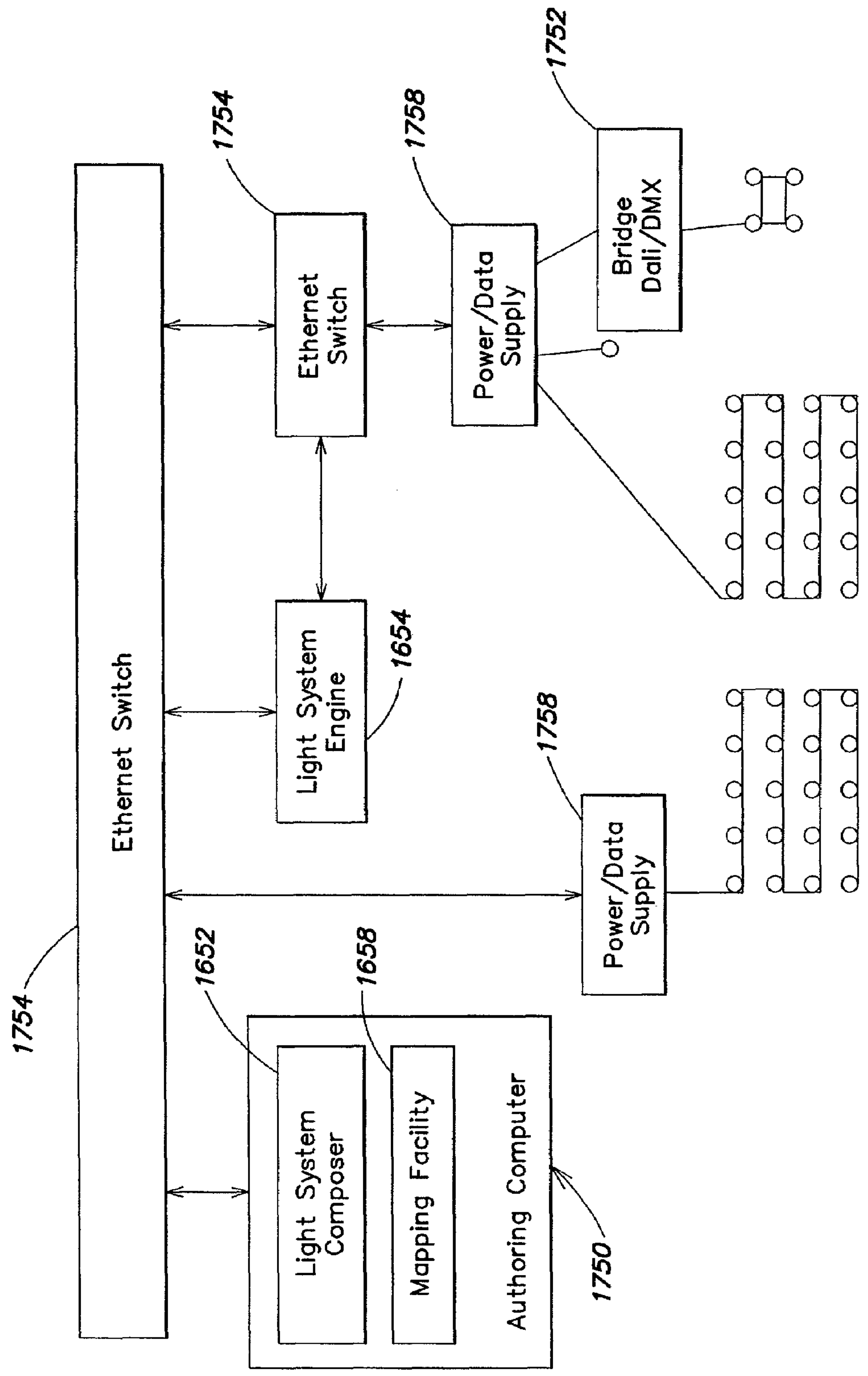
FIG. 17 is a schematic diagram with additional system elements for the light system manager of FIG. 16.

Referring to FIG. 17, in an embodiment, the mapping facility 1658 and the light system composer 1652 are provided on an authoring computer 1750. The authoring computer 1750 may be a conventional computer, such as a personal computer. In embodiments the authoring computer 1750 includes conventional personal computer components, such as a graphical user interface, keyboard, operating system, memory, and communications capability. In embodiments the authoring computer 1750 operates with a development environment with a graphical user interface, such as a Windows environment. The authoring computer 1750 may be connected to a network, such as by any conventional communications connection, such as a wire, data connection, wireless connection, network card, bus, Ethernet connection, Firewire, 802.11 facility, Bluetooth, or other connection. In embodiments, such as in FIG. 17, the authoring computer 1750 is provided with an Ethernet connection, such as via an Ethernet switch 1754, so that it can communicate with other Ethernet-based devices, optionally including the light system engine 1654, a light system itself (enabled for receiving instructions from the authoring computer 1750), or a power/data supply (PDS) 1758 that supplies power and/or data to a light system. The mapping facility 1650 and the light system composer 1652 may comprise software applications running on the authoring computer 1750.

Referring still to FIG. 17, in an architecture for delivering control systems for complex shows to one or more light systems, shows that are composed using the authoring computer 1750 are delivered via an Ethernet connection through one or more Ethernet switches 1754 to the light system engine 1654. The light system engine 1654 downloads the shows composed by the light system composer 1652 and plays them, generating lighting control signals for light systems. In embodiments, the lighting control signals are relayed by an Ethernet switch 1754 to one or more power/data supplies 1758 and are in turn relayed to light systems that are equipped to execute the instructions, such as by turning LEDs on or off, controlling their color or color temperature, changing their hue, intensity, or saturation, or the like. In embodiments the power/data supply may be programmed to receive lighting shows directly from the light system composer 1652. In embodiments a bridge 1752 may be programmed to convert signals from the format of the light system engine 1654 to a conventional format, such as DMX or DALI signals used for entertainment lighting.

Figure 18:
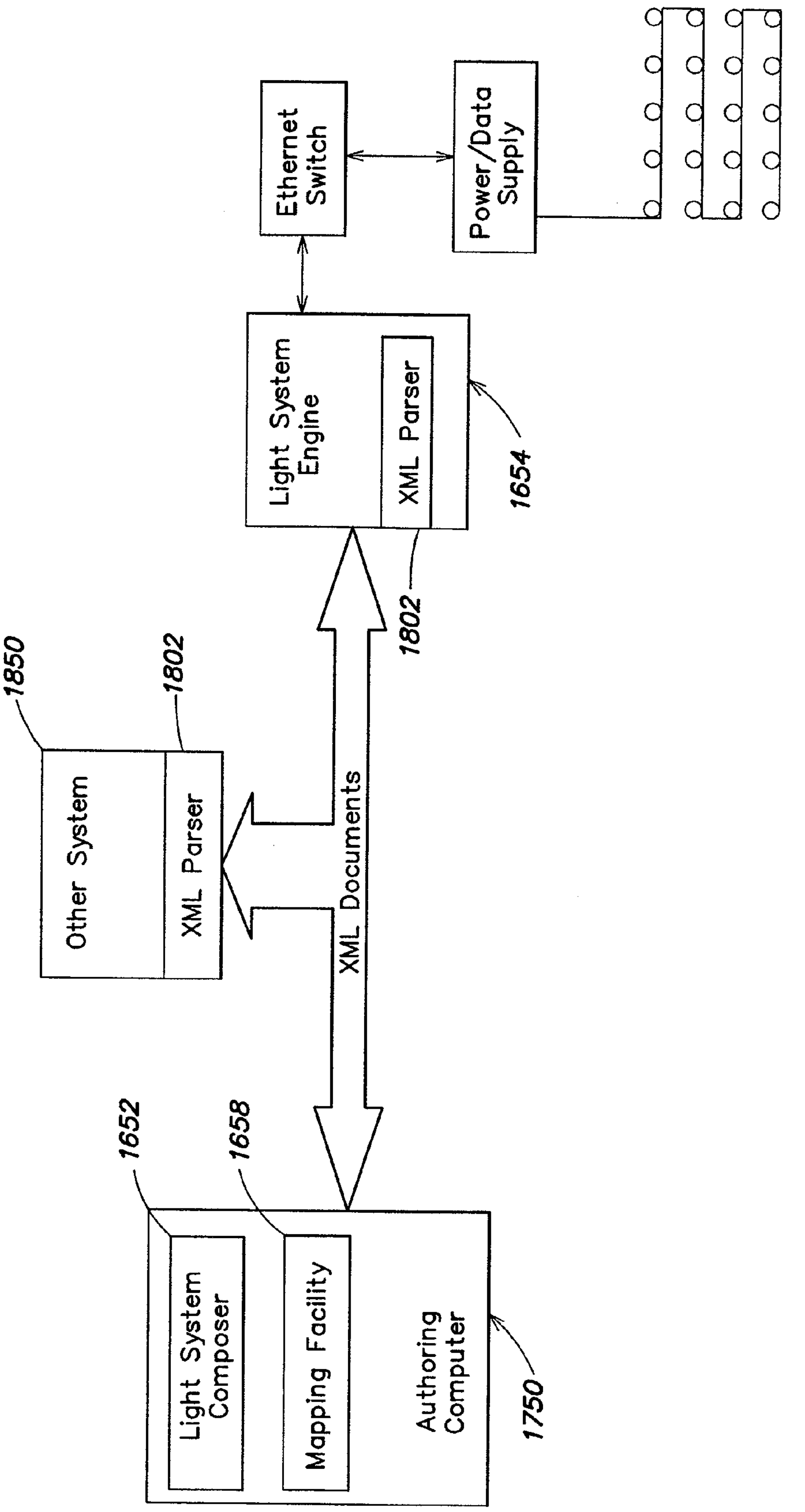
FIG. 18 is a schematic diagram with additional system elements for the light system manager of FIG. 16.

Referring to FIG. 18, in embodiments the lighting shows composed using the light system composer 1652 are compiled into simple scripts that are embodied as XML documents. The XML documents can be transmitted rapidly over Ethernet connections. In embodiments, the XML documents are read by an XML parser 1802 of the light system engine 1654. Using XML documents to transmit lighting shows allows the combination of lighting shows with other types of programming instructions. For example, an XML document type definition may include not only XML instructions for a lighting show to be executed through the light system engine 1654, but also XML with instructions for another computer system, such as a sound system, and entertainment system, a multimedia system, a video system, an audio system, a sound-effect system, a smoke effect system, a vapor effect system, a dry-ice effect system, another lighting system, a security system, an information system, a sensor-feedback system, a sensor system, a browser, a network, a server, a wireless computer system, a building information technology system, or a communication system.

Thus, methods and systems provided herein include providing a light system engine for relaying control signals to a plurality of light systems, wherein the light system engine plays back shows. The light system engine 1654 may include a processor, a data facility, an operating system and a communication facility. The light system engine 1654 may be configured to communicate with a DALI or DMX lighting control facility. In embodiments, the light system engine communicates with a lighting control facility that operates with a serial communication protocol. In embodiments the lighting control facility is a power/data supply for a lighting unit 100.

In embodiments, the light system engine 1654 executes lighting shows downloaded from the light system composer 1652. In embodiments the shows are delivered as XML files from the light show composer 1652 to the light system engine 1654. In embodiment the shows are delivered to the light system engine over a network. In embodiments the shows are delivered over an Ethernet facility. In embodiments the shows are delivered over a wireless facility. In embodiments the shows are delivered over a Firewire facility. In embodiments shows are delivered over the Internet.

In embodiments lighting shows composed by the lighting show composer 1652 can be combined with other files from another computer system, such as one that includes an XML parser that parses an XML document output by the light show composer 1652 along with XML elements relevant to the other computer. In embodiments lighting shows are combined by adding additional elements to an XML file that contains a lighting show. In embodiments the other computer system comprises a browser and the user of the browser can edit the XML file using the browser to edit the lighting show generated by the lighting show composer. In embodiments the light system engine 1654 includes a server, wherein the server is capable of receiving data over the Internet. In embodiments the light system engine 1654 is capable of handling multiple zones of light systems, wherein each zone of light systems has a distinct mapping. In embodiments the multiple zones are synchronized using the internal clock of the light system engine 1654.

The methods and systems included herein include methods and systems for providing a mapping facility 1658 of the light system manager 1650 for mapping locations of a plurality of light systems. In embodiments, the mapping system discovers lighting systems in an environment, using techniques described above. In embodiments, the mapping facility then maps light systems in a two-dimensional space, such as using a graphical user interface.

In embodiments of the invention, the light system engine 1654 comprises a personal computer with a Linux operating system. In embodiments the light system engine is associated with a bridge to a DMX or DALI system.

Figure 19:
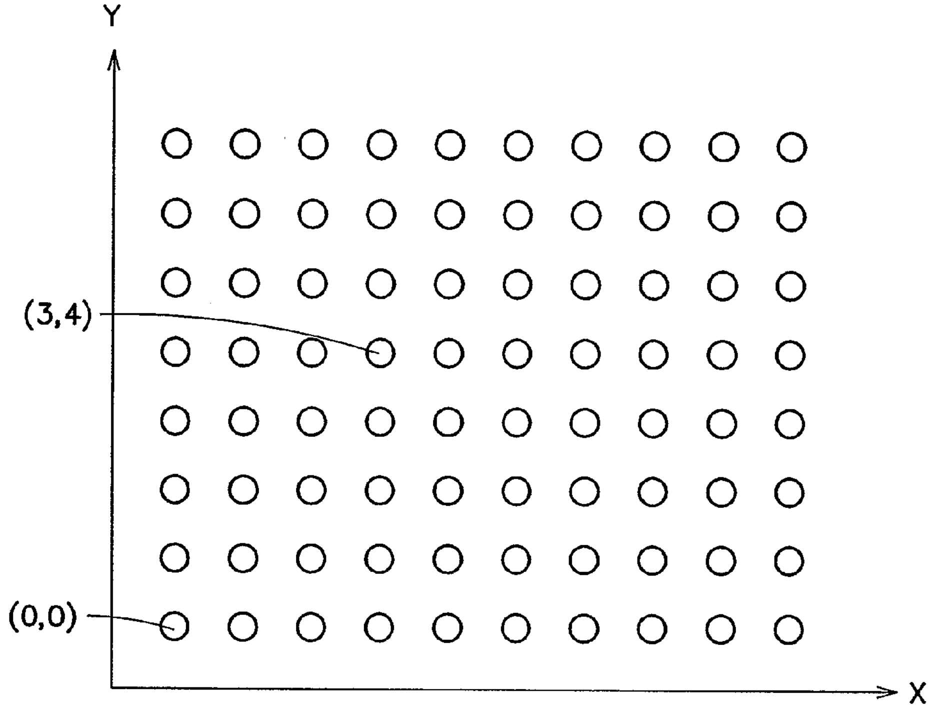
FIG. 19 shows a representation of a plurality of lighting units in a coordinate system.

Referring to FIG. 19, the graphical user interface of the mapping facility 1652 of the authoring computer 1650 can display a two-dimensional map, or it may represent a two-dimensional space in another way, such as with a coordinate system, such as Cartesian, polar or spherical coordinates. In embodiments, lights in an array, such as a rectangular array, can be represented as elements in a matrix, such as with the lower left corner being represented as the origin (0, 0) and each other light being represented as a coordinate pair (x, y), with x being the number of positions away from the origin in the horizontal direction and y being the number of positions away from the origin in the vertical direction. Thus, the coordinate (3, 4) can indicate a light system three positions away from the origin in the horizontal direction and four positions away from the origin in the vertical direction. Using such a coordinate mapping, it is possible to map addresses of real world lighting systems into a virtual environment, where control signals can be generated and associated geometrically with the lighting systems. With conventional addressable lighting systems, a Cartesian coordinate system may allow for mapping of light system locations to authoring systems for light shows.

Figure 20:
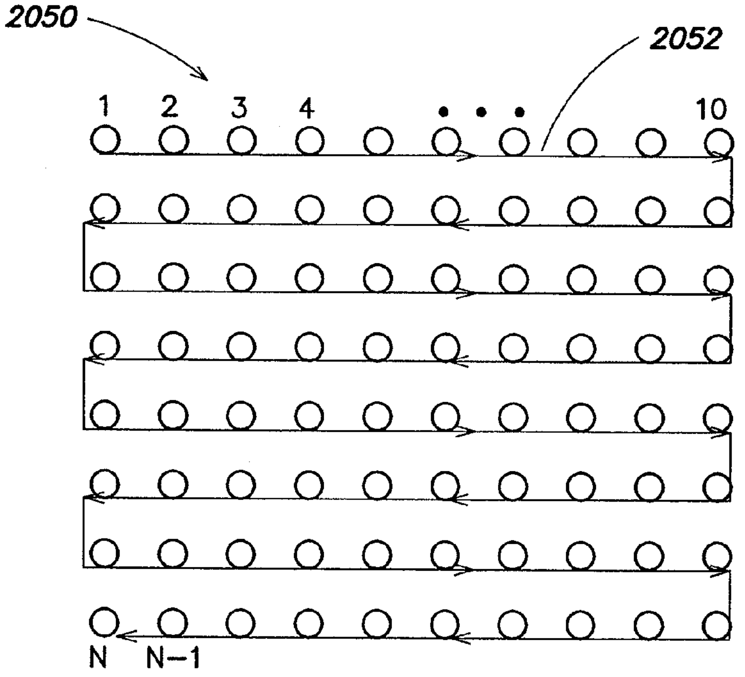
FIG. 20 shows a representation of a string of lighting units formed into an array.

Referring to FIG. 20, it may be convenient to map lighting systems in other ways. For example, a rectangular array 2050 can be formed by suitably arranging a curvilinear string 2052 of lighting units. The string of lighting units may use a serial addressing protocol, such as described in the applications incorporated by reference herein, wherein each lighting unit in the string reads, for example, the last unaltered byte of data in a data stream and alters that byte so that the next lighting unit will read the next byte of data. If the number of lighting units N in a rectangular array of lighting units is known, along with the number of rows in which the lighting units are disposed, then, using a table or similar facility, a conversion can be made from a serial arrangement of lighting units 1 to N to another coordinate system, such as a Cartesian coordinate system. Thus, control signals can be mapped from one system to the other system. Similarly, effects and shows generated for particular configurations can be mapped to new configurations, such as any configurations that can be created by arranging a string of lighting units, whether the share is rectangular, square, circular, triangular, or has some other geometry. In embodiments, once a coordinate transformation is known for setting out a particular geometry of lights, such as building a two-dimensional geometry with a curvilinear string of lighting units, the transformation can be stored as a table or similar facility in connection with the light management system 1650, so that shows authored using one authoring facility can be converted into shows suitable for that particular geometric arrangement of lighting units using the light management system 1650. The light system composer 1652 can store pre-arranged effects that are suitable for known geometries, such as a color chasing rainbow moving across a tile light with sixteen lighting units in a four-by-four array, a burst effect moving outward from the center of an eight-by-eight array of lighting units, or many others.

Figure 21:
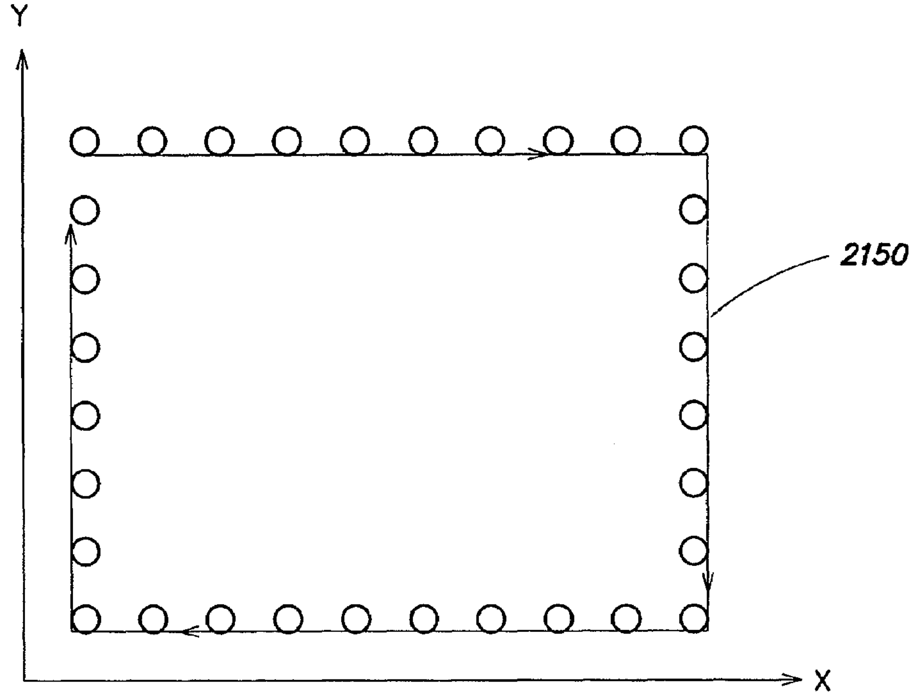
FIG. 21 shows a string of lighting units in a rectangular perimeter configuration.

Various other geometrical configurations of lighting units are so widely used as to benefit from the storing of pre-authored coordinate transformations, shows and effects. For example, referring to FIG. 21, a rectangular configuration 2150 is widely employed in architectural lighting environments, such as to light the perimeter of a rectangular item, such as a space, a room, a hallway, a stage, a table, an elevator, an aisle, a ceiling, a wall, an exterior wall, a sign, a billboard, a machine, a vending machine, a gaming machine, a display, a video screen, a swimming pool, a spa, a walkway, a sidewalk, a track, a roadway, a door, a tile, an item of furniture, a box, a housing, a fence, a railing, a deck, or any other rectangular item.

Figure 22:
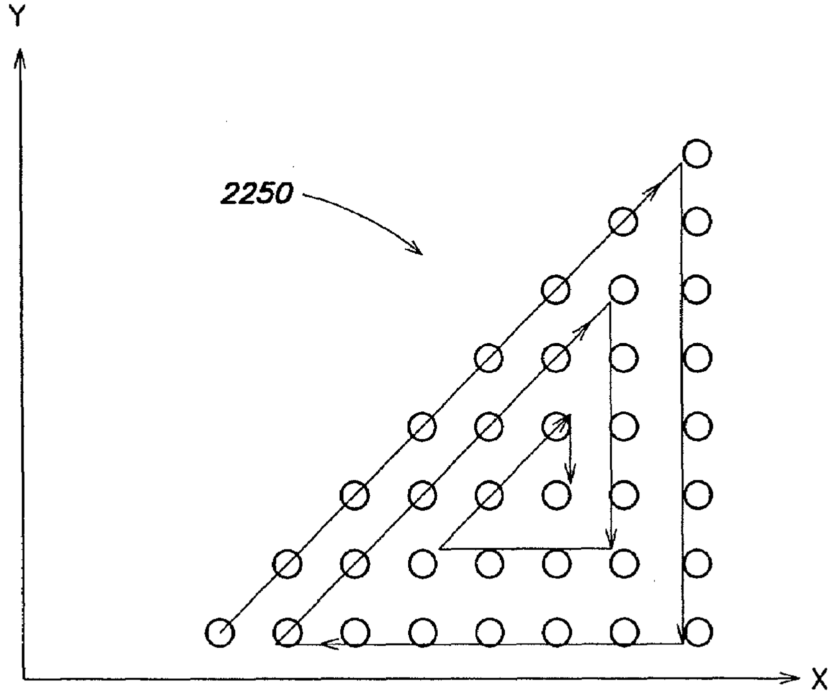
FIG. 22 shows a string of lighting units in a triangular array.

Referring to FIG. 22, a triangular configuration 2250 can be created, using a curvilinear string of lighting units, or by placing individual addressable lighting units in the configuration. Again, once the locations of lighting units and the dimensions of the triangle are known, a transformation can be made from one coordinate system to another, and pre-arranged effects and shows can be stored for triangular configurations of any selected number of lighting units. Triangular configurations 2250 can be used in many environments, such as for lighting triangular faces or items, such as architectural features, alcoves, tiles, ceilings, floors, doors, appliances, boxes, works of art, or any other triangular items.

Figure 23:
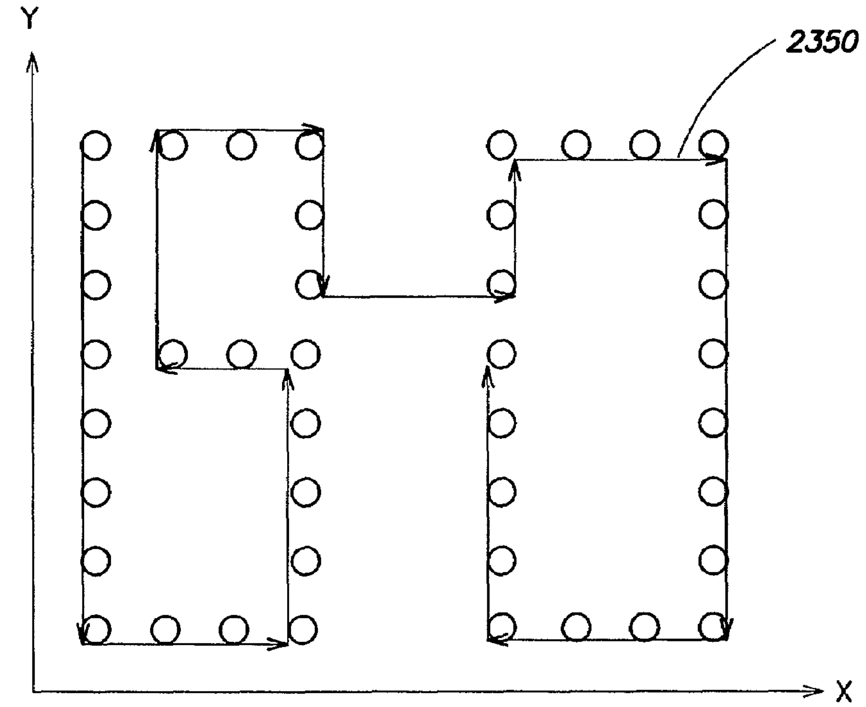
FIG. 23 shows a string of lighting units used to form a character.

Referring to FIG. 23, lighting units can be placed in the form of a character, number, symbol, logo, design mark, trademark, icon, or other configuration designed to convey information or meaning. The lighting units can be strung in a curvilinear string to achieve any configuration in any dimension, such as the formation of the number "80" in the configuration 2350 of FIG. 23. Again, once the locations of the lighting units are known, a conversion can be made between Cartesian (x, y) coordinates and the positions of the lighting units in the string, so that an effect generated using a one coordinate system can be transformed into an effect for the other. Characters such as those mentioned above can be used in signs, on vending machines, on gaming machines, on billboards, on transportation platforms, on buses, on airplanes, on ships, on boats, on automobiles, in theatres, in restaurants, or in any other environment where a user wishes to convey information.

Figure 24:
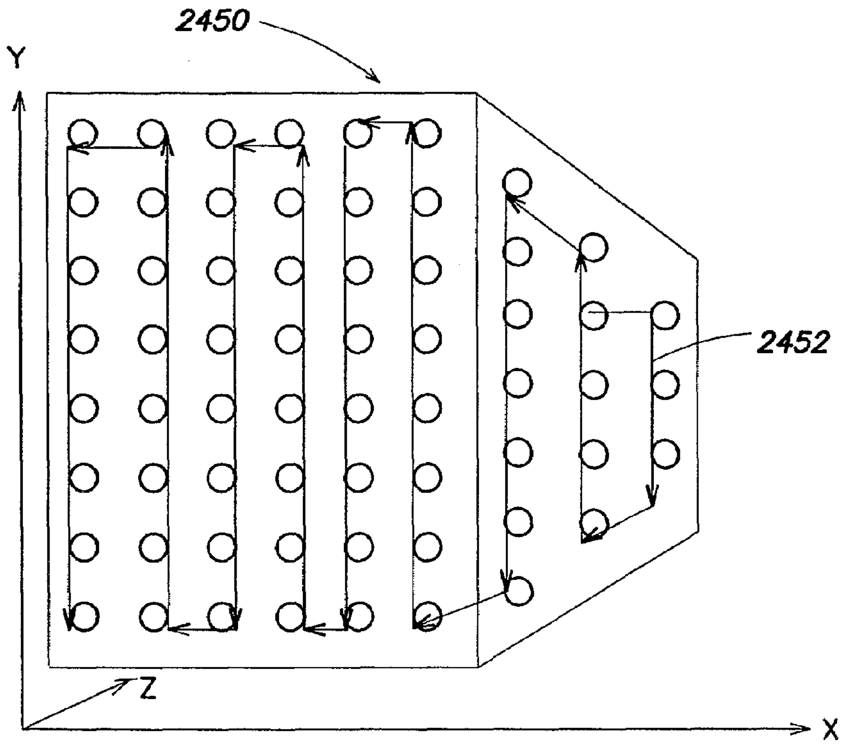
FIG. 24 shows a string of lighting units in a three-dimensional configuration.

Referring to FIG. 24, lighting units can be configured in any arbitrary geometry, not limited to two-dimensional configurations. For example, a string of lighting units can cover two sides of a building, such as in the configuration 2450 of FIG. 24. The three-dimensional coordinates (x, y, z) can be converted based on the positions of the individual lighting units in the string 2452. Once a conversion is known between the (x, y, z) coordinates and the string positions of the lighting units, shows authored in Cartesian coordinates, such as for individually addressable lighting units, can be converted to shows for a string of lighting units, or vice versa. Pre-stored shows and effects can be authored for any geometry, whether it is a string or a two- or three-dimensional shape. These include rectangles, squares, triangles, geometric solids, spheres, pyramids, tetrahedrons, polyhedrons, cylinders, boxes and many others, including shapes found in nature, such as those of trees, bushes, hills, or other features.

Figure 25:
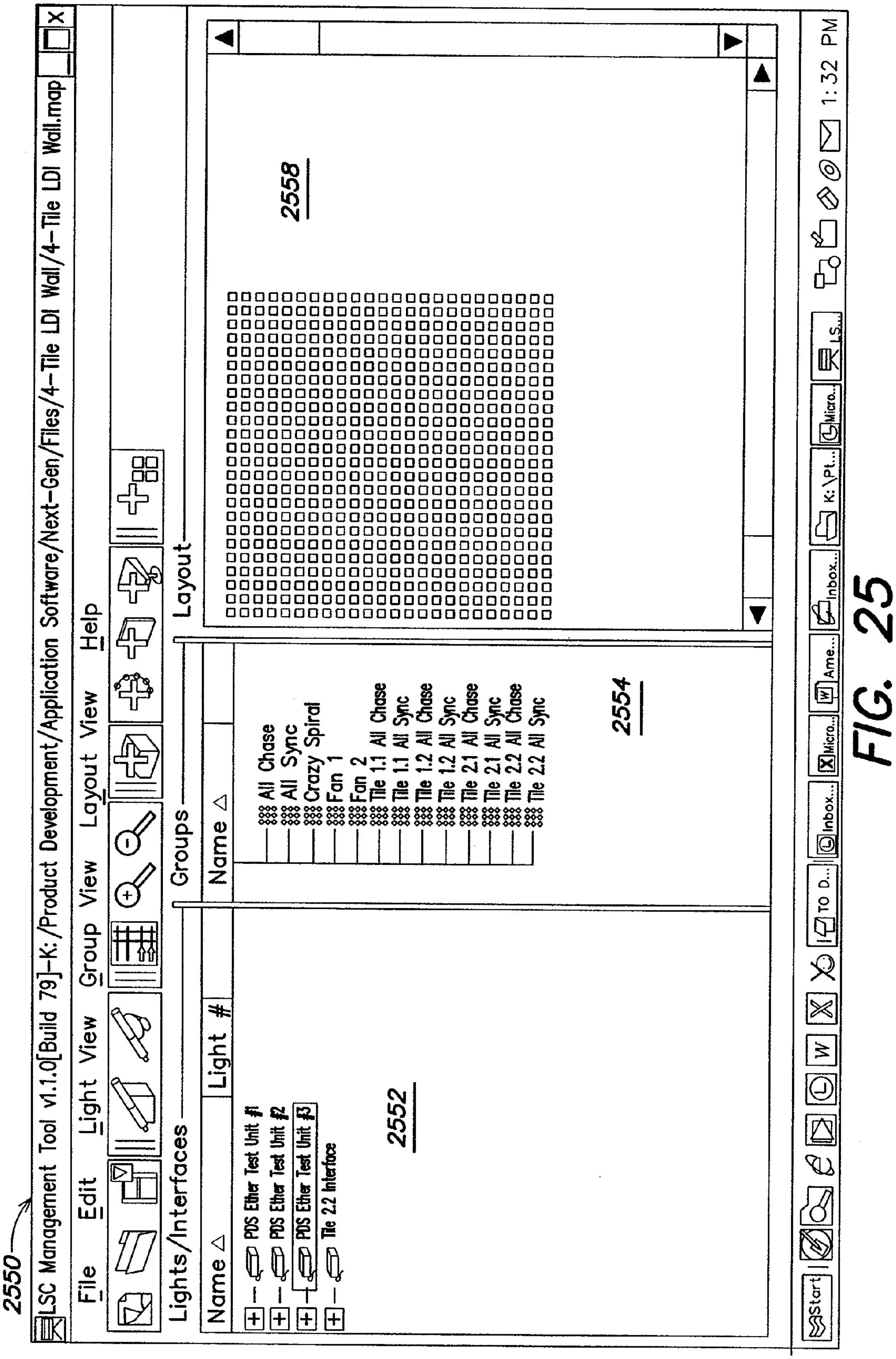
FIG. 25 shows a user interface for a mapping facility for a light system manager.

Referring to FIG. 25, the light system manager 1650 may operate in part on the authoring computer 1750, which may include a mapping facility 1658. The mapping facility 1658 may include a graphical user interface 2550, or management tool, which may assist a user in mapping lighting units to locations. The management tool 2550 may include various panes, graphs or tables, each displayed in a window of the management tool. A lights/interfaces pane 2552 lists lighting units or lighting unit interfaces that are capable of being managed by the management tool. Interfaces may include power/data supplies (PDS) 1758 for one or more lighting systems, DMX interfaces, DALI interfaces, interfaces for individual lighting units, interfaces for a tile lighting unit, or other suitable interfaces. The interface 2550 also includes a groups pane 2554, which lists groups of lighting units that are associated with the management tool 2550, including groups that can be associated with the interfaces selected in the lights/interfaces pane 2552. As described in more detail below, the user can group lighting units into a wide variety of different types of groups, and each group formed by the user can be stored and listed in the groups pane 2554. The interface 2550 also includes the layout pane 2558, which includes a layout of individual lighting units for a light system or interface that is selected in the lights/interfaces pane 2552. The layout pane 2558 shows a representative geometry of the lighting units associated with the selected interface, such as a rectangular array if the interface is an interface for a rectangular tile light, as depicted in FIG. 25. The layout can be any other configuration, as described in connection with the other figures above. Using the interface 2550, a user can discover lighting systems or interfaces for lighting systems, map the layout of lighting units associated with the lighting system, and create groups of lighting units within the mapping, to facilitate authoring of shows or effects across groups of lights, rather than just individual lights. The grouping of lighting units dramatically simplifies the authoring of complex shows for certain configurations of lighting units.

Figure 26:
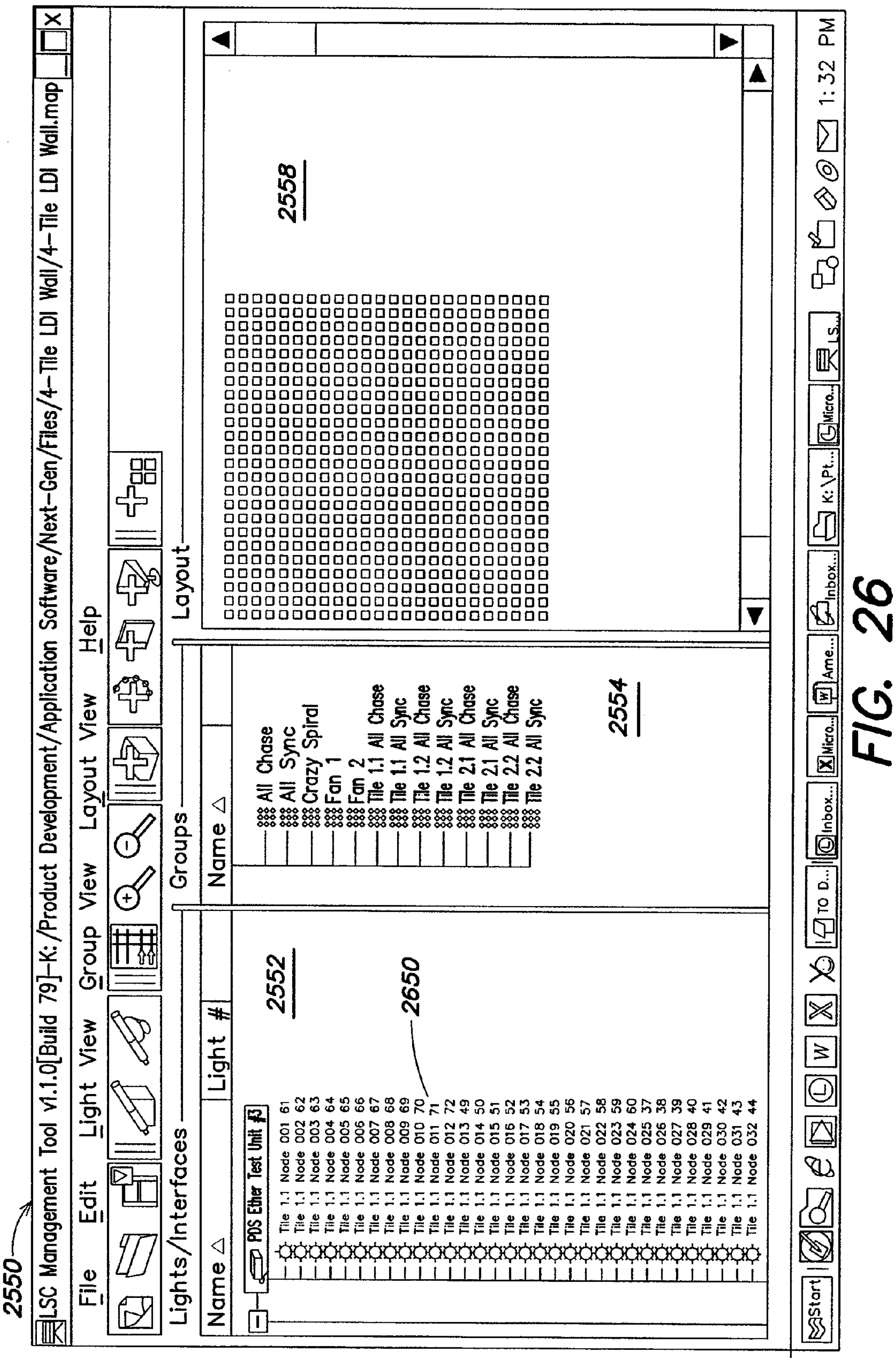
FIG. 26 shows additional aspects of the user interface of FIG. 25.

Referring to FIG. 26, further details of the lights/interfaces pane 2552 are provided. Here, by clicking the "+" sign, the user can display a list 2650 of all of the individual lighting units that are associated with a particular interface that is presented in the lights/interfaces pane 2552. The pane 2650 of FIG. 26 lists each of the nodes of a tile light, but other lighting units could be listed, depending on the configuration of lighting units associated with a particular interface.

Figure 27:
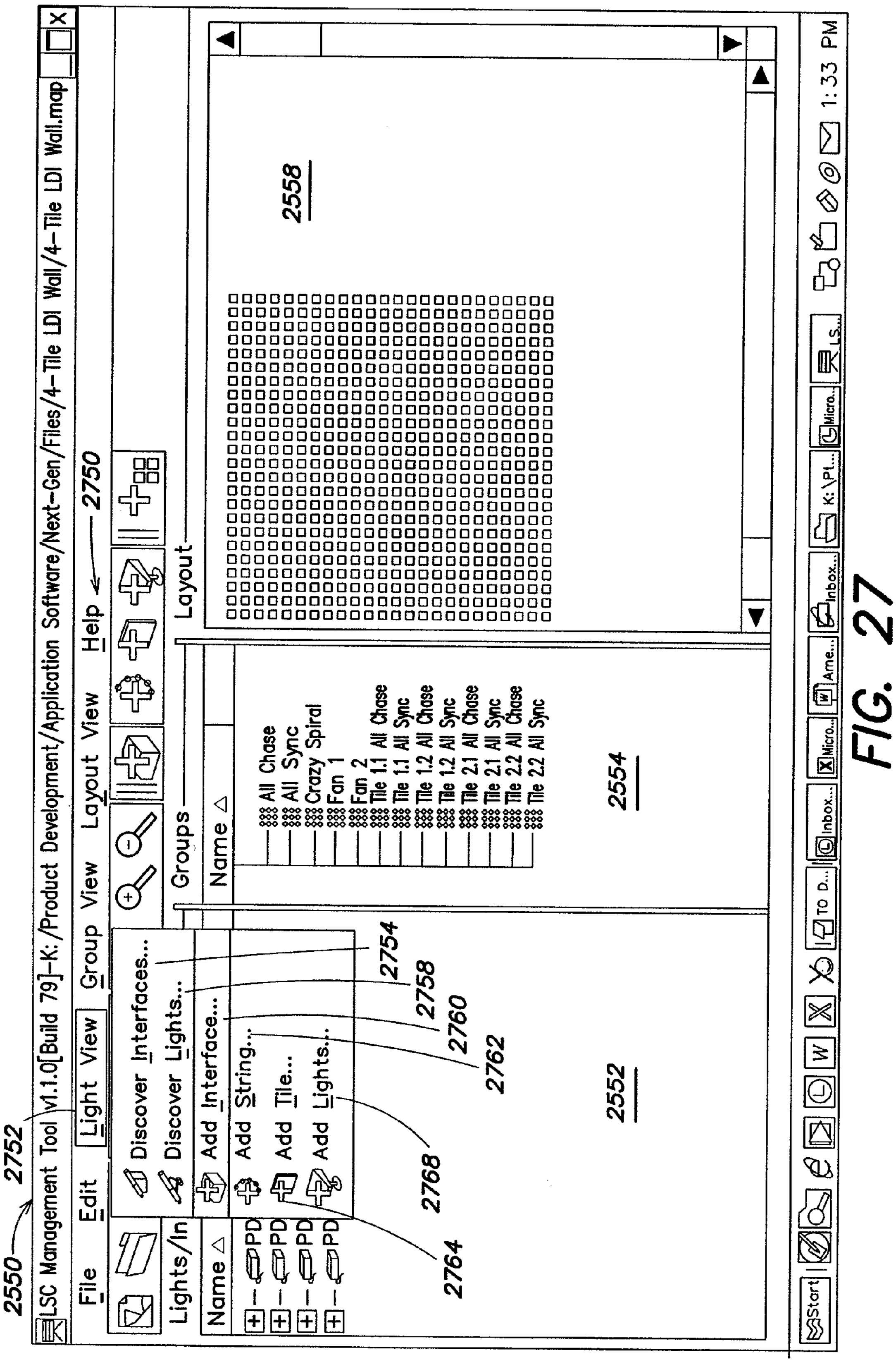
FIG. 27 shows additional aspects of the user interface of FIG. 25.

Referring to FIG. 27, the interface 2550 includes a series of menus 2750 that can be initiated by placing the mouse over the appropriate menu at the top of the display 2550. The "light view" menu 2752 opens up a menu that includes various options for the user, including discover interfaces 2754, discover lights 2758, add interfaces 2760, add string 2762, add tile 2764 and add lights 2768. Clicking on any one of those menus allows the user to initiate the associated action. The discover interfaces 2754 option initiates a wizard through which the user can discover interfaces that can be managed using the light management system 1650, such as PDS interfaces 1758 that supply power and data to various lighting units, as well as tile light interfaces for tile lights and other interfaces. The discover lights menu 2758 allows the user to discover lights that are associated with particular interfaces or that can be managed directly through the light management system 1658. The add interfaces menu 2760 allows the user to add a new interface to the lights/interfaces pane 2752. The add string menu 2762 allows the user to add a number of lighting units in a string configuration to the lights/interfaces pane 2752. The add tile menu 2764 allows the user to add a tile light interface to the lights/interfaces pane 2752. The add lights menu 2768 allows the user to add a lighting unit to the lights/interfaces pane 2752. Once the interface, light, tile, string, or other item is added to the lights/interfaces pane 2752, it can be manipulated by the interface 2550 to provide an appropriate mapping for the light management tool 1650.

Figure 28:
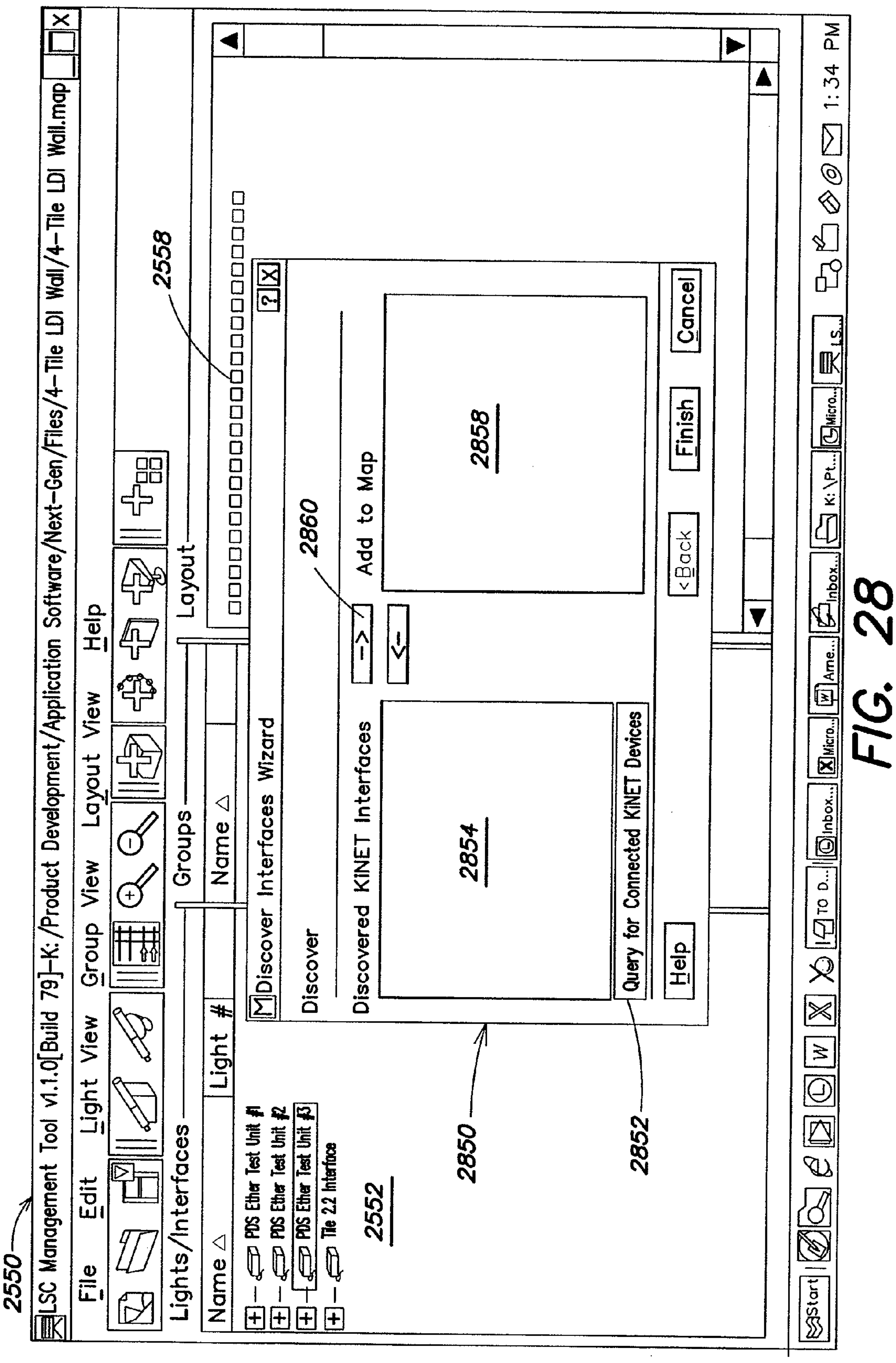
FIG. 28 shows additional aspects of the user interface of FIG. 25.

Referring to FIG. 28, when the discover interfaces button 2754 is selected in the interface 2550, after selecting the light view menu button 2752, a discover interfaces wizard 2850 appears, through which a user can add an interface to be managed by the light management system 1650. The user can click a query button 2852 to query the surrounding network neighborhood for connected devices that employ lighting system network protocols. Discovered devices appear in a discovered interfaces pane 2854. The user can click the arrow 2860 to add a discovered device (such as a PDS 1758, tile light interface, light string, or the like) to the add to map pane 2858, in which case the discovered device or interface will then appear in the lights/interfaces pane 2552 of the interface 2550, and the user will be able to initiate other actions to manage the newly discovered interface.

Figure 29:
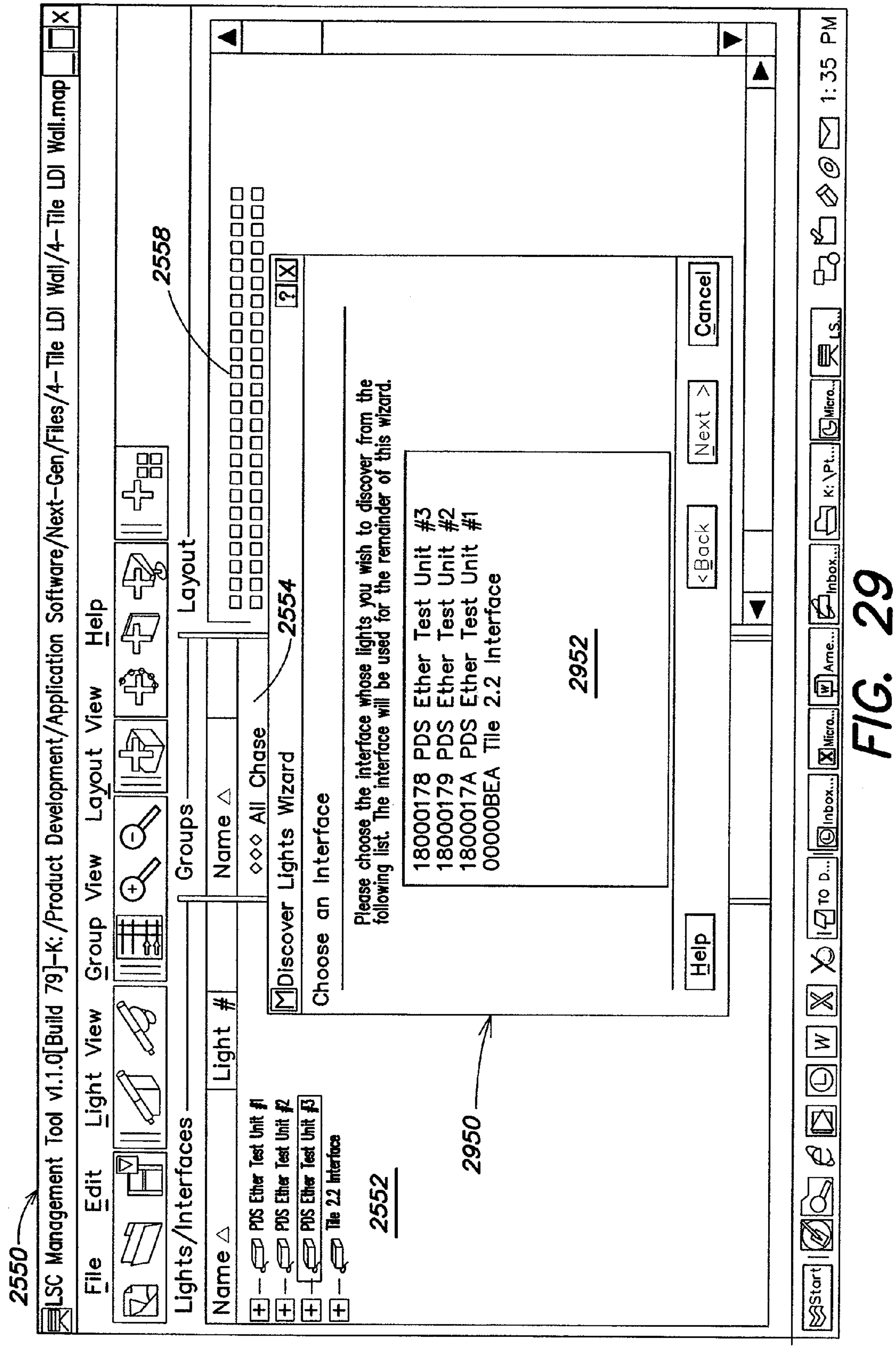
FIG. 29 shows additional aspects of the user interface of FIG. 25.

Referring to FIG. 29, when the discover lights button 2758 is selected in the interface 2550, after selecting the light view menu button 2752, a discover lights wizard 2950 appears, through which a user can discover lights that are under the control of the interfaces that appear in the lights/interfaces pane 2552. A pane 2952 allows the user to select the particular interface for which the user wishes to discover lights.

Figure 30:
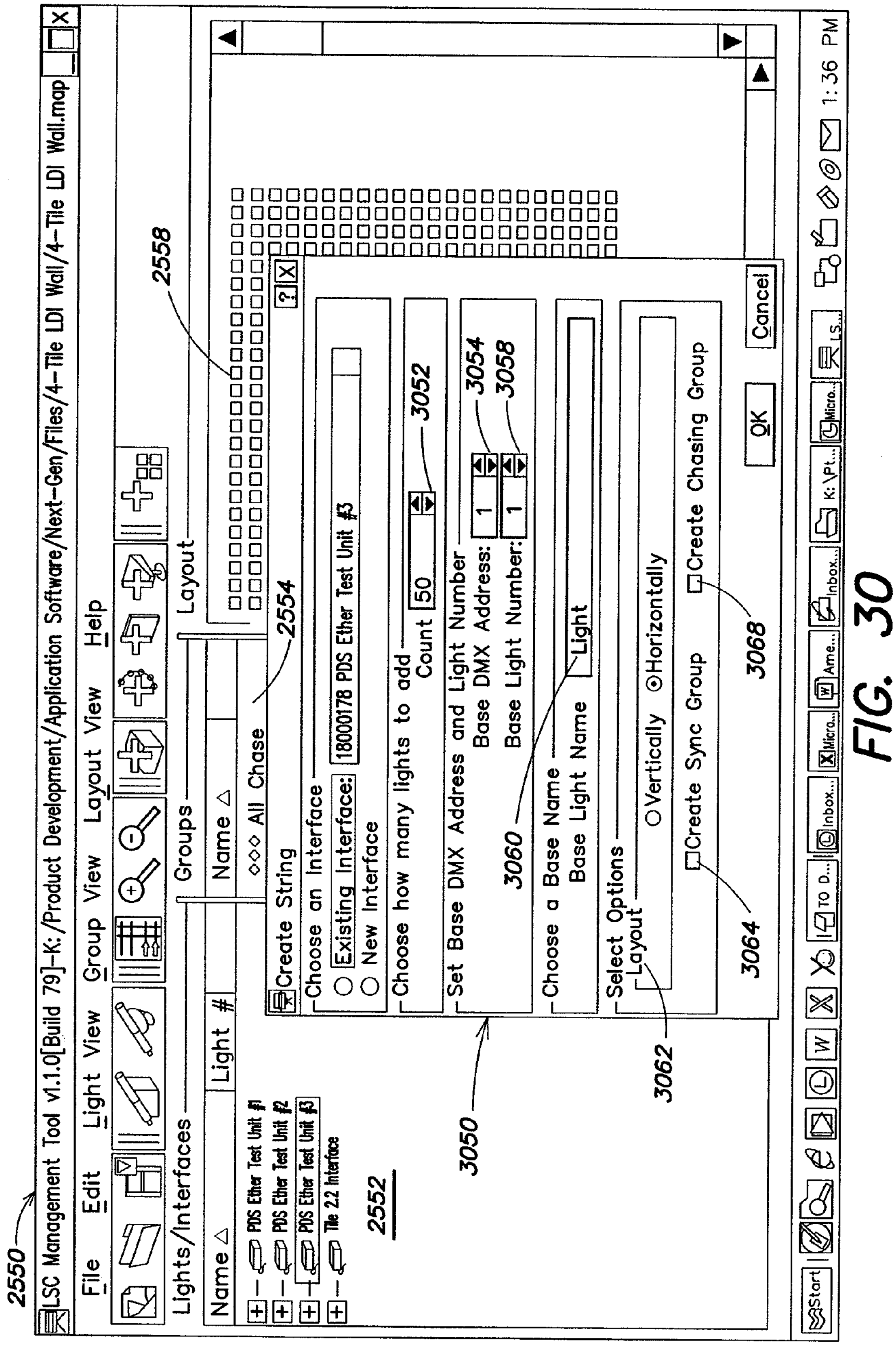
FIG. 30 shows additional aspects of the user interface of FIG. 25.

Referring to FIG. 30, when the add string button 2762 is selected from the menu that results from clicking the light view menu button 2752 in the interface 2550, a create string wizard 3050 appears that assists the user in adding a string of lights as one of the interfaces in the lights/interfaces pane 2552. In the create string wizard 3050, the user can elect to add a string to an existing interface or to a new interface. The user then indicates the number of lighting units in the string at the tab 3052. The user then sets the base DMX address for the string at the tab 3054 and sets the base light number of the string at the tab 3058. The user can then name the base light in the string with a character or string that serves as an identifier in the tab 3060. Using a button 3062, the user can elect to layout the string vertically or horizontally (or, in embodiments, in other configurations). The user can elect to create a synchronized group by placing an "x" in the button 3064. The user can elect to create a chasing group by placing an "x" in the button 3068. Thus, using the create string wizard 3050, the user names a string, assigns it to an interface, such as a PDS 1758, determines its basic layout, determines its base DMX address and base light number, and determines whether it should consist of a synchronized group, a chasing group, or neither. Similar menus can optionally be provided to add other known lighting configurations, such as a new tile, a new circle of lights, a new array of lights, a new rectangle of lights, or the like, in any desired configuration.

Figure 31:
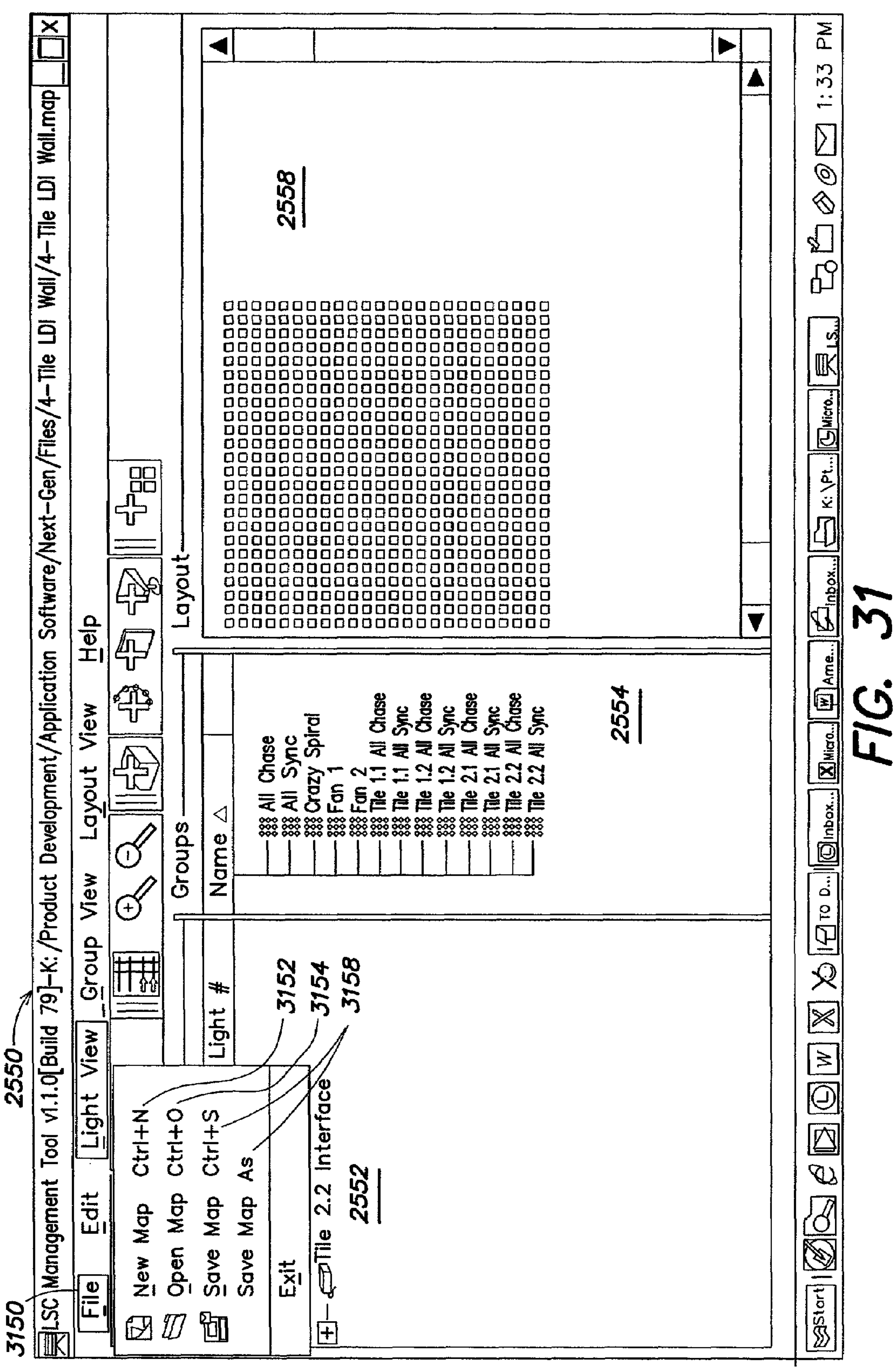
FIG. 31 shows additional aspects of the user interface of FIG. 25.

Referring to FIG. 31, by clicking the file menu 3150 of the interface 2550 the user is offered options to create a new map 3152, open an existing map 3154 or save a map 3158 (including to save the map in a different file location). Thus, maps of a given set of interfaces, lights, groups and layouts can be stored as files. A given set of light interfaces can, for example, be mapped in different ways. For example, in a stage lighting environment, the lights on two different sides of the stage could be made part of the same map, or they could be mapped as separate maps, or zones, so that the user can author shows for the two zones together, separately, or both, depending on the situation.

Figure 32:
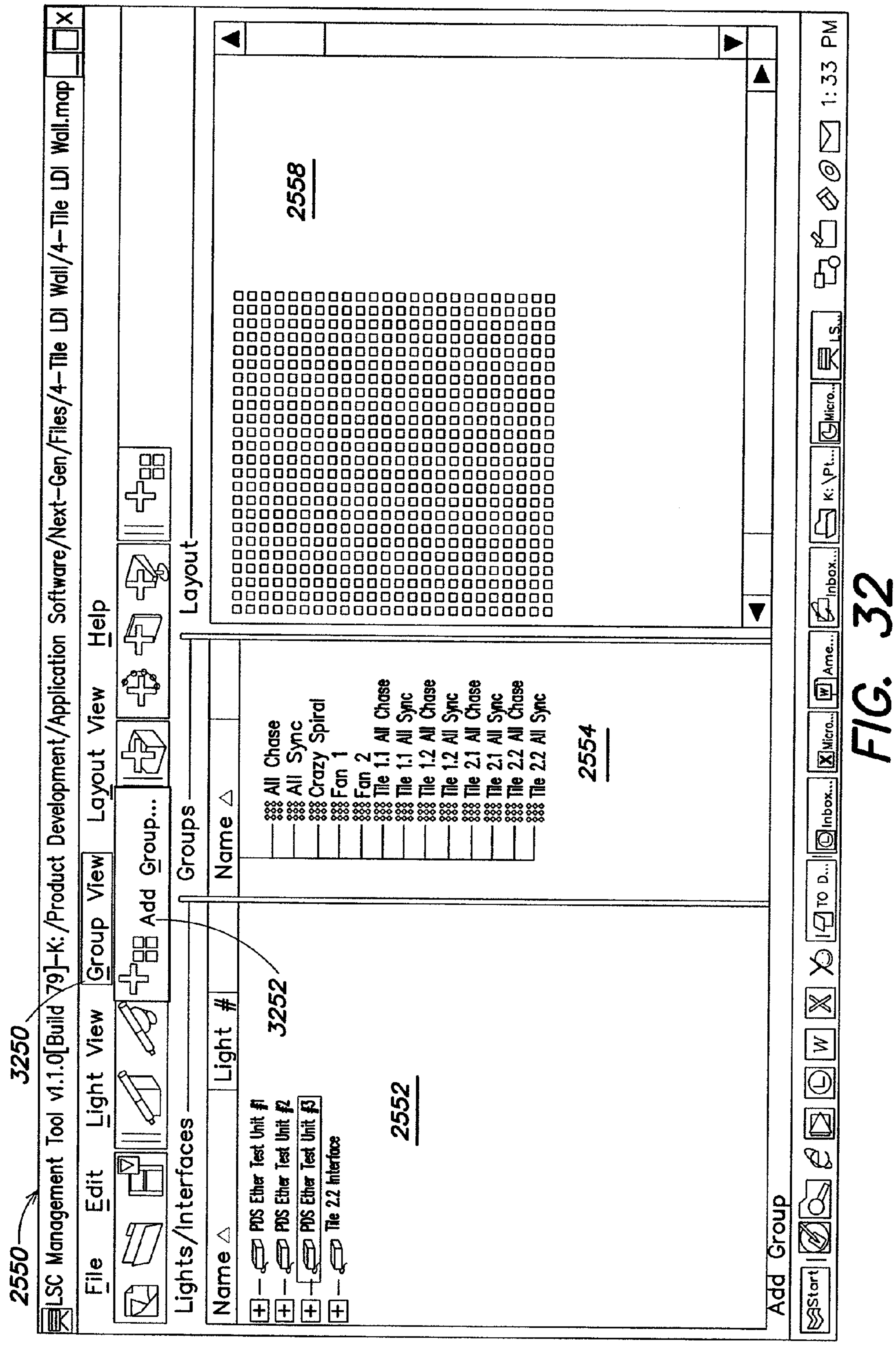
FIG. 32 shows additional aspects of the user interface of FIG. 25.

Referring to FIG. 32, by clicking the group view menu 3250 on the interface 2550, the user is offered a menu button 3252 by which the user can choose to add a group. An added group will be displayed in the group pane 2554. The ability to group lights offers powerful benefits in the composing of lighting shows using the lighting show composer 1652. Rather than having to specify color, hue, saturation or intensity values for a every specific lighting unit in a complex configuration, a user can group the lighting units, and all units in the group can respond in kind to a control signal. For example, a synchronized group of lights can all light in the same color and intensity at the same time. A chasing group of lights can illuminate in a predetermined sequence of colors, so that, for example, a rainbow chases down a string of lights in a particular order.

Figure 33:
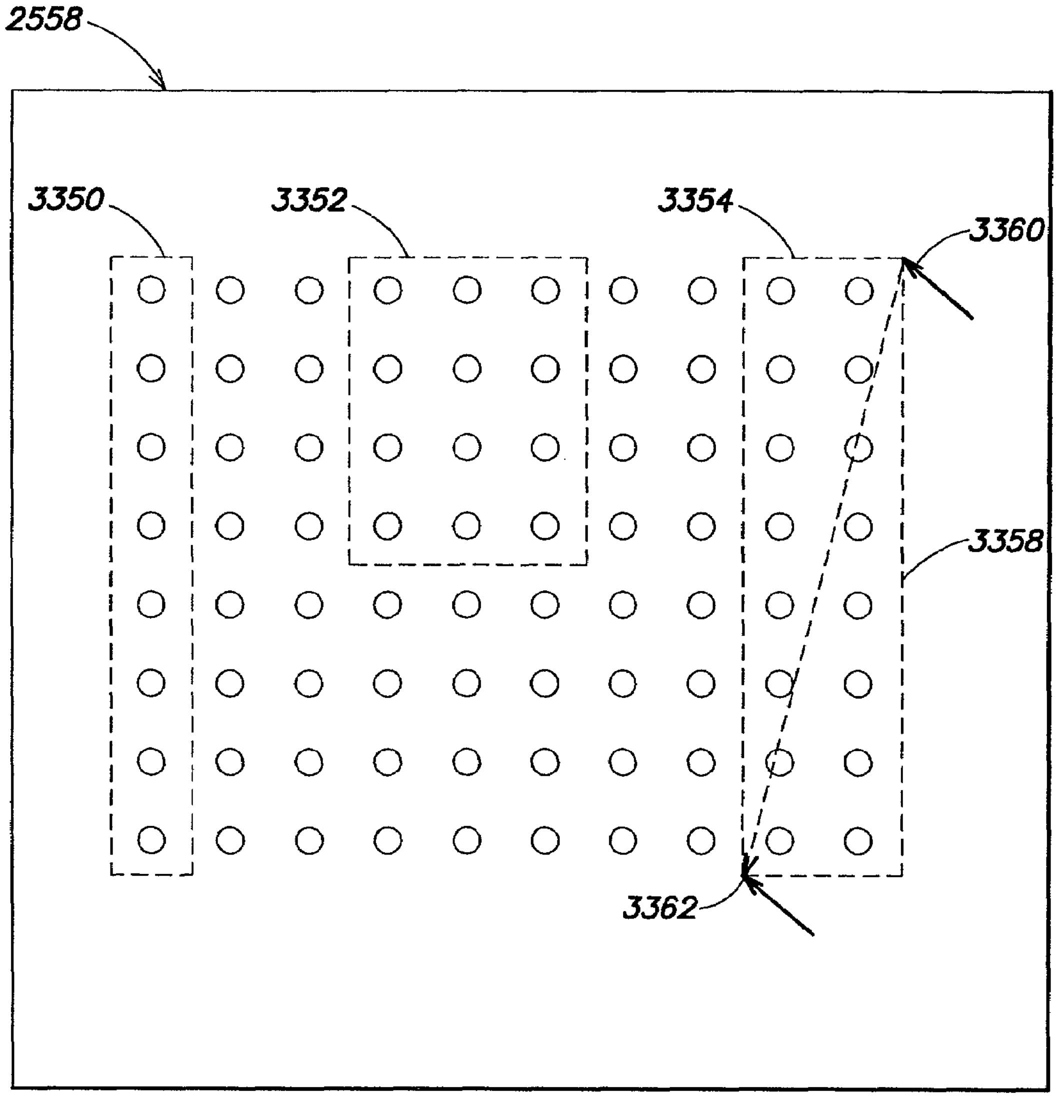
FIG. 33 shows groupings of lights within an array.

Referring to FIG. 33, groups can take various configurations. For example, a group may consist of a single line or column 3350 of lighting units, such as disposed in an array. A group can consist of a subsection of an array, such as the array 3352 or the dual column 3354. Many other groupings can be envisioned. In embodiments, a group can be formed in the layout pane 2558 by creating a "rubber band" 3358 around lights in a group by clicking the mouse at the point 3360 and moving it to the point 3362 before clicking again, so that all groups that are included in the rectangle of the rubber band 3358 are made into members of the same group.

Figure 34:
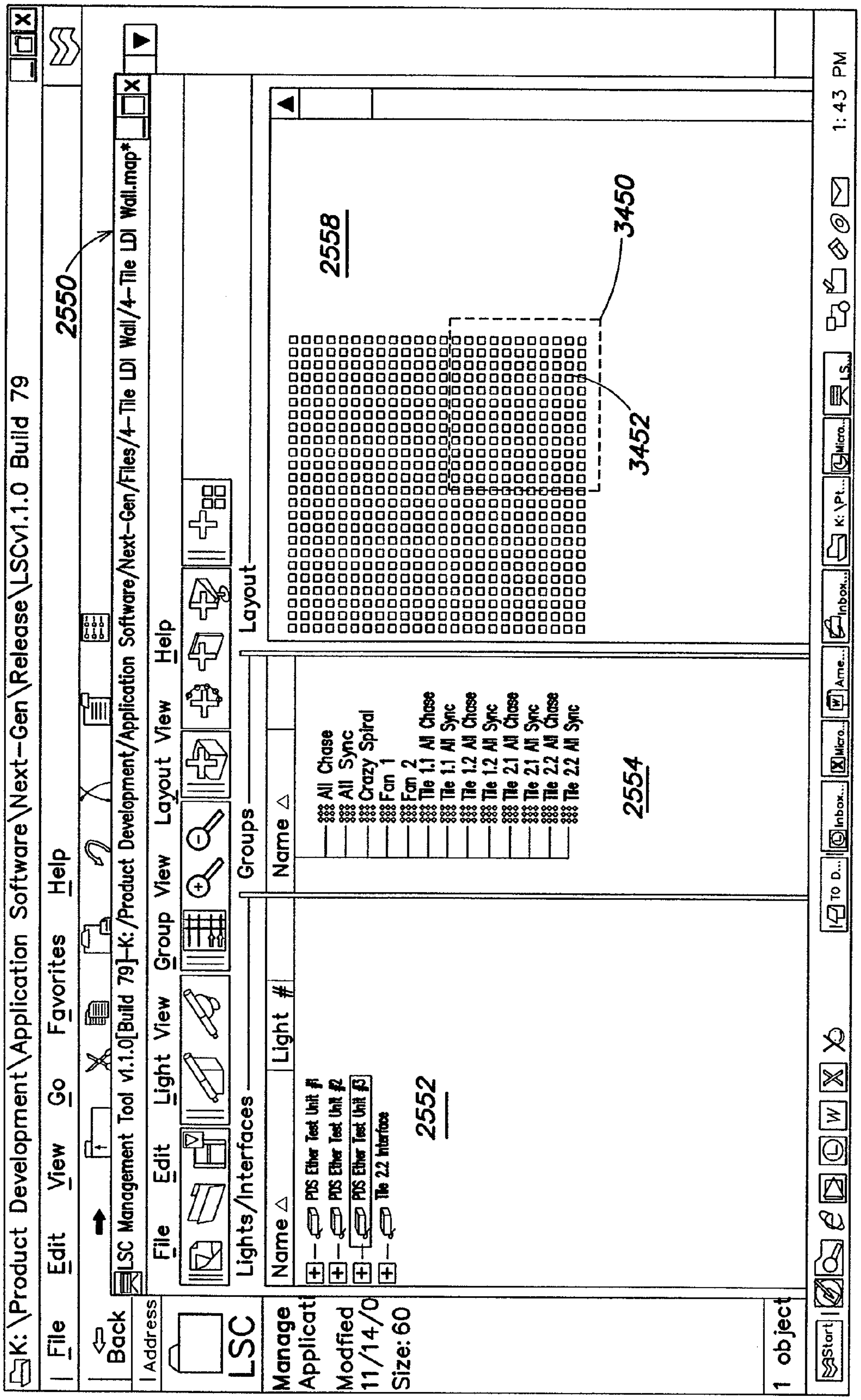
FIG. 34 shows additional aspects of the user interface of FIG. 25.
Figure 35:
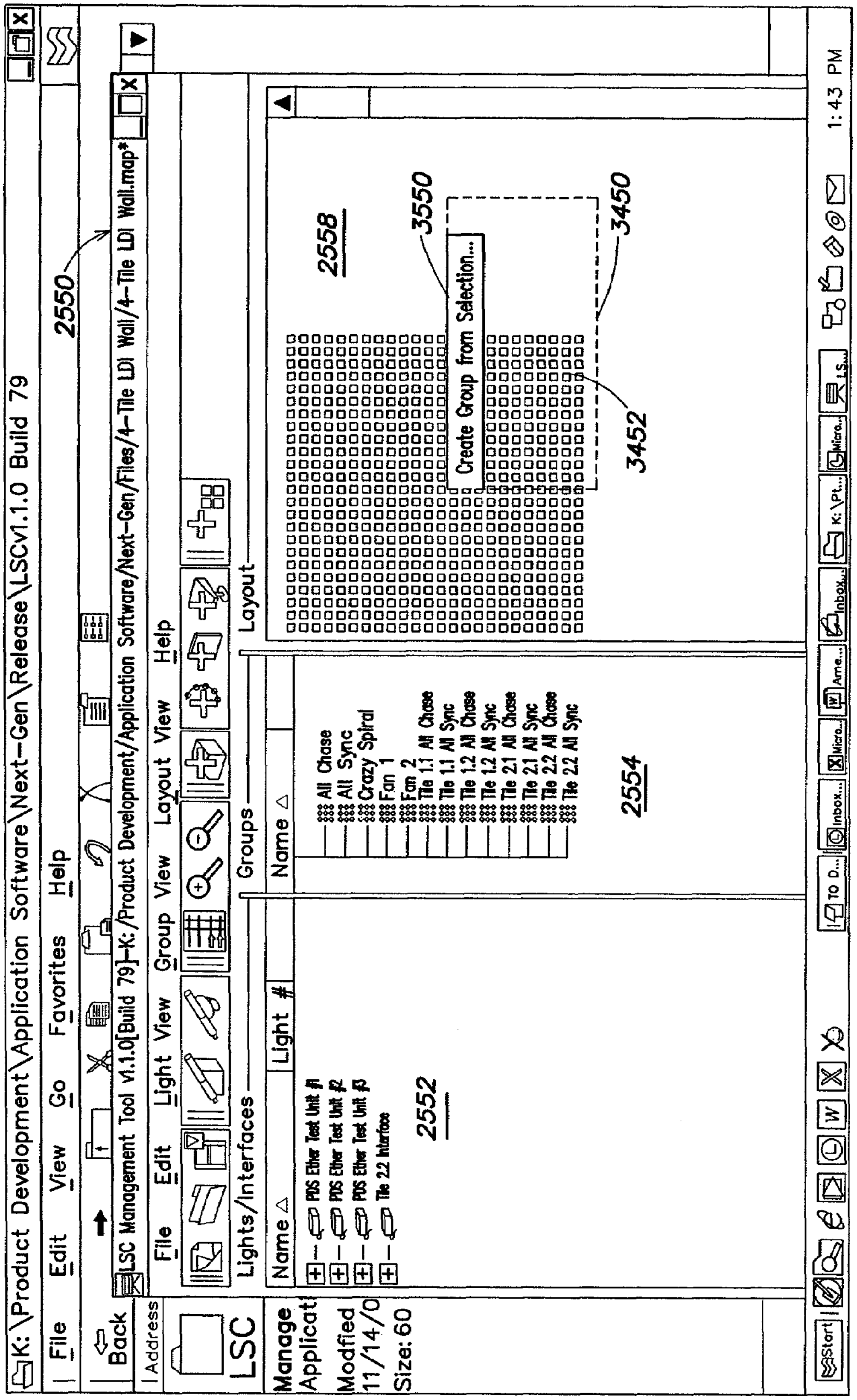
FIG. 35 shows additional aspects of the user interface of FIG. 25.

FIG. 34 shows the creation of a group 3452 by dragging a rubber band 3450 around the group in the layout pane 2558 of the interface 2550. Referring to FIG. 35, by right-clicking the mouse after forming the group with the rubber band 3450, the user can create a new group with the option 3550, in which case the group appears in the groups pane 2554.

Figure 36:
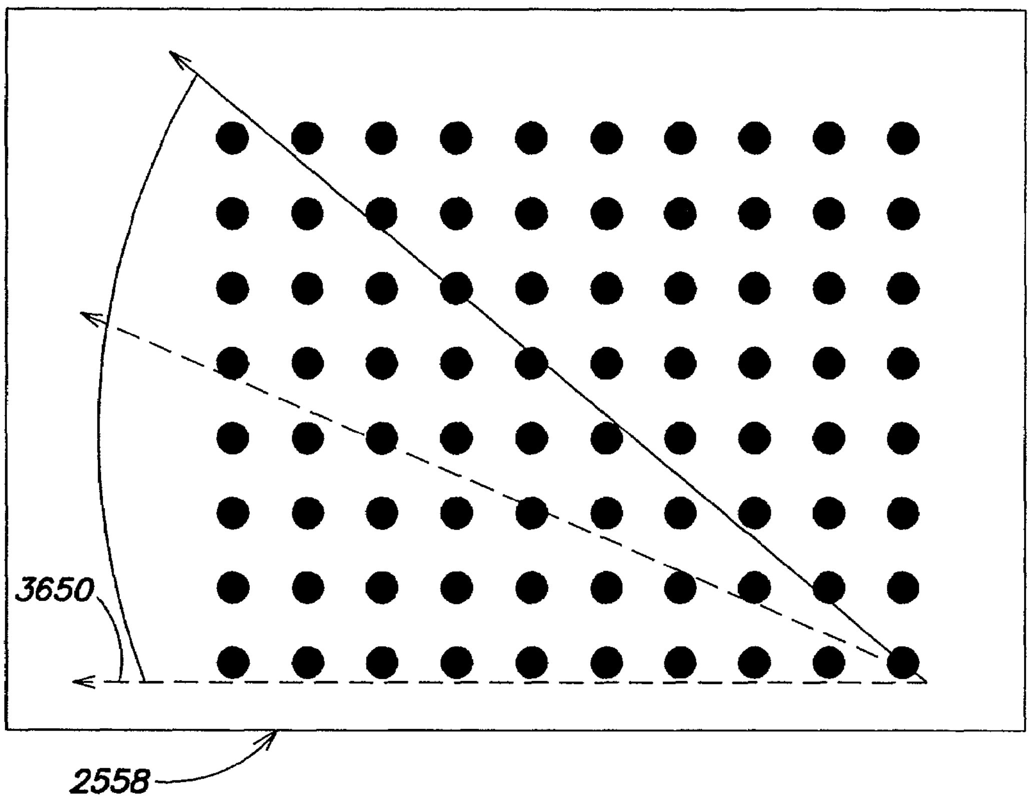
FIG. 36 shows a dragging line interface for forming groups of lighting units.

Referring to FIG. 36, groups can be created in various ways in the layout pane 2558. For example, an arrow 3650 can be dragged across a graphic depicting a layout of lighting units. Individual lighting units can be added to a group in the sequence that the lighting units are crossed by the arrow 3650, so that effects that use the group can initiate in the same sequence as the crossing of lighting units by the arrow 3650. Other shapes can be used to move across groups in the layout pane 2558, putting the lighting units in the order that the shapes cross the lighting units. Moving the arrow 3650 allows the creation of complex patterns, such as spirals, bursts, scalloped shapes, and the like, as chasing groups are created by moving lines or other shapes across a layout of lights in a desired order. The group ordering can be combined with various effects to generate lighting shows in the light show composer.

Figure 37:
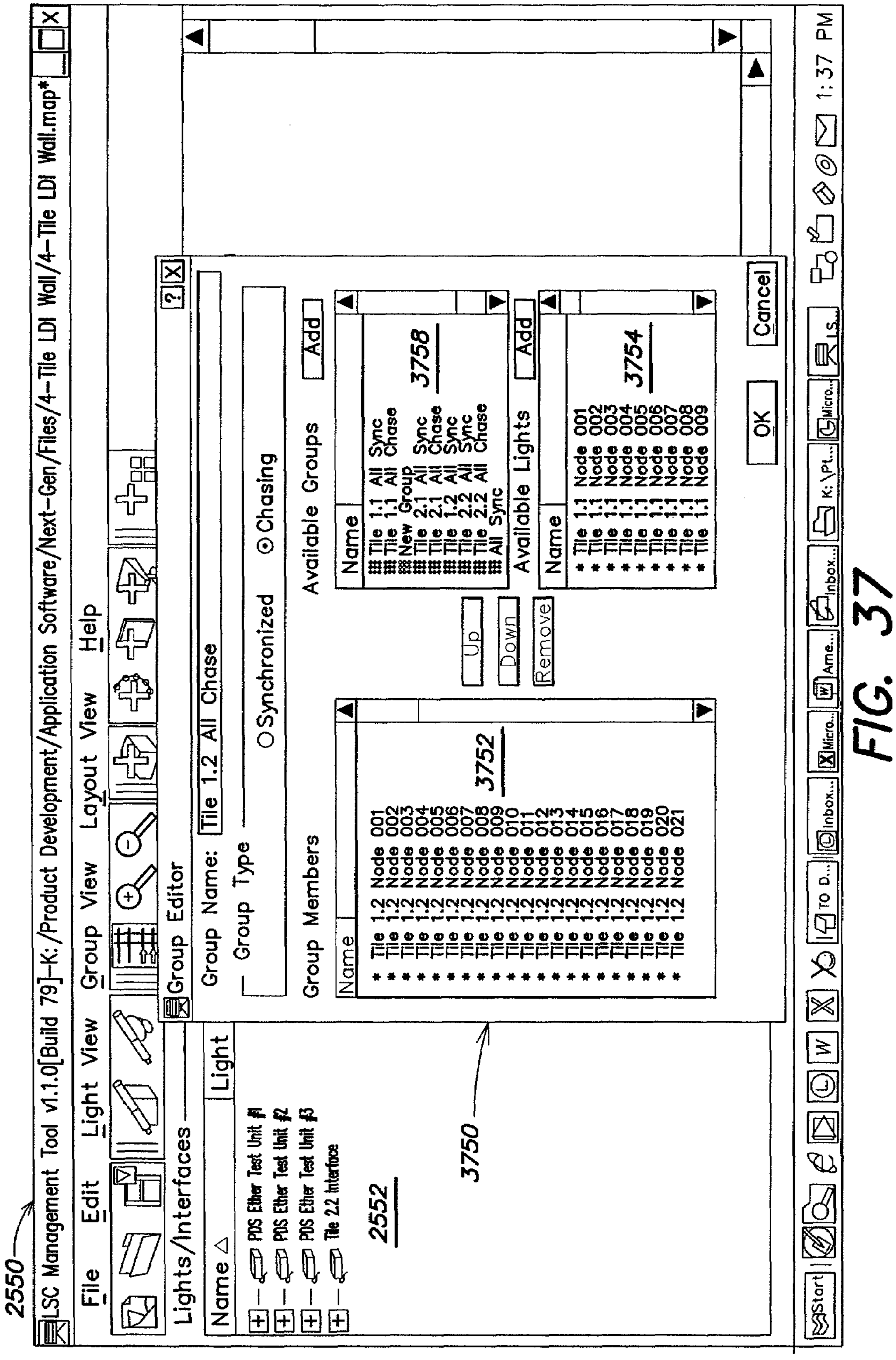
FIG. 37 shows additional aspects of the user interface of FIG. 25.

Referring to FIG. 37, by double clicking on a group in the groups pane 2554, a user can bring up a groups editor 3750, in which the user can edit characteristics of members of a group that appear in the group members pane 3752, such as by adding or deleting lighting units from the available lights pane 3754 or adding other groups from the available groups pane 3758.

Figure 38:
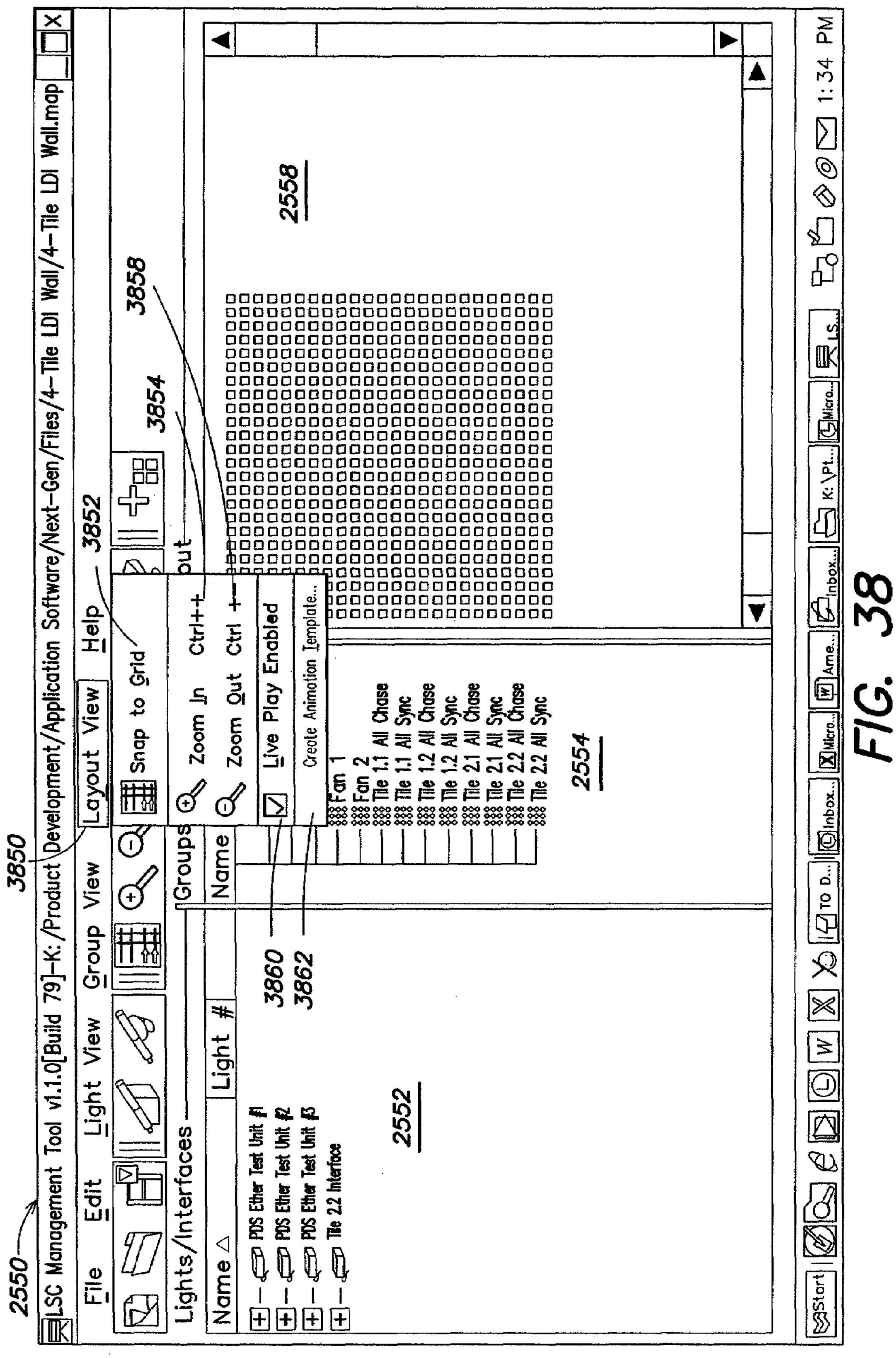
FIG. 38 shows additional aspects of the user interface of FIG. 25.

Referring to FIG. 38, various options are available to the user if the user clicks the layout view menu item 3850. Through a pull-down menu, the user can snap the layout to a grid with a button 3852. The user can zoom in with a button 3854 or zoom out with a button 3858. The user can enable live playing with a button 3860. The user can create an animation template in the layout pane 2558 with a button 3862. In embodiments, a user may be offered various other editing options for the view of the layout of lighting units in the layout pane 2558. For example, in embodiments the layout pane 2558 may be enabled with a three-dimensional visualization capability, so that the user can layout lights in a three-dimensional rendering that corresponds to a three-dimensional mapping in the real world.

Figure 39:
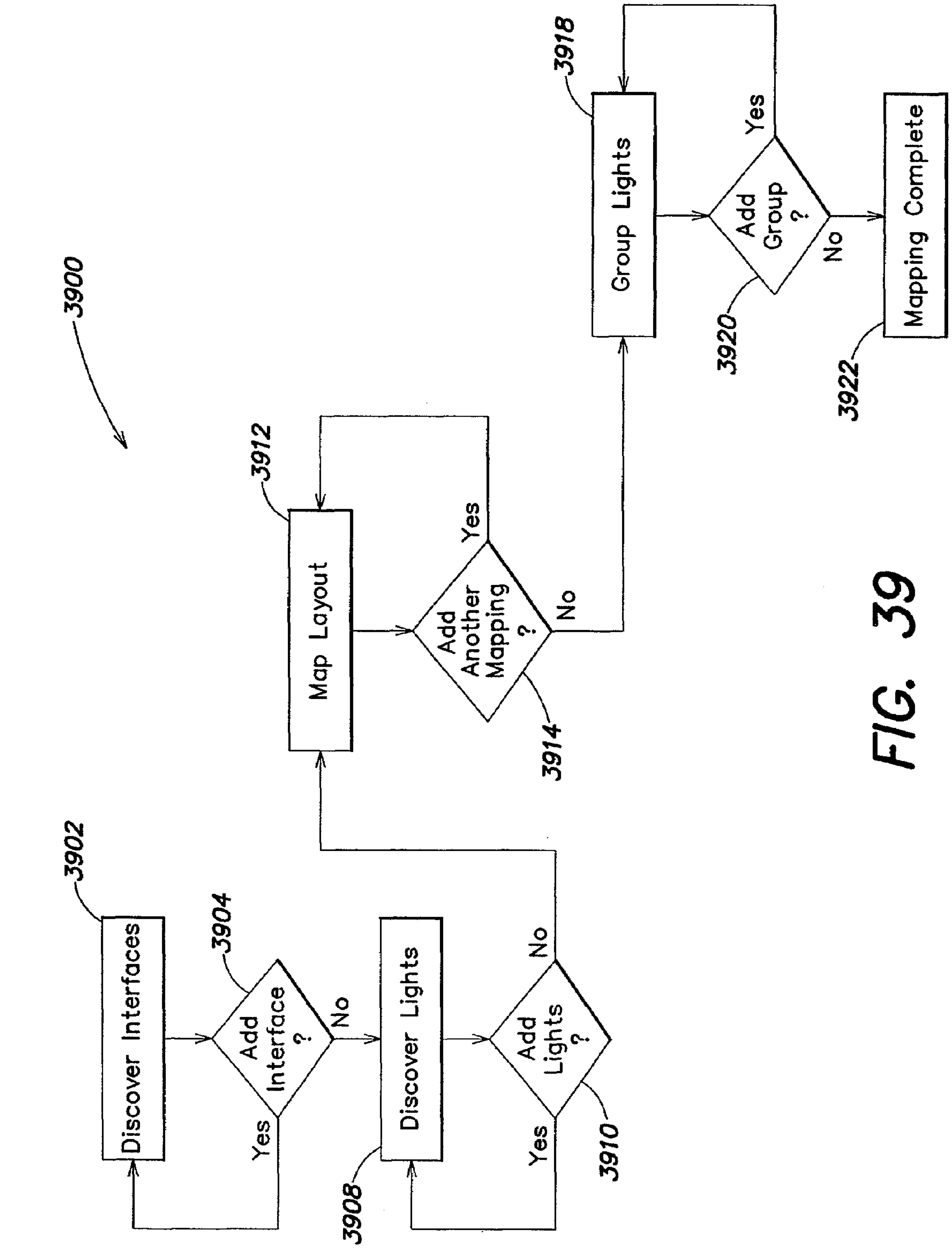
FIG. 39 is a flow diagram that shows steps for using a mapping facility of a light system manager.

Referring to FIG. 39, a flow diagram 3900 shows various steps that are optionally accomplished using the mapping facility 1658, such as the interface 2550, to map lighting units and interfaces for an environment into maps and layouts on the authoring computer 1750. At a step 3902, the mapping facility 1658 can discover interfaces for lighting systems, such as power/data supplies 1758, tile light interfaces, DMX or DALI interfaces, or other lighting system interfaces, such as those connected by an Ethernet switch. At a step 3904 a user determines whether to add more interfaces, returning to the step 3902 until all interfaces are discovered. At a step 3908 the user can discover a lighting unit, such as one connected by Ethernet, or one connected to an interface discovered at the step 3902. The lights can be added to the map of lighting units associated with each mapped interface, such as in the lights/interfaces pane 2552 of the interface 2550. At a step 3910 the user can determine whether to add more lights, returning to the step 3908 until all lights are discovered. When all interfaces and lights are discovered, in step 3912 the user can map the interfaces and lights, such as using the layout pane 2558 of the interface 2550. Standard maps can appear for tiles, strings, arrays, or similar configurations. Once all lights are mapped to locations in the layout pane 2558, a user can create groups of lights at a step 3918, returning from the decision point 3920 to the step 3918 until the user has created all desired groups. The groups appear in the groups pane 2554 as they are created. The order of the steps in the flow diagram 3900 can be changed; that is, interfaces and lights can be discovered, maps created, or groups formed, in various orders. Once all interfaces and lights are discovered, maps created and groups formed, the mapping is complete at a step 3922. Many embodiments of a graphical user interface for mapping lights in a software program may be envisioned by one of skill in the art in accordance with this invention.

Wherein the lighting systems are selected from the group consisting of an architectural lighting system, an entertainment lighting system, a restaurant lighting system, a stage lighting system, a theatrical lighting system, a concert lighting system, an arena lighting system, a signage system, a building exterior lighting system, a landscape lighting system, a pool lighting system, a spa lighting system, a transportation lighting system, a marine lighting system, a military lighting system, a stadium lighting system, a motion picture lighting system, photography lighting system, a medical lighting system, a residential lighting system, a studio lighting system, and a television lighting system.

Using a mapping facility, light systems can optionally be mapped into separate zones, such as DMX zones. The zones can be separate DMX zones, including zones located in different rooms of a building. The zones can be located in the same location within an environment. In embodiments the environment can be a stage lighting environment.

Thus, in various embodiments, the mapping facility allows a user to provide a grouping facility for grouping light systems, wherein grouped light systems respond as a group to control signals. In embodiments the grouping facility comprises a directed graph. In embodiments, the grouping facility comprises a drag and drop user interface. In embodiments, the grouping facility comprises a dragging line interface. The grouping facility can permit grouping of any selected geometry, such as a two-dimensional representation of a three-dimensional space. In embodiments, the grouping facility can permit grouping as a two-dimensional representation that is mapped to light systems in a three-dimensional space. In embodiments, the grouping facility groups lights into groups of a predetermined conventional configuration, such as a rectangular, two-dimensional array, a square, a curvilinear configuration, a line, an oval, an oval-shaped array, a circle, a circular array, a square, a triangle, a triangular array, a serial configuration, a helix, or a double helix.

Figure 40:
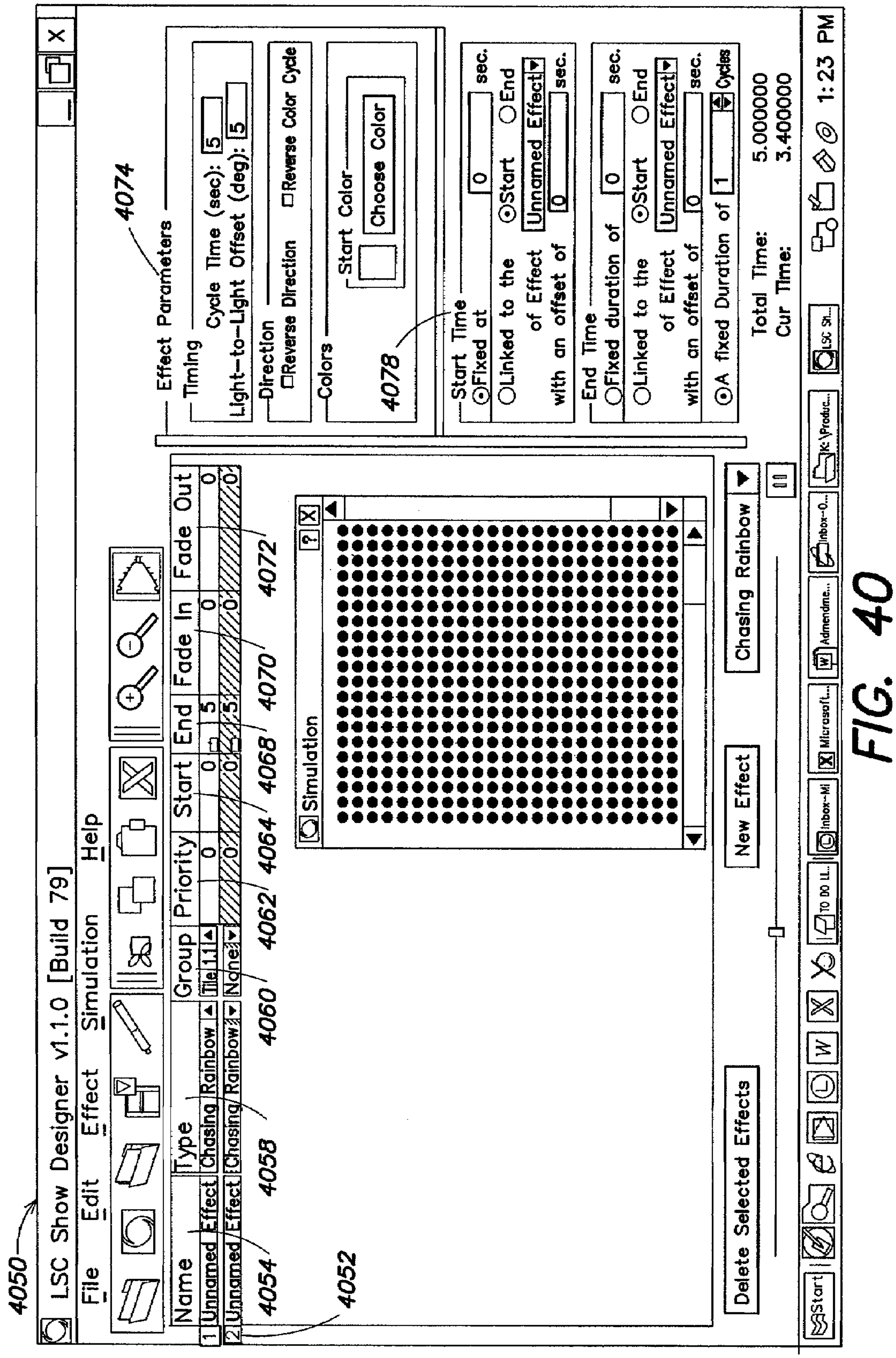
FIG. 40 shows a user interface for a light show composer.

Referring to FIG. 40, a light system composer 1652 can be provided, running on the authoring computer 1750, for authoring lighting shows comprised of various lighting effects. The lighting shows can be downloaded to the light system engine 1654, to be executed on lighting units 100. The light system composer 1652 is preferably provided with a graphical user interface 4050, with which a lighting show developer interacts to develop a lighting show for a plurality of lighting units 100 that are mapped to locations through the mapping facility 1658. The user interface 4050 supports the convenient generation of lighting effects, embodying the object-oriented programming approaches described above. In the user interface 4050, the user can select an existing effect by initiating a tab 4052 to highlight that effect. In embodiments, certain standard attributes are associated with all or most effects. Each of those attributes can be represented by a field in the user interface 4050. For example, a name field 4054 can hold the name of the effect, which can be selected by the user. A type field 4058 allows the user to enter a type of effect, which may be a custom type of effect programmed by the user, or may be selected from a set of preprogrammed effect types, such as by clicking on a pull-down menu to choose among effects. For example, in FIG. 40, the type field 4058 for the second listed effect indicates that the selected effect is a color-chasing rainbow. A group field 4060 indicates the group to which a given effect is assigned, such as a group created through the light system manager interface 2550 described above. For example, the group might be the first row of a tile light, or it might be a string of lights disposed in an environment. A priority field 4062 indicate the priority of the effect, so that different effects can be ranked in their priority. For example, an effect can be given a lower priority, so that if there are conflicting effects for a given group during a given show, the a higher priority effect takes precedence. A start field 4064 allows the user to indicate the starting time for an effect, such as in relation to the starting point of a lighting show. An end field 4068 allows the user to indicate the ending time for the effect, either in relation to the timing of the lighting show or in relation to the timing of the start of the effect. A fade in field 4070 allows the user to create a period during which an effect fades in, rather than changes abruptly. A fade out field 4072 allows the user to fade the effect out, rather than ending it abruptly. For a given selected type of effect, the parameters of the effect can be set in an effects pane 4074. The effects pane 4074 automatically changes, prompting the user to enter data that sets the appropriate parameters for the particular type of effect. A timing pane 4078 allows the user to set timing of an effect, such as relative to the start of a show or relative to the start or end of another effect.

Figure 41:
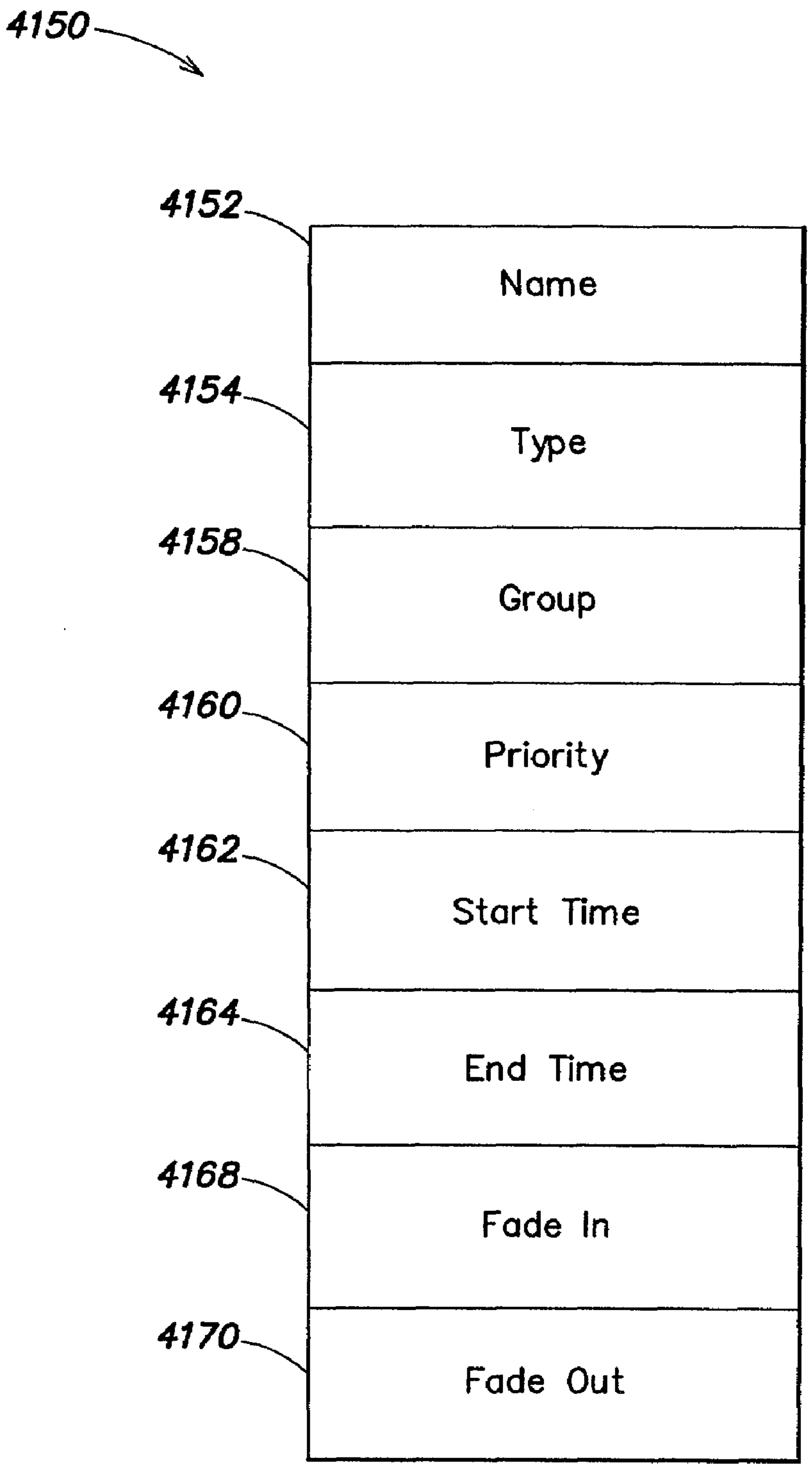
FIG. 41 shows parameters for an effect that can be composed by the light system composer of FIG. 40.

Referring to FIG. 41, a schematic 4150 indicates standard parameters that can exist for all or most effects. These include the name 4152, the type 4154, the group 4158, the priority 4160, the start time 4162, the end time 4164, the fade in parameter 4168 and the fade out parameter 4170.

Figure 42:
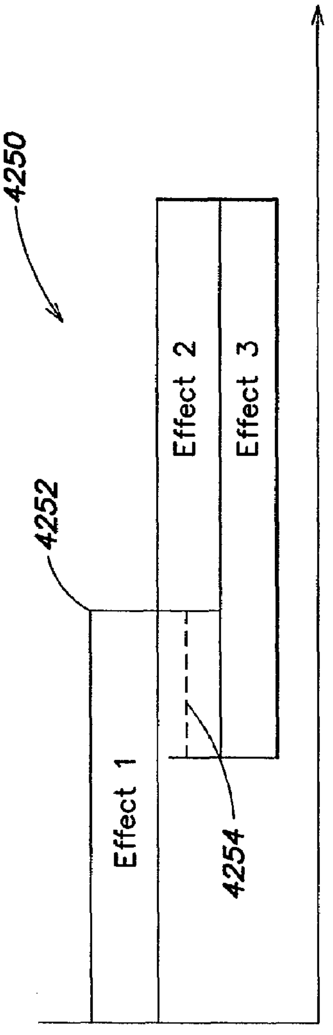
FIG. 42 shows aspects of linking of effects in a light system composer.

Referring to FIG. 42, a set of effects 4250 can be linked temporally, rather than being set at fixed times relative to the beginning of a show. For example, a second effect can be linked to the ending of a first effect at a point 4252. Similarly, a third effect might be set to begin at a time that is offset by a fixed amount 4254 relative to the beginning of the second effect. With linked timing of effects, a particular effect can be changed, without requiring extensive editing of all of the related effects in a lighting show. Once a series of effects is created, each of them can be linked, and the group can be saved together as a meta effect, which can be executed across one or more groups of lights.

Figure 43:
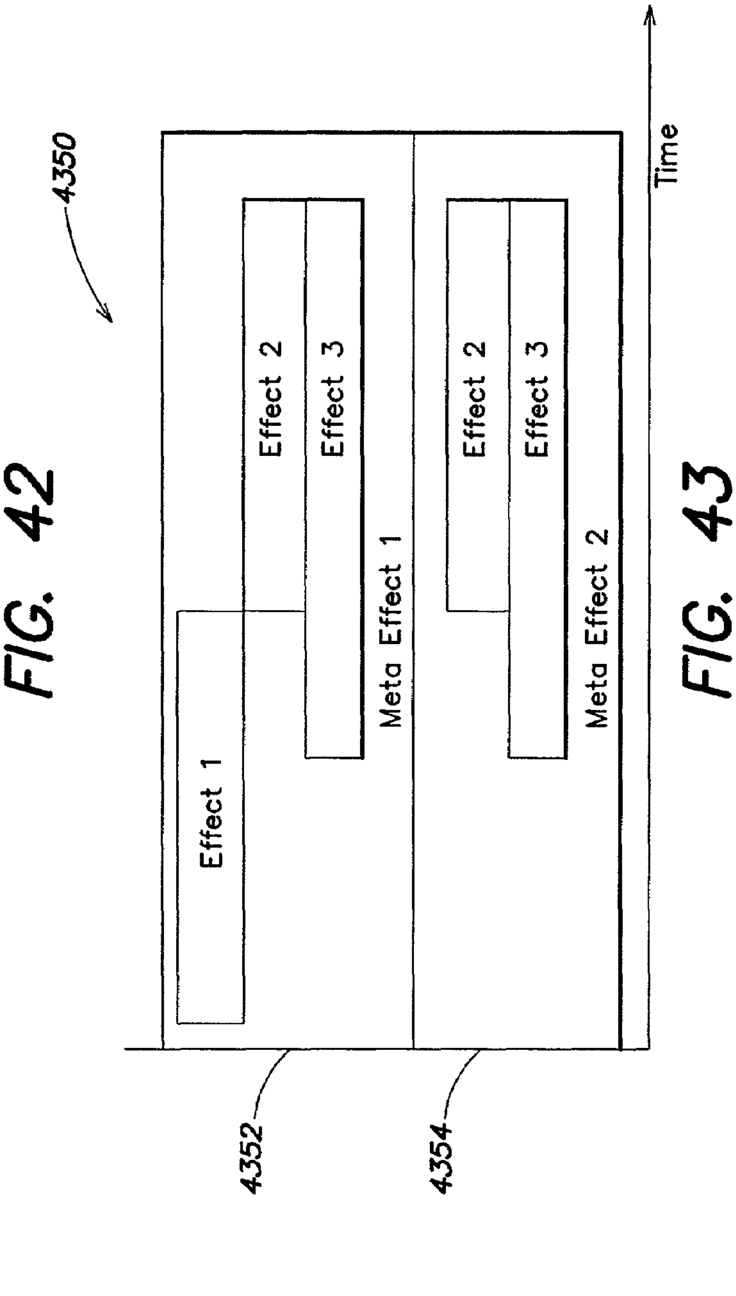
FIG. 43 shows additional aspects of linking of effects.

Referring to the schematic diagram 4350 of FIG. 43, once a user has created meta effects, the user can link them, such as by linking a first meta effect 4352 and a second meta effect 4354 in time relative to each other. Linking effects and meta effects, a user can script entire shows, or portions of shows. The creation of reusable meta effects can greatly simplify the coding of shows across groups.

Figure 44:
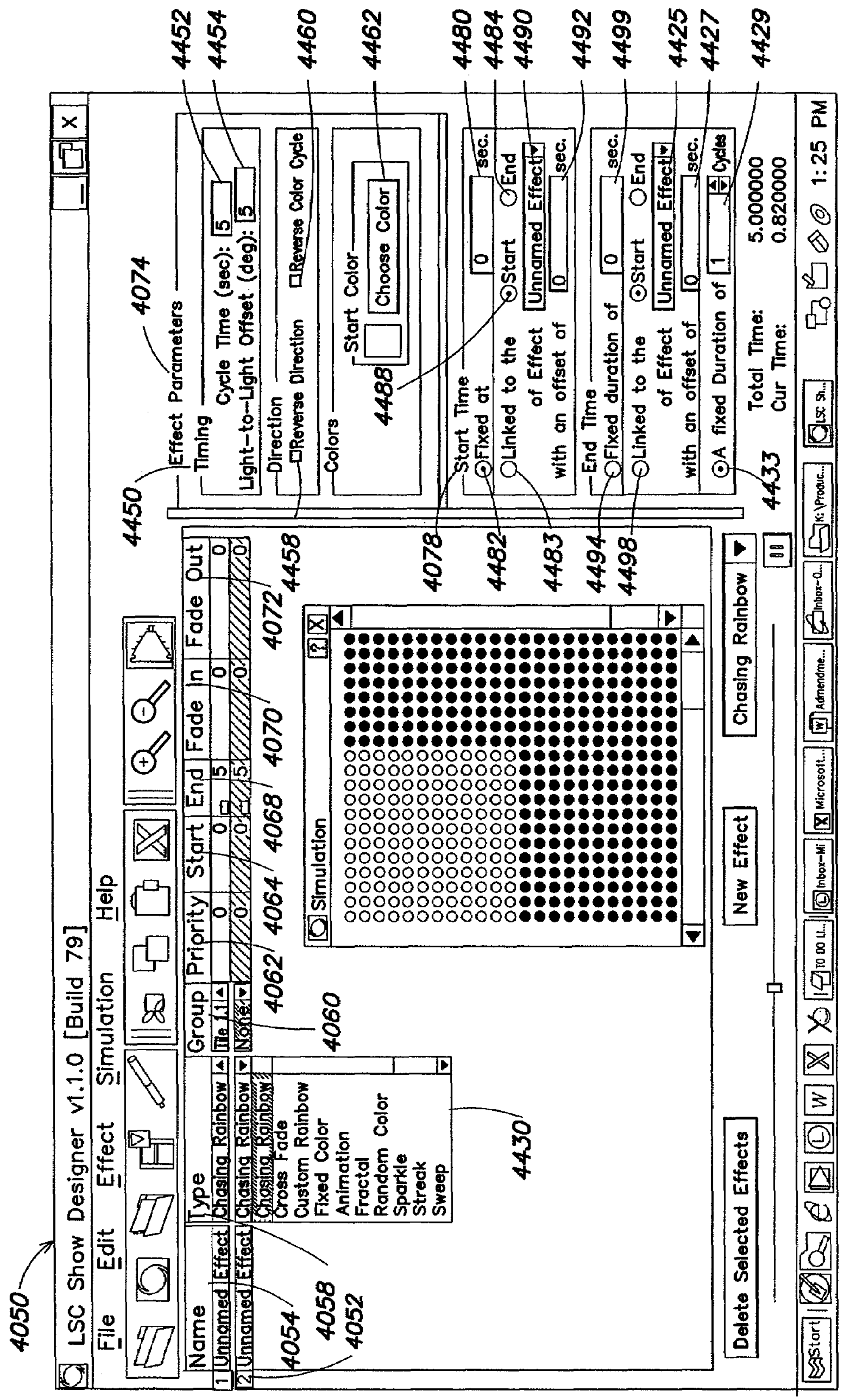
FIG. 44 shows additional aspects of a user interface for a light show composer.

Referring to FIG. 44, the user interface 4050 allows the user to set parameters and timing for various effects. First, a user can select a particular type of effect in the type field 4058, such as by pulling down the pull-down menu 4430. Once the user has selected a particular type of effect, the parameters for that effect appear in the parameters pane 4074. For example, where the effect is a color-chasing rainbow, as selected in the type field 4058 of FIG. 44, certain parameters appear in the parameters pane 4074, but if other types are selected, then other parameters appear. When the color-chasing rainbow is selected, a timing field 4450 appears, where the user can enter a cycle time in a field 4452 and light-to-light offset in a field 4454. In a field 4458, the user can elect to reverse the direction of a particular effect. The user can also elect to reverse the color cycle at a field 4460. At a field 4462, the user can select to choose a particular starting color for the rainbow, completing the setting of the parameters for the color-chasing rainbow effect.

Referring still to the interface 4050 of FIG. 44, the user sets the starting time for the particular effect. The user can elect a fixed time by selecting the button 4482, in which case the effect will start at the time entered at the field 4480, relative to the start of the show. If the user wishes to start an effect at a relative time, linked to another effect, then the user can indicated a linked timing with a button 4483, in which case the user chooses to link either to the start or end of another effect, using the buttons 4488 and 4484, and the user enters the name of the other effect to which the timing of the effect will be linked at the field 4490. The user can enter an offset in the timing of the effects at a field 4492.

Referring still to FIG. 44, the user also sets the ending time for a particular effect. The user can choose a fixed ending time by selecting the button 4494 and entering the time (relative to the start of the lighting show, for example) at the field 4499. If the user wishes to use timing linked to other effects, rather than relative to the start of the show, the user indicates so by indicating that the effect will be linked at the button 4498. As with the start of effects, the user elects either the start or the end of the other effect as the timing and enters the name of the other effect at the field 4425. The user indicates the duration of any desired offset at a field 4427. Rather than linking to a fixed time relative to the beginning of the show or linking to another effect, the user can also set a fixed duration for the effect by selecting the button 4433 and entering the duration at the field 4429.

The user interface 4050 of FIGS. 40 and 44 is representative of a wide range of potential user interfaces that allow a user to create effects and to assign parameters to those effects, including timing parameters, including ones that link particular effects to other effects. Many different effects can be generated, in each case consisting of a set of control instructions that govern the intensity, saturation, color, hue, color temperature, or other characteristic of each lighting unit 100 in a group of lighting units 100 along a timeline. Thus, effects consist of sets of control instructions, groups allow a user to apply control instructions across more than one lighting unit 100 at a time, and parameters allow the user to modify attributes of the effects. Meta effects allow users to build larger effects, and eventually shows, from lower level effects. Once a user has created an effect, meta effect, or show, it can be stored, so that it can be accessed for later purposes, such as to build other effects, meta effects, or shows, or it can be edited, such as by changing parameters or timing in the user interface 4050.

Figure 45:
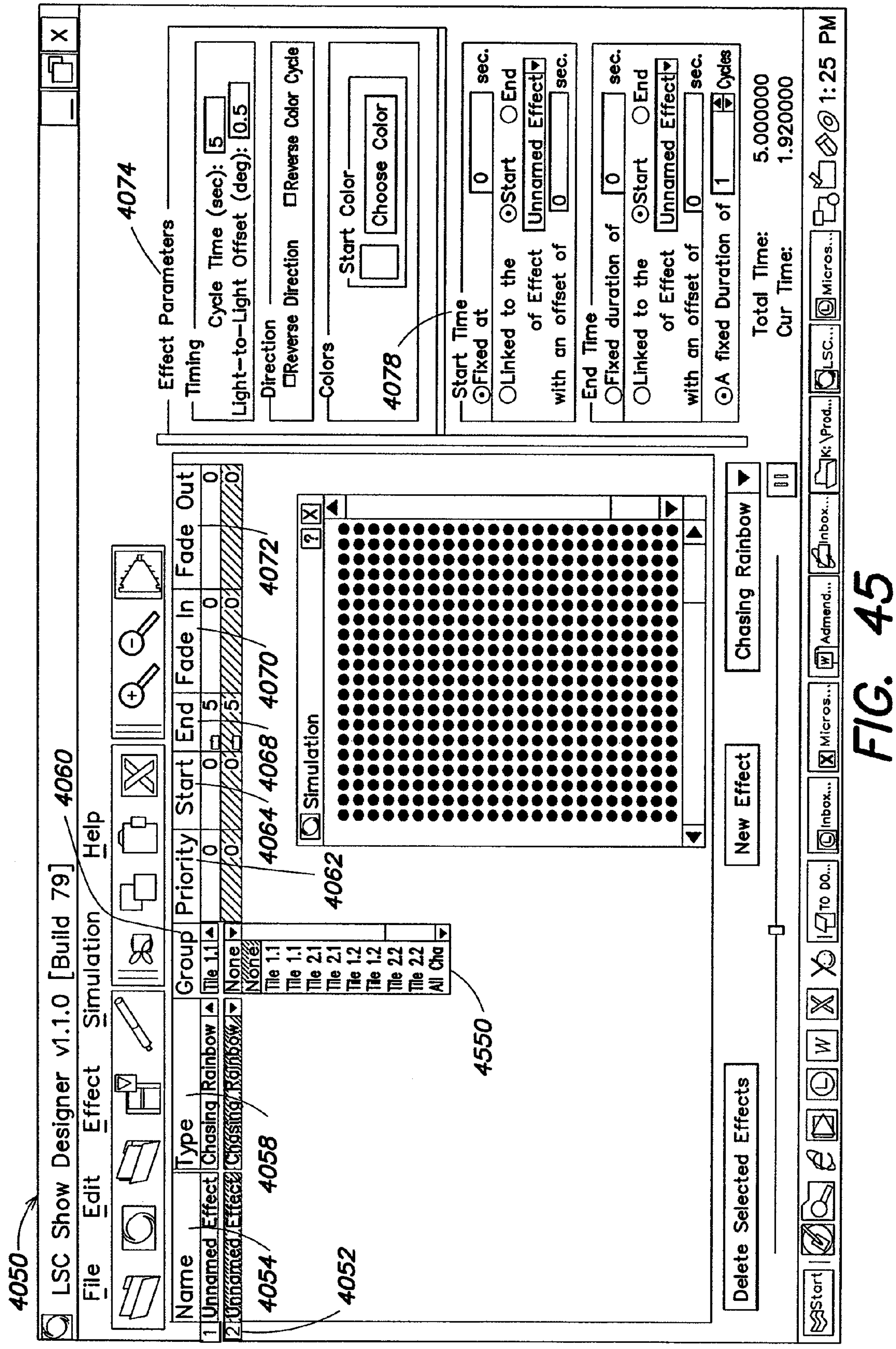
FIG. 45 shows additional aspects of a user interface for a light show composer.

Referring to FIG. 45, a user can select a group to which the user wishes to apply an effect, such as by selecting a pull-down menu 4550 in the user interface 4050. The group can be, for example, any group that is mapped according to the mapping facility 1658 of the authoring computer 1750. The group might be a group of a tile light, a string light, a set of addressable lighting units, a column of an array, a group created by dragging a rubber band in the user interface 2550, a group created by dragging a line or arrow across the group in a particular order, a synchronized group, a chasing group, or another form of group. Selecting a group automatically loads the attributes of the group that were stored using the user interface 2550 of the mapping facility 1658 of the light system manager 1650.

Figure 46:
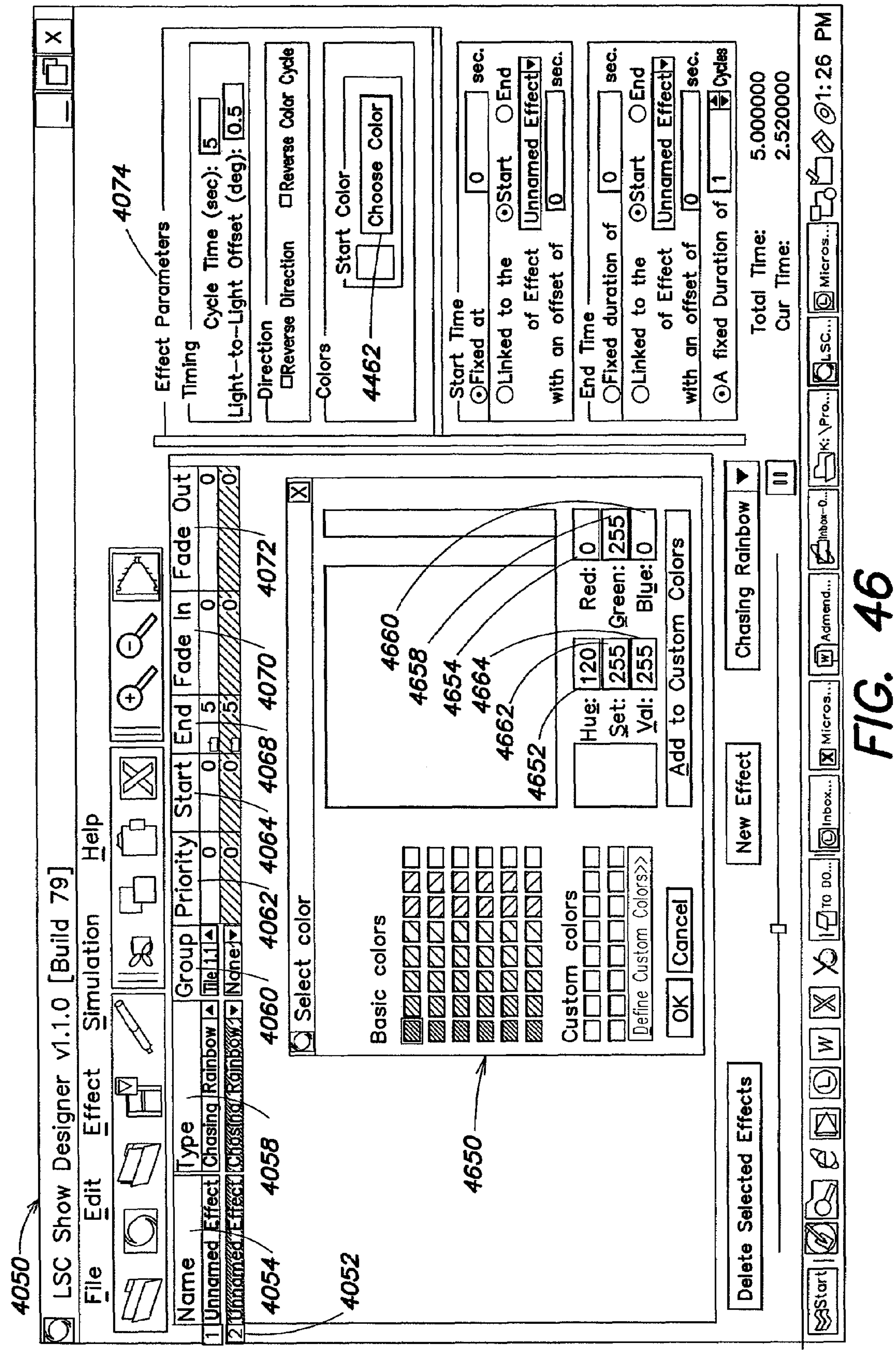
FIG. 46 shows additional aspects of a user interface for a light show composer.

Referring to FIG. 46, when the user selects the choose color button 4462 in the user interface 4050, a palette 4650 appears, from which the user can select the first color of a color chasing effect, such as a color-chasing rainbow. Similarly, the palette 4650 may appear to select a color for a fixed color effect, or for a starting color for any other effect identified above. If the effect is a custom rainbow, then the user can be prompted, such as through a wizard, to select a series of colors for a color chasing rainbow. Thus, the palette 4650 is a simple mechanism for the user to visualize and select colors for lighting effects, where the palette colors correspond to real-world colors of the lighting units 100 of a lighting system that is managed by the light system manager 1650. Using fields of the palette 4650, a user can create custom colors and otherwise specify values for the lighting unit 100. For example, using a field 4652, the user can set the hue numerically within a known color space. Using a field 4654, the user can select the red value of a color, corresponding to the intensity, for example, of a red LED in a triad of red, green and blue LEDs. Using a field 4658 the user can select a green value, and using a field 4660 the user can select a blue value. Thus, the user can select the exact intensities of the three LEDs in the triad, to produce an exactly specified mixed color of light from a lighting unit 100. Using a field 4662, the user can set the saturation of the color, and using a field 4664, the user can set the value of the color. Thus, through the palette 4650, a user can exactly specify the lighting attributes of a particular color for a lighting unit 100 as the color appears in a specified effect. While red, green and blue LEDs appear in the palette 4650, in other embodiments the LEDs might be amber, orange, ultraviolet, different color temperatures of white, yellow, infrared, or other colors. The LED fields might include multiple fields with different wavelength LEDs of a similar color, such as three different wavelengths of white LED.

Figure 47:
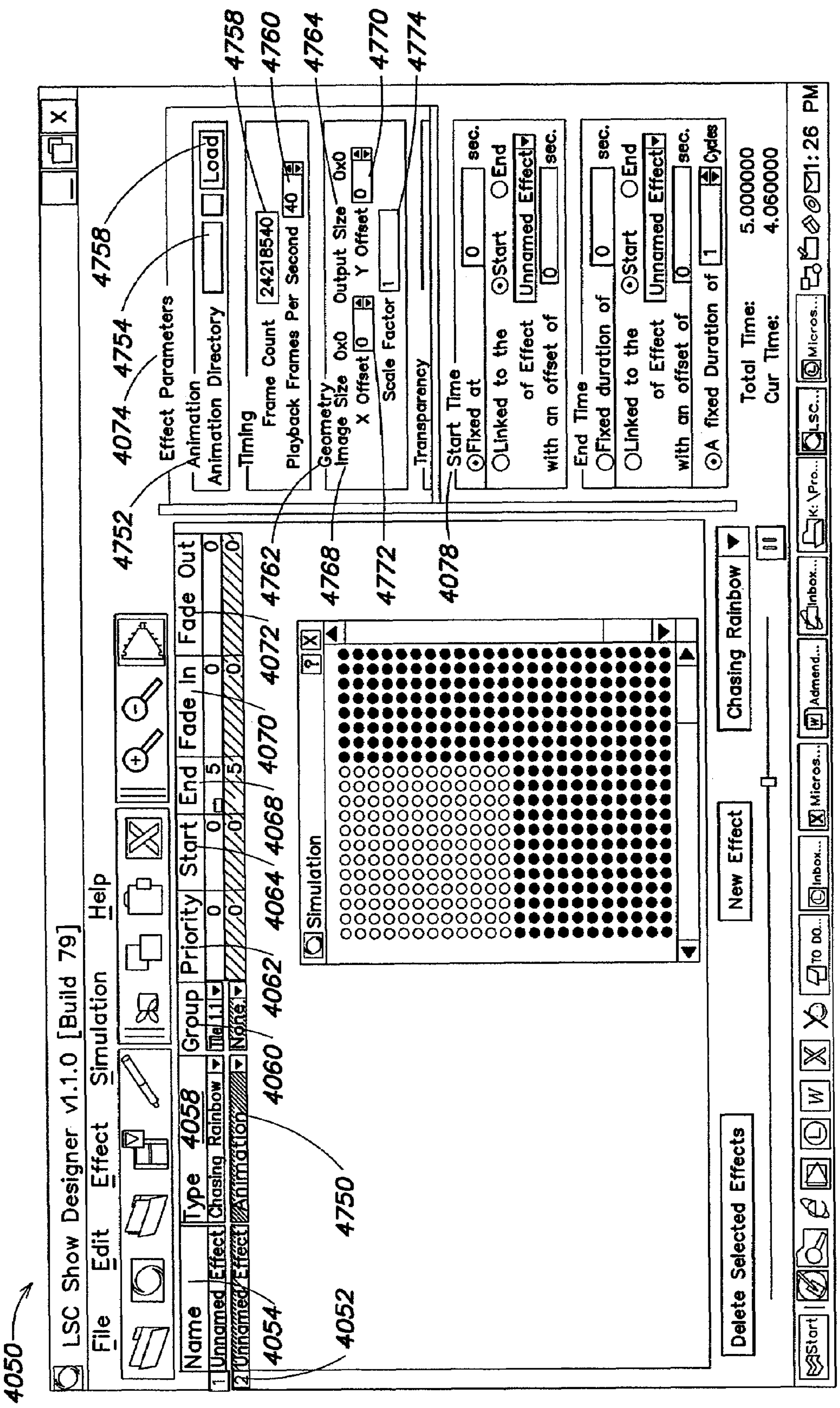
FIG. 47 shows additional aspects of a user interface for a light show composer.

Referring to FIG. 47, a user can select an animation effect 4750, in which case the effect parameters pane 4074 presents parameters that are relevant to animation effects. An animation effect might be generated using software. An example of software used to generate a dynamic image is Flash 5 computer software offered by Macromedia, Incorporated. Flash 5 is a widely used computer program to generate graphics, images and animations. Other useful products used to generate images include, for example, Adobe Illustrator, Adobe Photoshop, and Adobe LiveMotion. In the parameters pane 4074, the user can set parameters for the animation effect. As described above, the pixels of the animation can drive colors for a lighting show, such as a show that is prepared for display on an array or tile light, with the lighting units 100 that make up the tile or array being addressed in a way that corresponds to pixels of the animation, as described above. In the parameters pane 4074, an animation pane 4752 appears, in which a user can enter an animation director in a field 4754 and load the animation by selecting the load button 4758, in which case the particular animation loads for further processing. In addition to the usual timing parameters in the timing pane 4078, the user can set timing parameters that relate to the animation, such as the number of frames, in a field 4758, and the number of frames per second in a field 4760. The user can also determine a geometry for the animation, using a geometry pane 4762. The user can set the image size 4768 and the output size 4764. The user can also offset the image in the X direction using an offset field 4772 and in the Y direction using another offset field 4770. The user can also set a scaling factor for the animation, using a field 4774. By setting these parameters, a user can connect an animation to a lighting show, so that lighting units conduct displays that correspond to an animation that appears on the user's computer screen (or runs on the light system engine 1654). The animation effect thus embodies many of the geometric authoring techniques described above.

Figure 48:
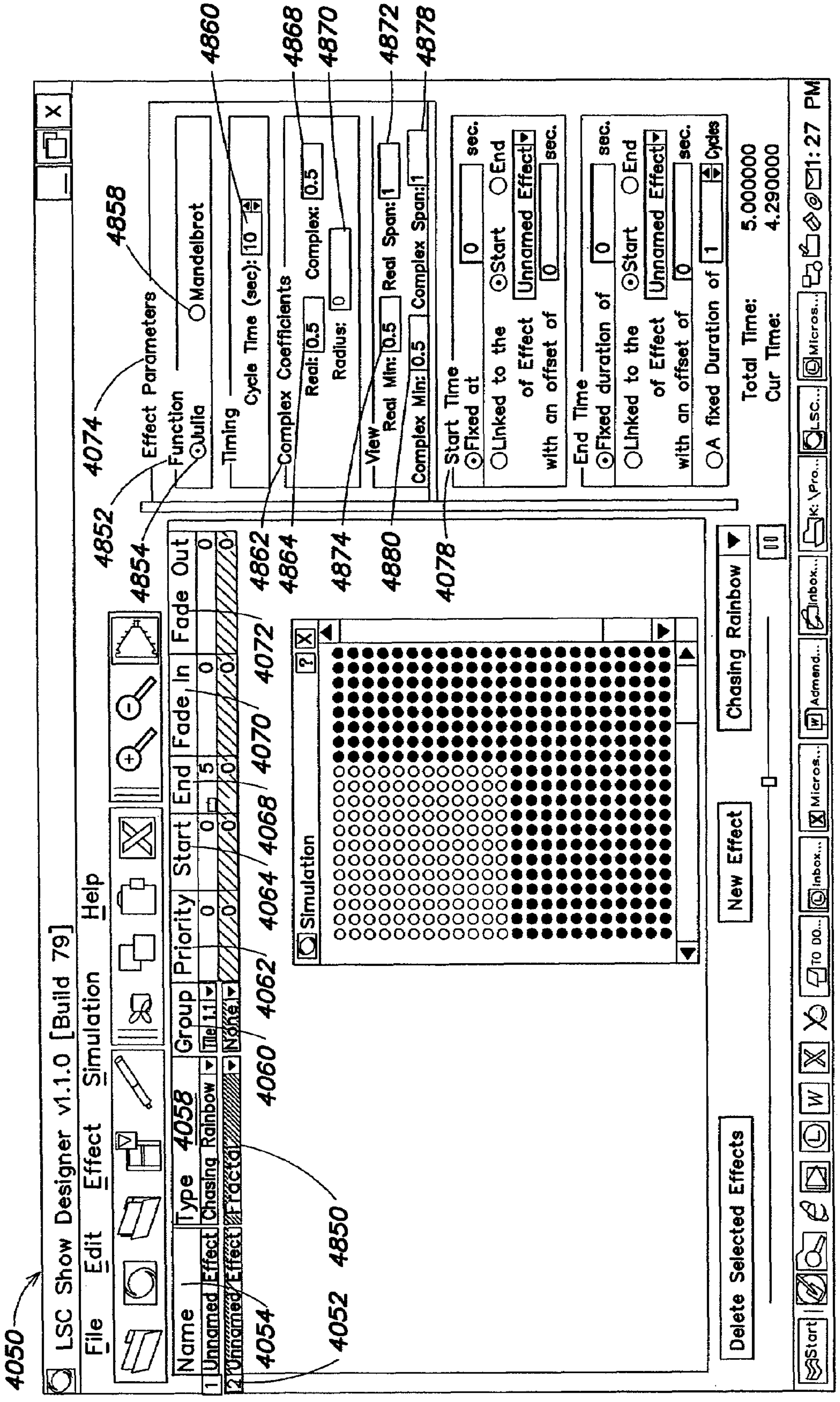
FIG. 48 shows additional aspects of a user interface for a light show composer.

Referring to FIG. 48, a fractal effect 4850 can be selected, in which case the parameters pane 4074 presents parameters related to a fractal function 4852. The fractal function allows the user to generate an effect where the illumination of lighting units depends on a complex function that has real and complex components. Various fractal types can be selected, such as a Julia type, using a button 4854, or a Mandelbrot type, using a button 4858. The user can then set the cycle timing of the fractal effect 4850, using a field 4860. The user can also determine the coefficients 4862 of the fractal function, including a real coefficient in a field 4864 and a complex coefficient in a field 4868, as well as a radius in a field 4870. Parameters related to the view of the fractal can be set as well, including a real minimum parameter in a field 4874, a complex minimum parameter in a field 4880, a real span parameter in a field 4872, and a complex span parameter in a field 4878. Uses of fractal functions can produce very striking and unexpected lighting effects, particularly when presented on an array, such as in a tile light, where the lighting units 100 are positioned in an array behind a diffusing panel.

Figure 49:
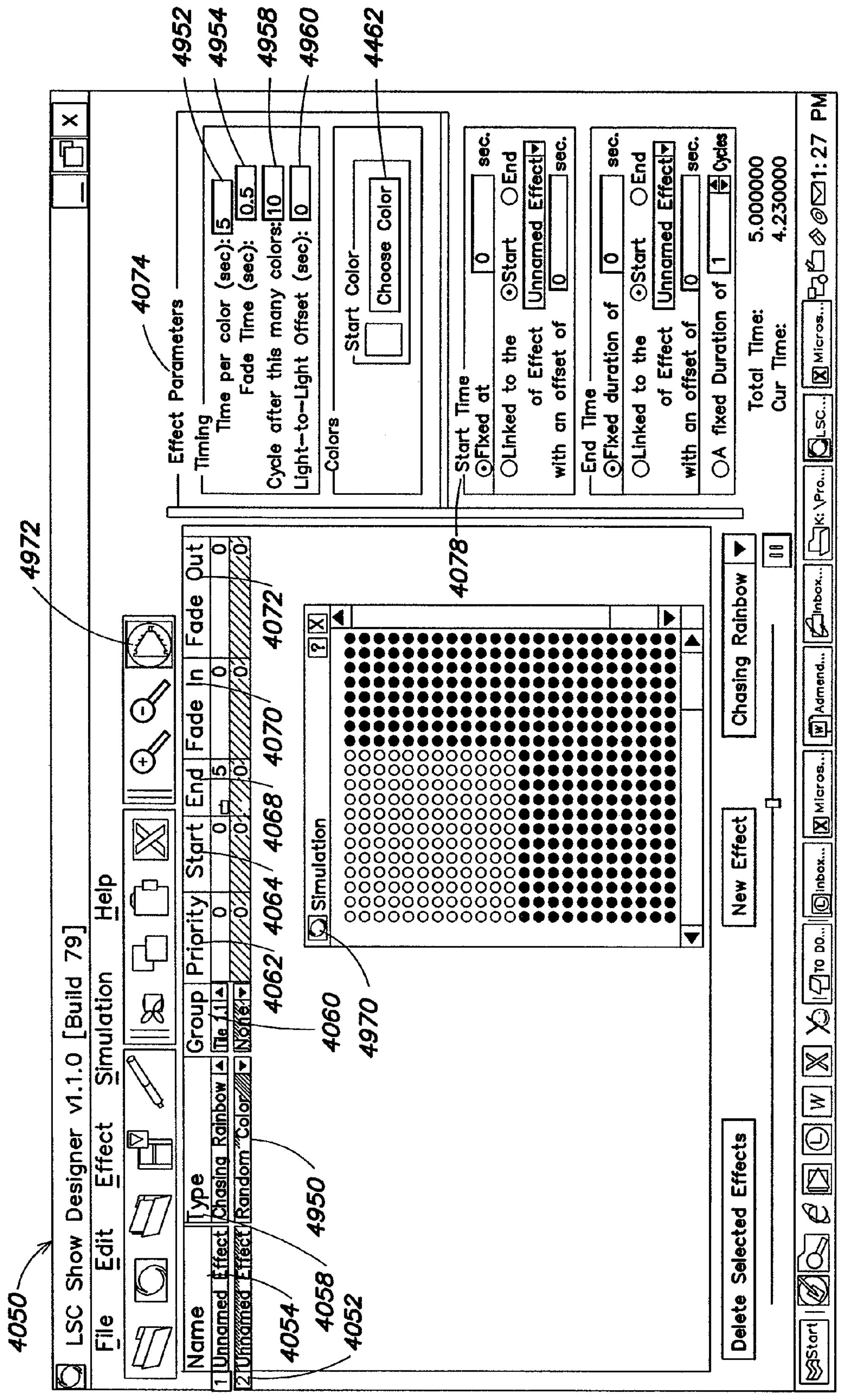
FIG. 49 shows additional aspects of a user interface for a light show composer.

Referring to FIG. 49, a random color effect 4950 can be selected from the menu of the type field 4058, in which case the parameters pane 4074 presents parameters for a random color effect. The user can set various parameters, including those related to timing, such as the time per color in a field 4952, the fade time in a field 4954, the number of colors that appear randomly before a cycle is created in a field 4758, and the light-to-light offset in a field 4760. Using the button 4462, the user can select the initial color, such as by selecting it from the palette 4650 of FIG. 46.

Referring still to FIG. 49, a simulation window 4970 can be generated for any effect, which simulates the appearance of an effect on the selected group of lights. The simulation includes the map of light locations created using the mapping facility 1658 and user interface 2550, and the lighting units 100 represented on the map display colors that correspond to the light that will emit from particular lighting units 100 represented by the map. The simulation window 4970 is an animation window, so that the effect runs through time, representing the timing parameters selected by the user. The simulation window 4970 can be used to display a simulation of any effect selected by the user, simply by selecting the simulation arrow 4972 in the menu of the user interface 4050.

Figure 50:
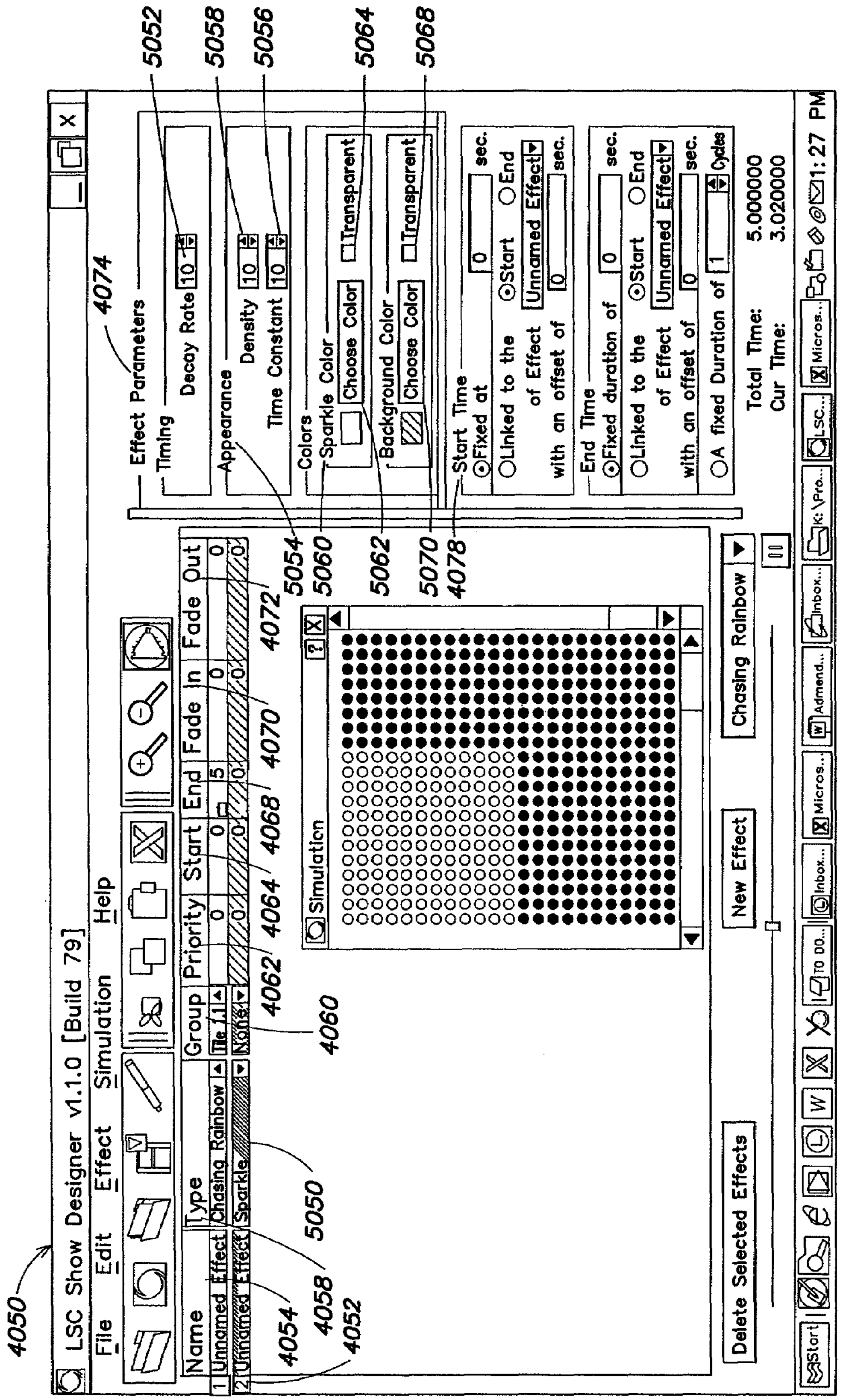
FIG. 50 shows additional aspects of a user interface for a light show composer.

Referring to FIG. 50, a user can select a sparkle effect 5050 from the pull-down menu of the type field 4058, in which case the parameters pane 4074 shows parameters appropriate for a sparkle effect. The parameters include timing parameters, such as the rate of decay, set in a field 5052. The parameters also include appearance parameters 5054, including the density, which can be set in a field 5058, and a time constant, set in a field 5056. The user can also set colors, including a primary sparkle color 5060, which can be selected using a button 5062, which can pull up the palette 4650. Using a button 5062, the user can elect to make the sparkle color transparent, so that other effects show through. The user can also select a background color using a button 5070, which again pulls up a palette 4650. The user can use a button 5068 to make the background color transparent.

Figure 51:
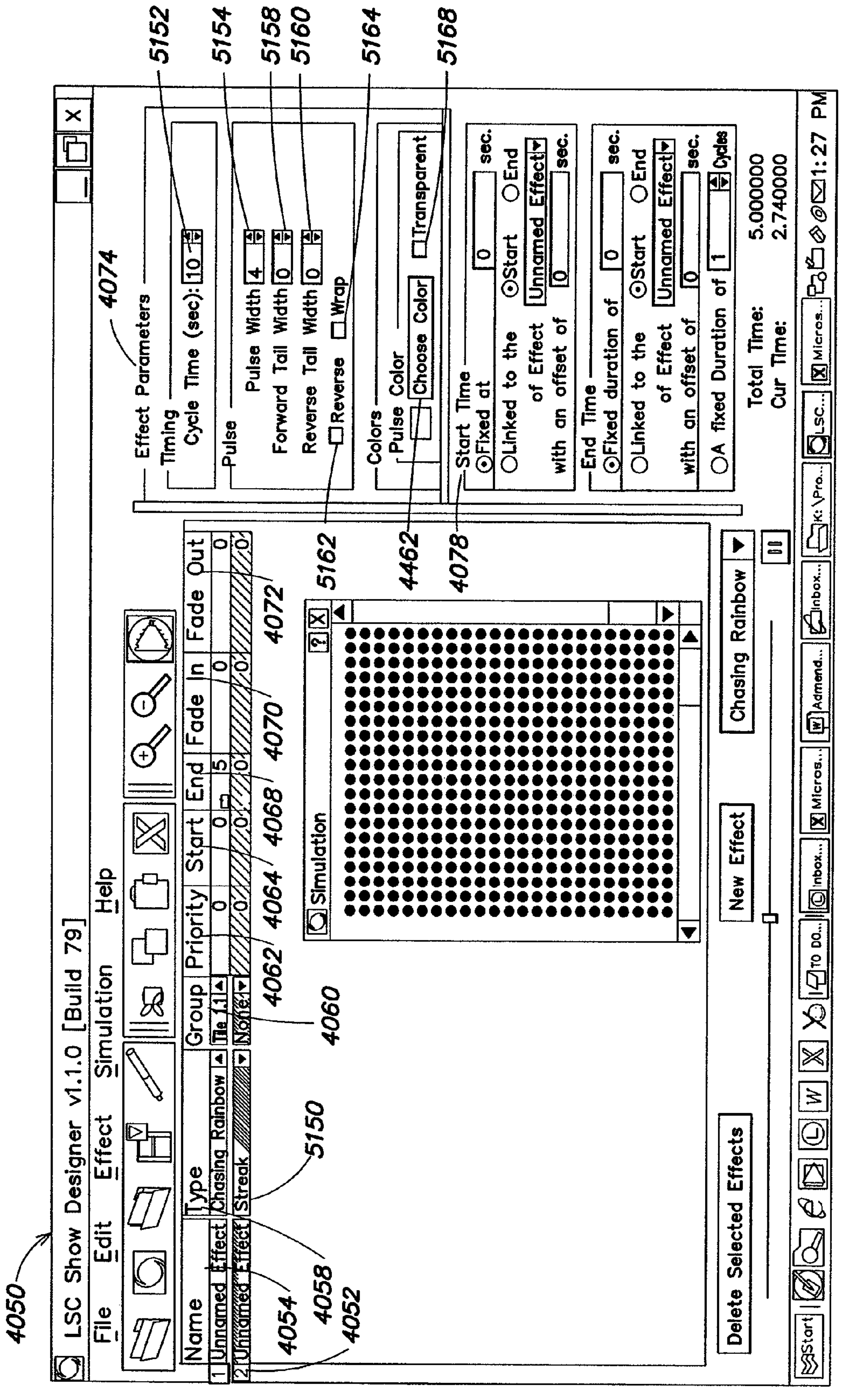
FIG. 51 shows additional aspects of a user interface for a light show composer.

Referring to FIG. 51, the user can select a streak effect 5150 using the pull-down menu of the type field 4058, in which case the parameters pane 4074 shows parameters that govern the attributes of a streak effect 5150. The parameters including the conventional timing and linking parameters that apply to all or most all effects, plus additional parameters, such as a cycle time parameter, set in a field 5152. The user can also set various pulse parameters for the streak effect 5150, such as the pulse width 5154, the forward tail width 5158, and the reverse tail width 5160. The user can use a button 5162 to cause the effect to reverse directions back and forth or a button 5164 to cause the effect to wrap in a cycle. The user can select a color for the streak using the button 4462, in which case the palette 4650 presents color options for the user. The user can make the effect transparent using the button 5168.

Figure 52:
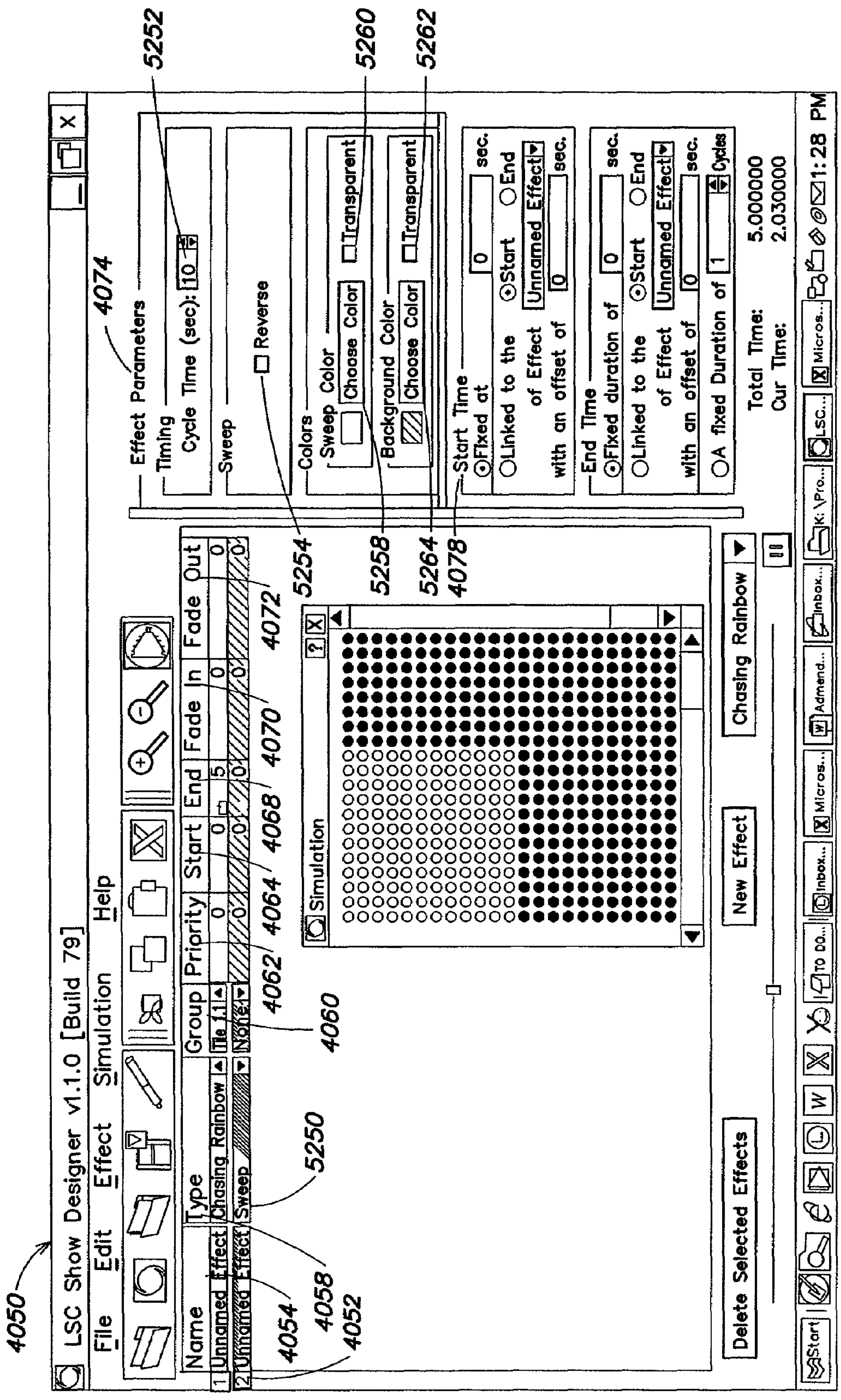
FIG. 52 shows additional aspects of a user interface for a light show composer.

Referring to FIG. 52, the user can select a sweep effect 5150 using the pull-down menu of the type field 4058, in which case the parameters pane 4074 shows parameters that govern the attributes of a sweep effect 5150. The user can set the timing, using the cycle time field 5152. The user can select to have the sweep operate in a reversing fashion by selecting the button 5254. The user can select a sweep color using the color button 5258, which pulls up the palette 4650, and make the sweep color transparent using the button 5260. The user can select a background color using the button 5264, which also pulls up the palette 4650, and the user can make the background color transparent using the button 5262.

Figure 53:
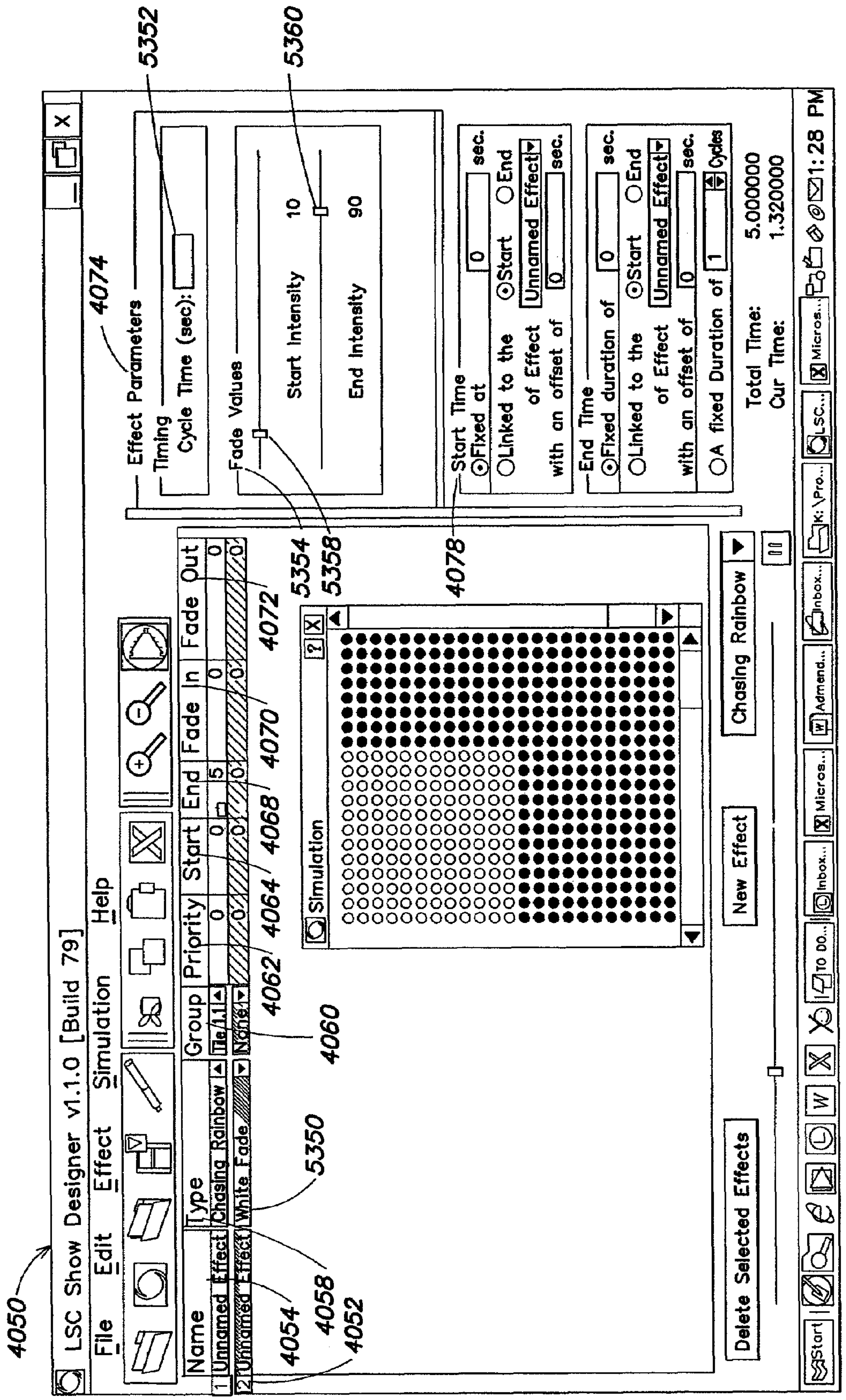
FIG. 53 shows additional aspects of a user interface for a light show composer.

Referring to FIG. 53, the user can select a white fade effect 5350 using the pull-down menu of the type field 4058, in which case the parameters pane 4074 shows parameters that govern the attributes of a white fade effect 5350. The user can enter the cycle time in the field 5352, and the user can determine fade values 5354 by using a slide bar 5358 to set the start intensity and a slide bar 5360 to set the end intensity.

Figure 54:
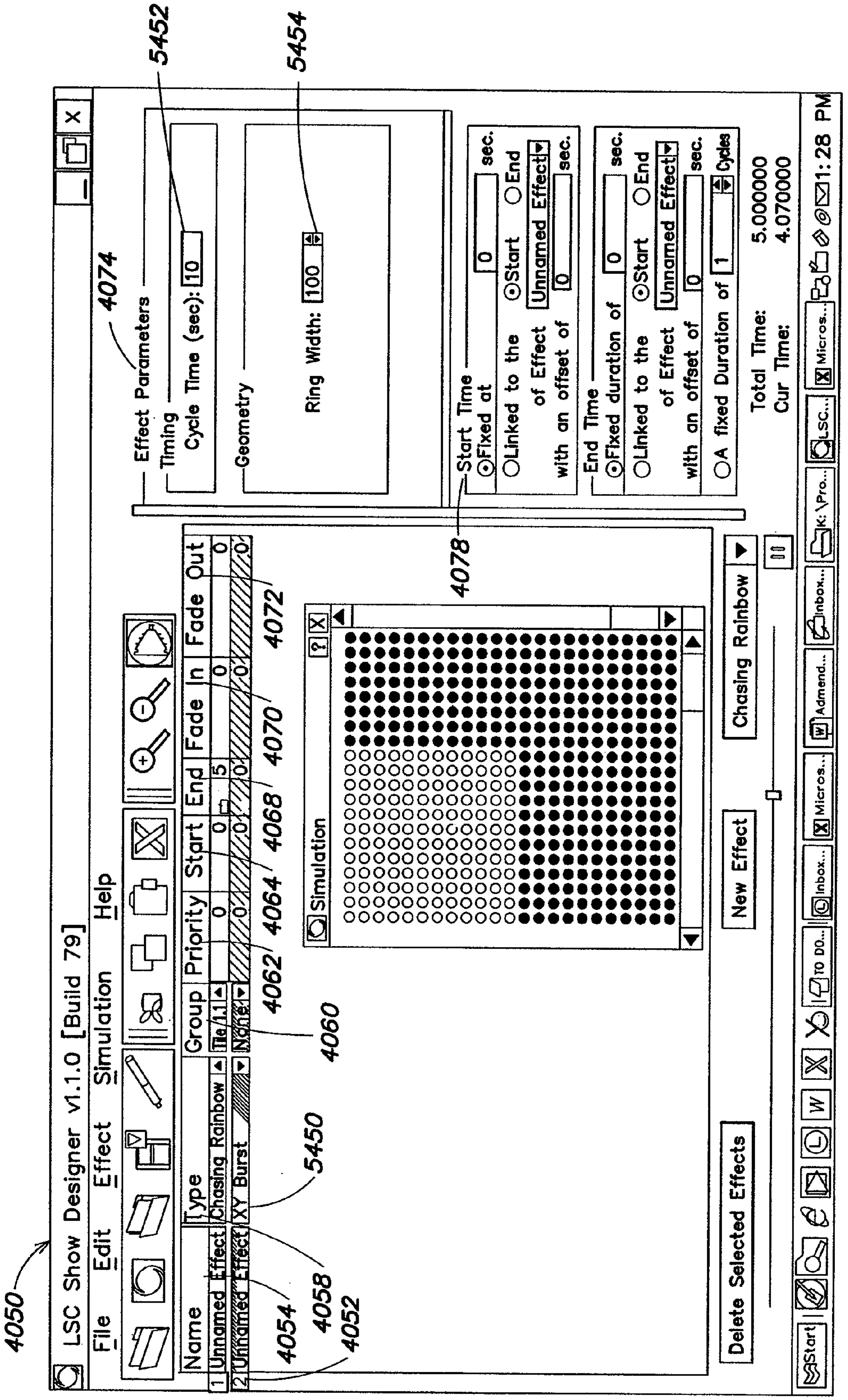
FIG. 54 shows additional aspects of a user interface for a light show composer.

Referring to FIG. 54, the user can select an XY burst effect 5450 using the pull-down menu of the type field 4058, in which case the parameters pane 4074 shows parameters that govern the attributes of an XY burst effect 5450. The user can set the cycle time in a field 5452, and the user can set the ring width of the burst using a field 5454.

Figure 55:
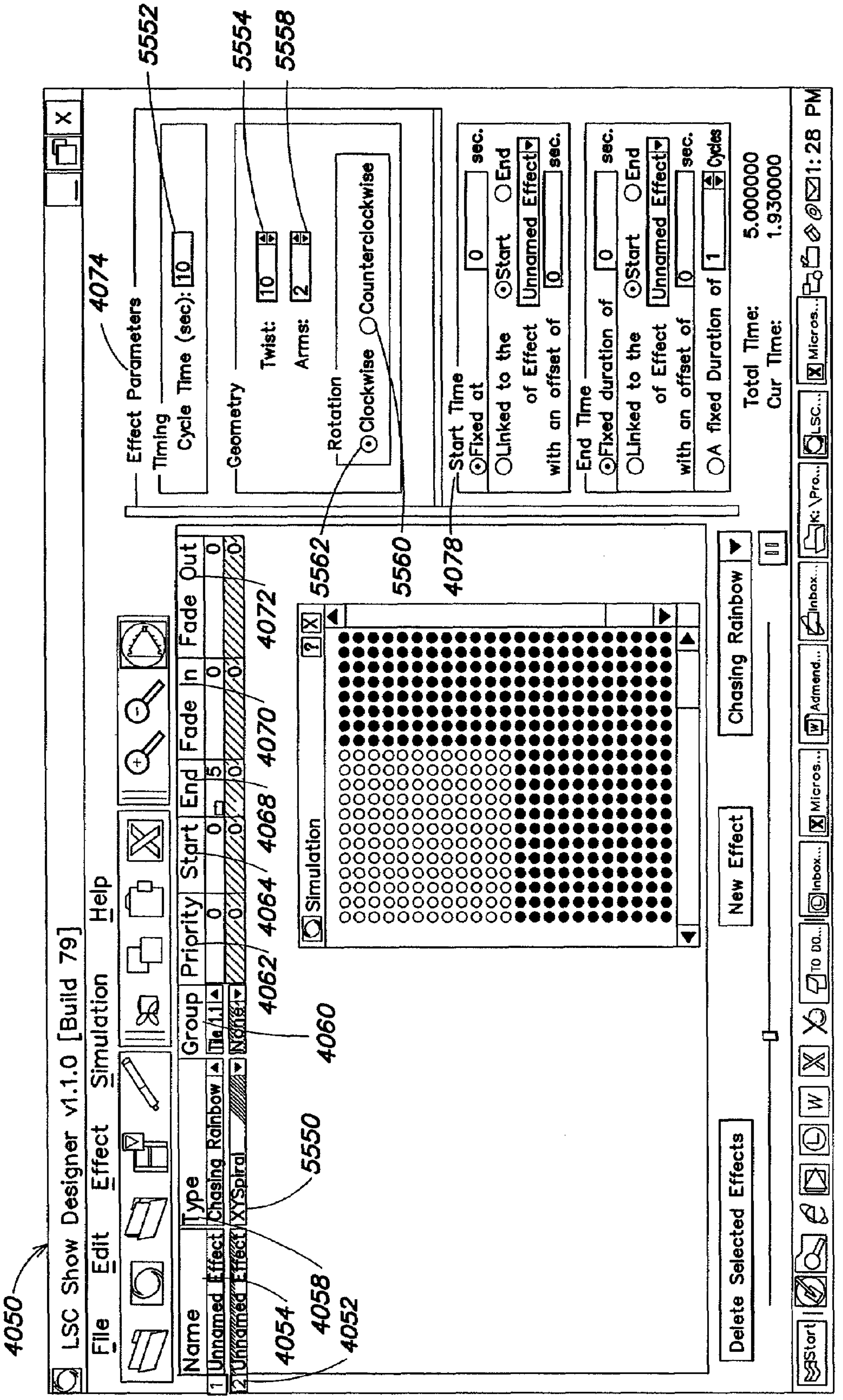
FIG. 55 shows additional aspects of a user interface for a light show composer.

Referring to FIG. 55, the user can select an XY spiral effect 5550 using the pull-down menu of the type field 4058, in which case the parameters pane 4074 shows parameters that govern the attributes of an XY spiral effect 5550. The user can set the cycle time in a field 5552, and the user can set effect that relate to the geometry effect in the other fields of the parameters pane 4074. For example, the user can set a twist parameter in the field 5554, and the user can set the number of arms in the spiral in a field 5558. The user can also determine the direction of rotation of the spiral, by selecting a counter-clockwise button 5560 or a clockwise button 5562.

Figure 56:
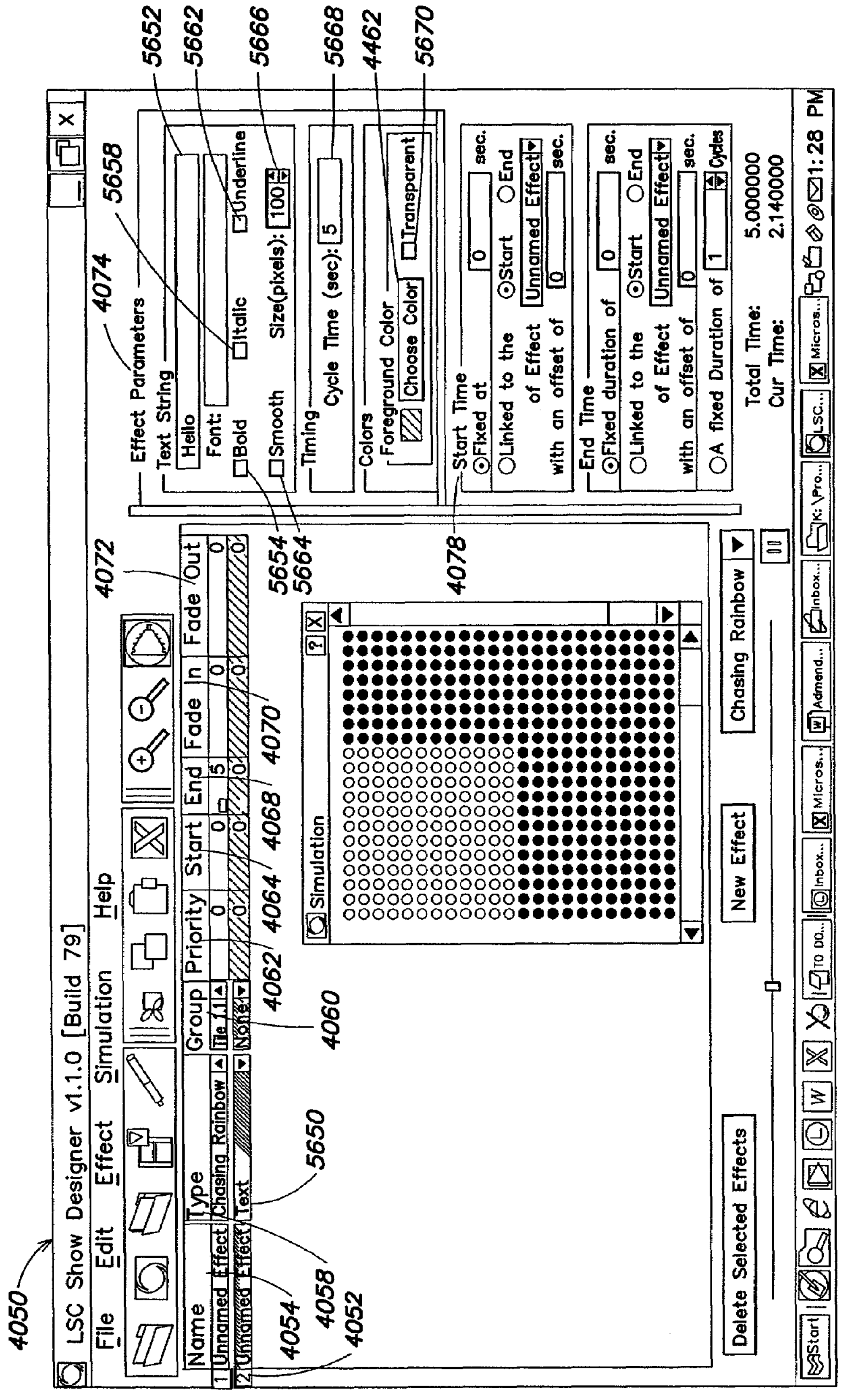
FIG. 56 shows additional aspects of a user interface for a light show composer.

Referring to FIG. 56, the user can select a text effect 5650 using the pull-down menu of the type field 4058, in which case the parameters pane 4074 shows parameters that govern the attributes of a text effect 5650. The user can enter a text string in a field 5652, which will appear as a text item on the lighting units 100, such as an array, where the lighting units 100 in the array appears as pixels that build the text effect that appears in the field 5652. The attributes of the text string can be set, such as whether the text is bold in a field 5654, whether it is in italics in a field 5658, and whether it is underlined in a field 5662. A field 5660 allows the user to select a font for the text, such as "times new roman" or "courier." A button 5664 allows the user to smooth the text on the display. The user can select the size or pitch of the font using a field 5666. The user can set the cycle time for the text string using a field 5668. The user can choose the foreground color using a button 4462, pulling up the palette 4650 for color selection. The user can make the foreground color transparent using the button 5670. The text effect allows a user to conveniently display text, messages, brands, logos, information or other content over lighting systems, such as arrays, tile lights, or other lighting displays of any geometry that are mapped into the mapping facility 1658.

Figure 57:
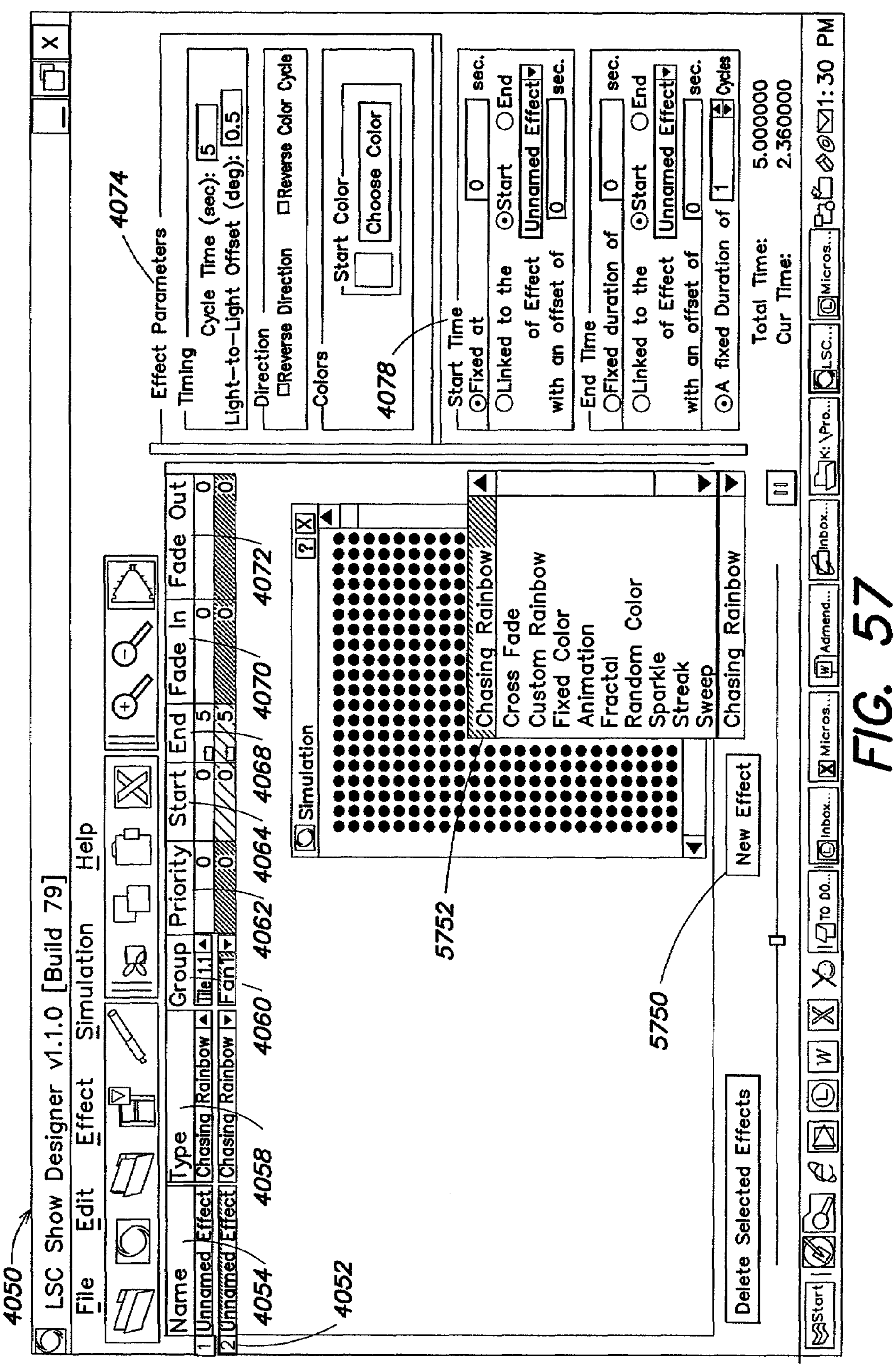
FIG. 57 shows additional aspects of a user interface for a light show composer.

Referring to FIG. 57, a new effect button 5750 allows a user to add a new effect to the interface 4050. The selection of the button 5750 pulls up a menu 5752 listing types of effects. When the user highlights and clicks a particular type of effect, the parameters pane 4074 then shows parameters of the appropriate type for the new effect type that the user selected from the window 5752.

Figure 58:
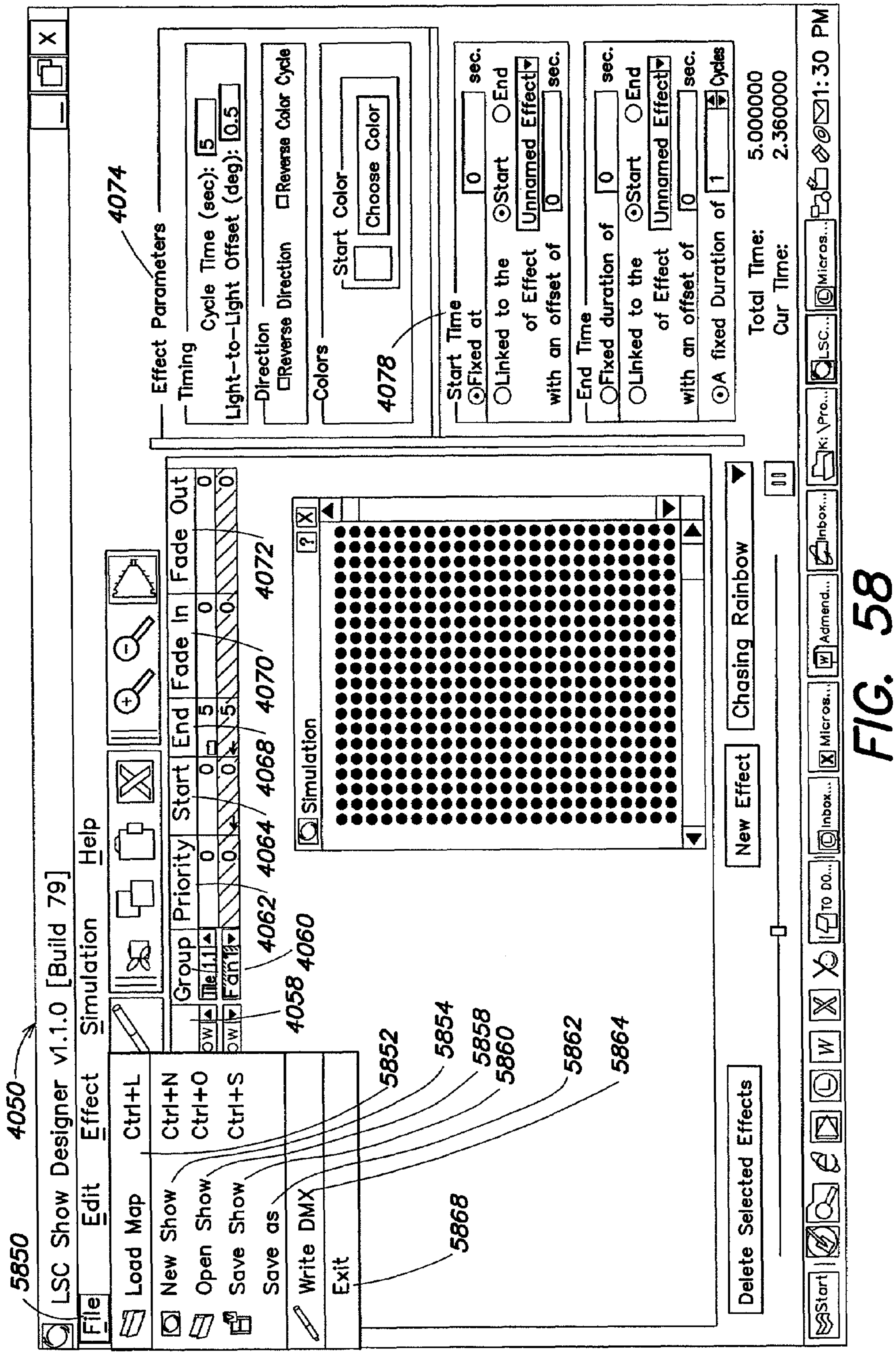
FIG. 58 shows additional aspects of a user interface for a light show composer.

Referring to FIG. 58, the user may elect various file options in the interface 4050 by selecting the file menu 5850. From the file menu 5850, the user has an option 5852 to load a map, such as one created using the mapping facility 1658. The user can create a new show with the option 5854, in which case the user begins scripting new effects as described herein. The use can also open an existing show with the option 5858, in which case the user can browse files to find existing shows. The user can save a show with the option 5860, including edited versions of the show. The user can save an existing show in another location with the option 5862. The user also has the option to write DMX control instructions that correspond to the show 5864 that the user creates using the interface 4050.

Figure 59:
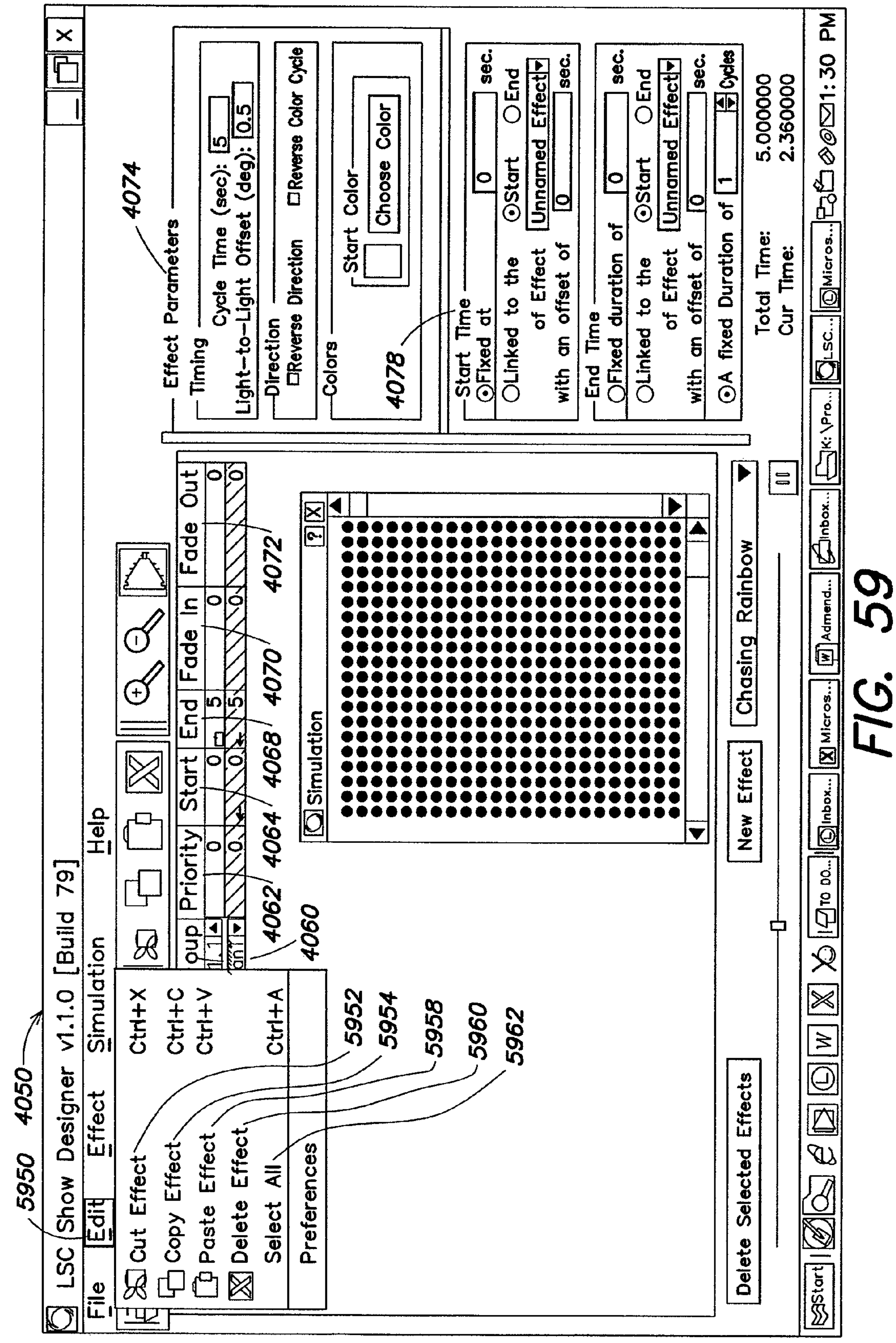
FIG. 59 shows additional aspects of a user interface for a light show composer.

Referring to FIG. 59, a user can elect various editing options by selecting an edit menu 5950. The user can cut an effect with an option 5952. The user can copy an effect with the option 5954. The user can paste an effect with an option 5958. The user can delete an effect with the option 5960. The user can select all effects with an option 5962.

Figure 60:
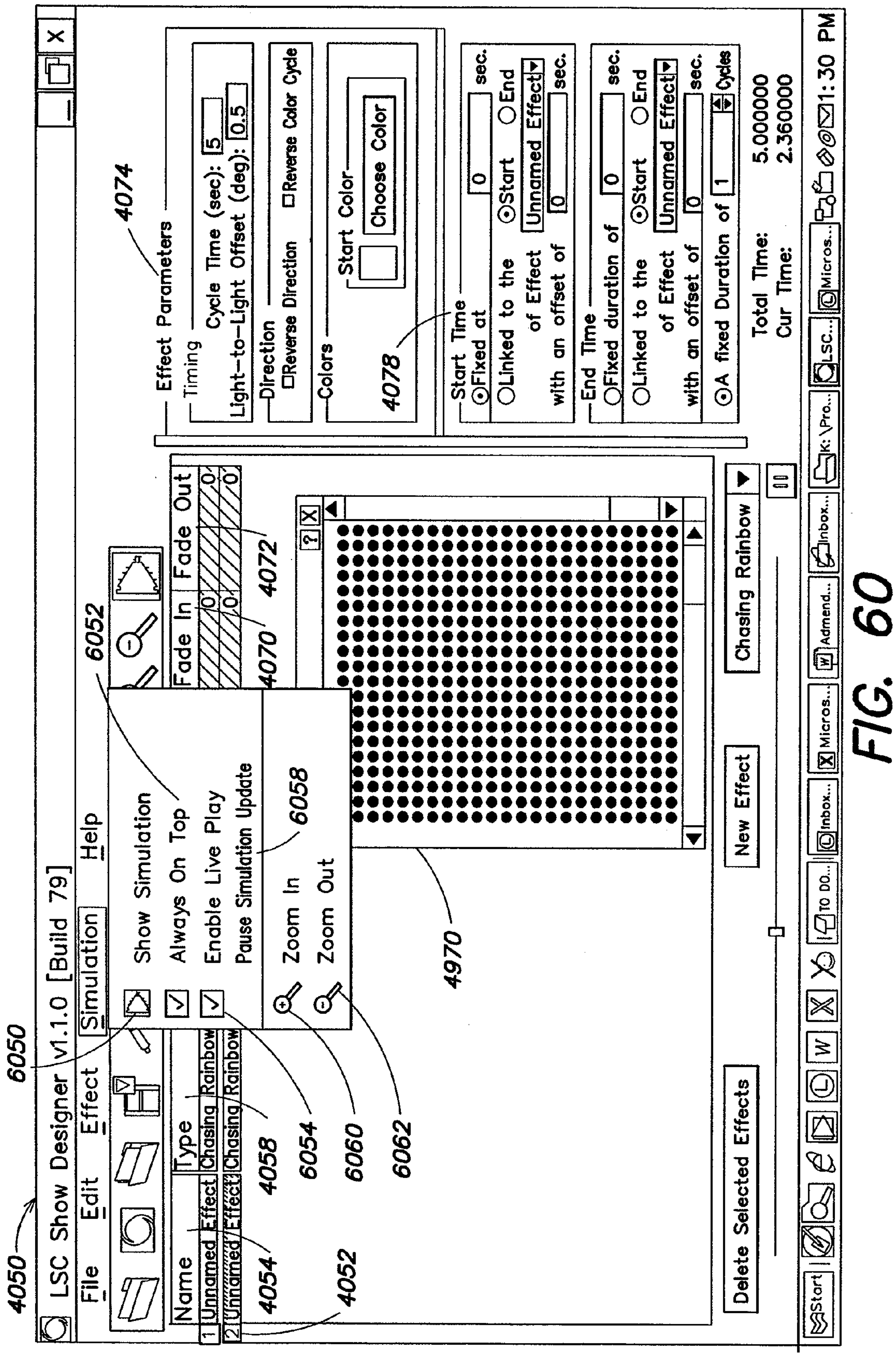
FIG. 60 shows additional aspects of a user interface for a light show composer.

Referring to FIG. 60, a user can select a simulation menu 6050 and elect to show a simulation, in which case the simulation window 4970 appears. The user can keep the simulation always on top, using an option 6052. The user can enable live playing of effect using an option 6054. The user can pause updating of the simulation using an option 6058. The user can zoom in using an option 6060, and the user can zoom out using an option 6062.

Figure 61:
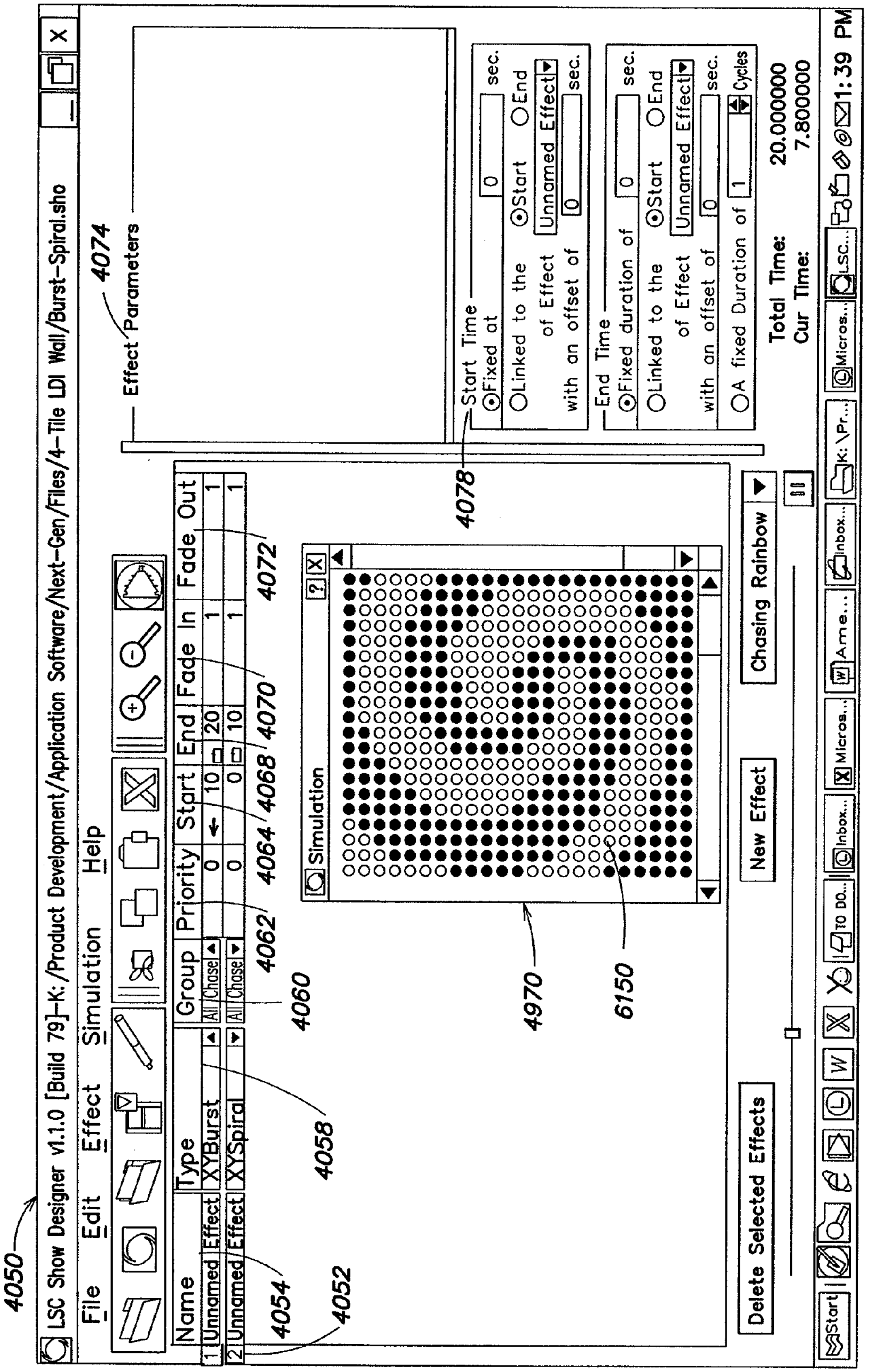
FIG. 61 shows additional aspects of a user interface for a light show composer.

FIG. 61 shows a simulation window 4970 with an X burst effect 6150, using a chasing group.

Figure 62:
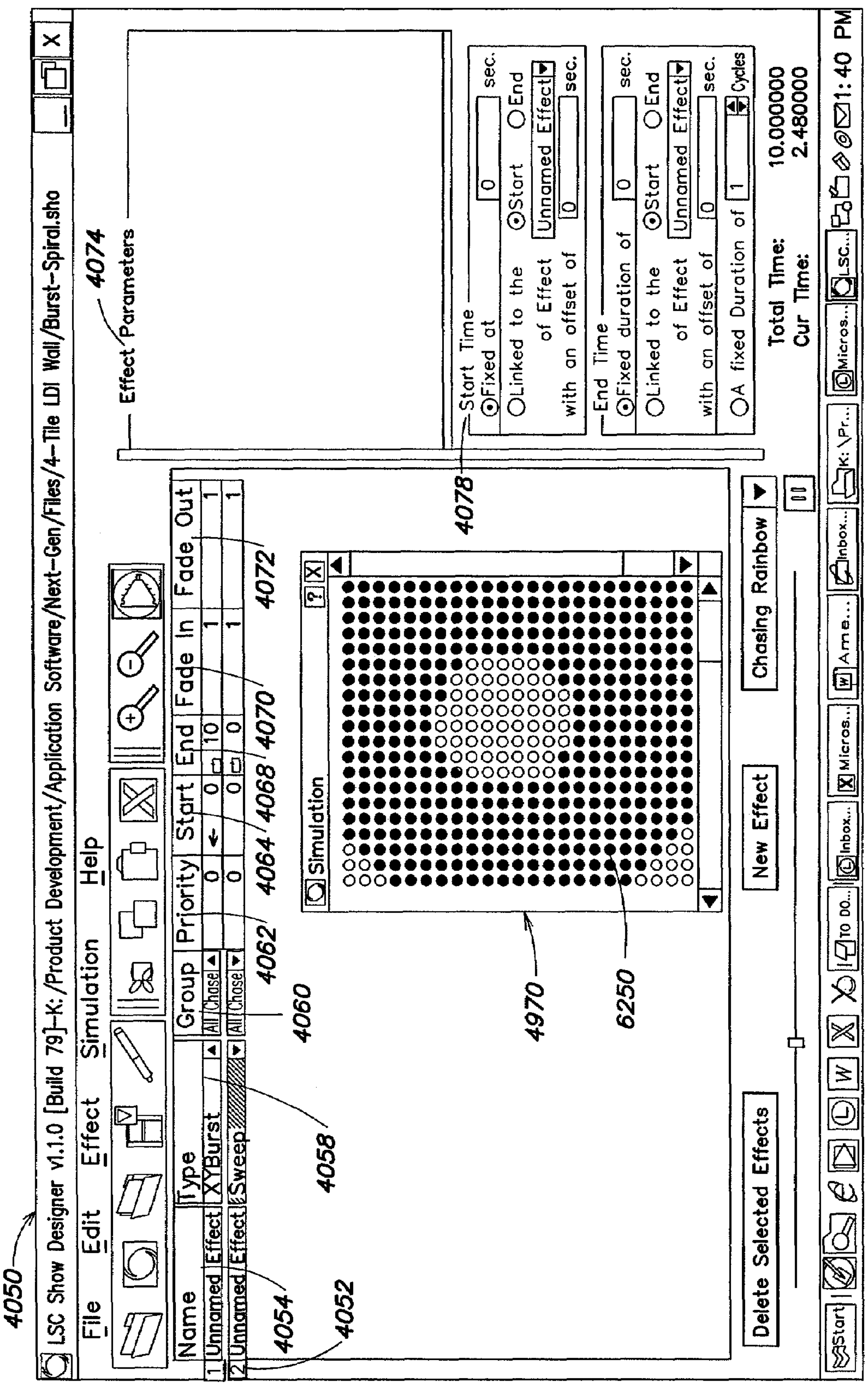
FIG. 62 shows additional aspects of a user interface for a light show composer.

FIG. 62 shows a simulation window 4970 with a sweep effect 6250.

As seen in connection with the various embodiments of the user interface 4050 and related figures, methods and systems are included herein for providing a light system composer for allowing a user to author a lighting show using a graphical user interface. The light system composer includes an effect authoring system for allowing a user to generate a graphical representation of a lighting effect. In embodiments the user can set parameters for a plurality of predefined types of lighting effects, create user-defined effects, link effects to other effects, set timing parameters for effects, generate meta effects, and generate shows comprised of more than one meta effect, including shows that link meta effects.

In embodiments, a user may assign an effect to a group of light systems. Many effects can be generated, such as a color chasing rainbow, a cross fade effect, a custom rainbow, a fixed color effect, an animation effect, a fractal effect, a random color effect, a sparkle effect, a streak effect, an X burst effect, an XY spiral effect, and a sweep effect.

In embodiments an effect can be an animation effect. In embodiments the animation effect corresponds to an animation generated by an animation facility. In embodiments the effect is loaded from an animation file. The animation facility can be a flash facility, a multimedia facility, a graphics generator, or a three-dimensional animation facility.

In embodiments the lighting show composer facilitates the creation of meta effects that comprise a plurality of linked effects. In embodiments the lighting show composer generates an XML file containing a lighting show according to a document type definition for an XML parser for a light engine. In embodiments the lighting show composer includes stored effects that are designed to run on a predetermined configuration of lighting systems. In embodiments the user can apply a stored effect to a configuration of lighting systems. In embodiments the light system composer includes a graphical simulation of a lighting effect on a lighting configuration. In embodiments the simulation reflects a parameter set by a user for an effect. In embodiments the light show composer allows synchronization of effects between different groups of lighting systems that are grouped using the grouping facility. In embodiments the lighting show composer includes a wizard for adding a predetermined configuration of light systems to a group and for generating effects that are suitable for the predetermined configuration. In embodiments the configuration is a rectangular array, a string, or another predetermined configuration.

Figure 63:
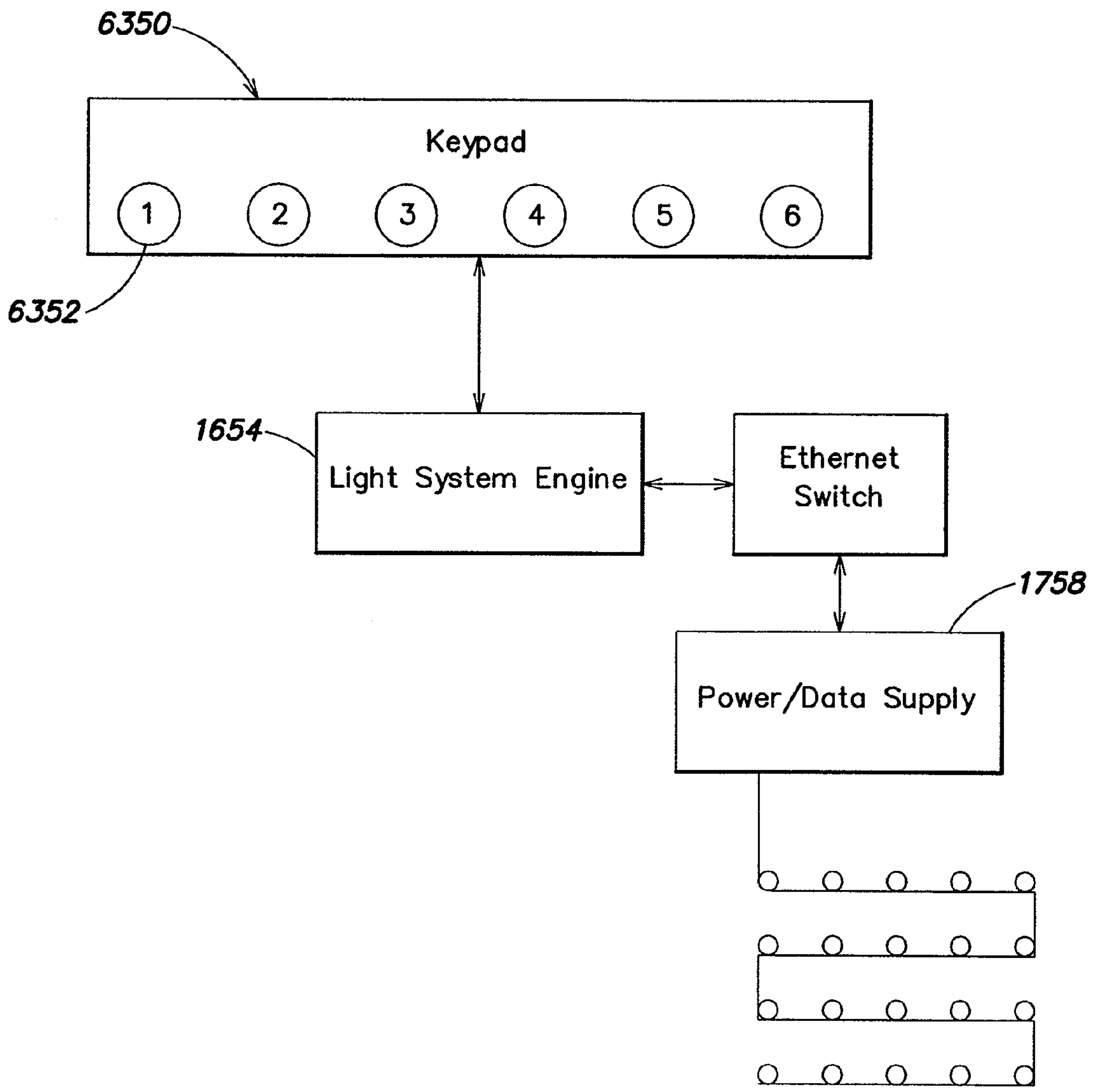
FIG. 63 is a schematic diagram showing elements for a user interface for a light system engine.

Referring to FIG. 63, once a show is downloaded to the light system engine 1654, the light system engine 1654 can execute one or more shows in response to a wide variety of user input. For example, a stored show can be triggered for a lighting unit 100 that is mapped to a particular PDS 1758 associated with a light system engine 1654. There can be a user interface for triggering shows downloaded on the light system engine 1654. For example, the user interface may be a keypad 6350, with one or more buttons 6352 for triggering shows. Each button 6352 might trigger a different show, or a given sequence of buttons might trigger a particular show, so that a simple push-button interface can trigger many different shows, depending on the sequence. In embodiments, the light system engine 1654 might be associated with a stage lighting system, so that a lighting operator can trigger pre-scripted lighting shows during a concert or other performance by pushing the button at a predetermined point in the performance.

In embodiments, other user interfaces can trigger shows stored on a light system engine 1654, such as a knob, a dial, a button, a touch screen, a serial keypad, a slide mechanism, a switch, a sliding switch, a switch/slide combination, a sensor, a decibel meter, an inclinometer, a thermometer, a anemometer, a barometer, or any other input capable of providing a signal to the light system engine 1654. In embodiments the user interface is the serial keypad 6350, wherein initiating a button on the keypad 6350 initiates a show in at least one zone of a lighting system governed by a light system engine connected to the keypad.

Figure 64:
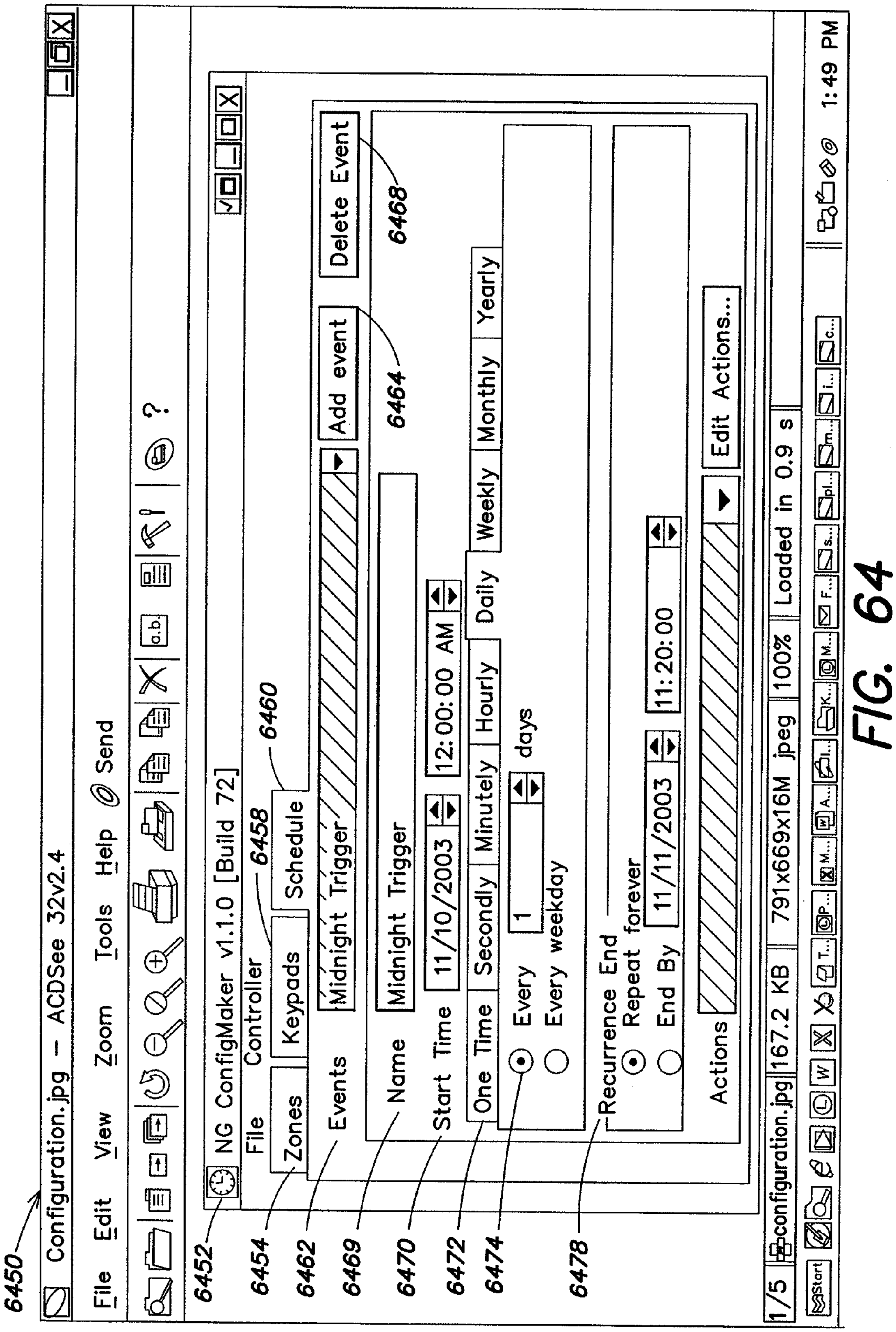
FIG. 64 shows a user interface for a configuration system for a light system manager.

Referring to FIG. 64, a configuration interface 6450 can be provided for a lighting system, to enable the configuration of lighting systems to play lighting shows, such as those authored by the light system composer 1652 for the light system engine 1654. The configuration interface 6450, in embodiments, can be provided in connection with the light system composer 1652, in connection with the light system engine 1654, in connection with a user interface for the light system engine 1654, or in connection with a separate light system controller, such as for a concert or building lighting system. The configuration interface 6450 allows the user to handle different lighting zones 6454, to configure keypads 6458 for triggering light shows, and to configure events 6460 that are comprised of lighting shows and other effects. A user can configure an event 6462, including naming the event. The user can add events with a button 6464 and delete events with a button 6468. The user can name the event in the event name field 6469. The user can set a start time for the event with the field 6470. The user can set timing parameters, such as how frequently the event will repeat, with the tabs 6472, whether it is one time, each second, each minute, each hour, each day, each week, each month, or each year. With the button 6474 the user can have an event triggered after a selected number of days. The user can also set the time for recurrence to terminate with the parameters in the field 6478. Using the configuration interface 6450, a user can take shows that are generated by the light system composer 1652 and turn them into events that are scheduled to run on particular lighting systems in particular zones that are associated with a light system engine 1654 or other controller.

Figure 65:
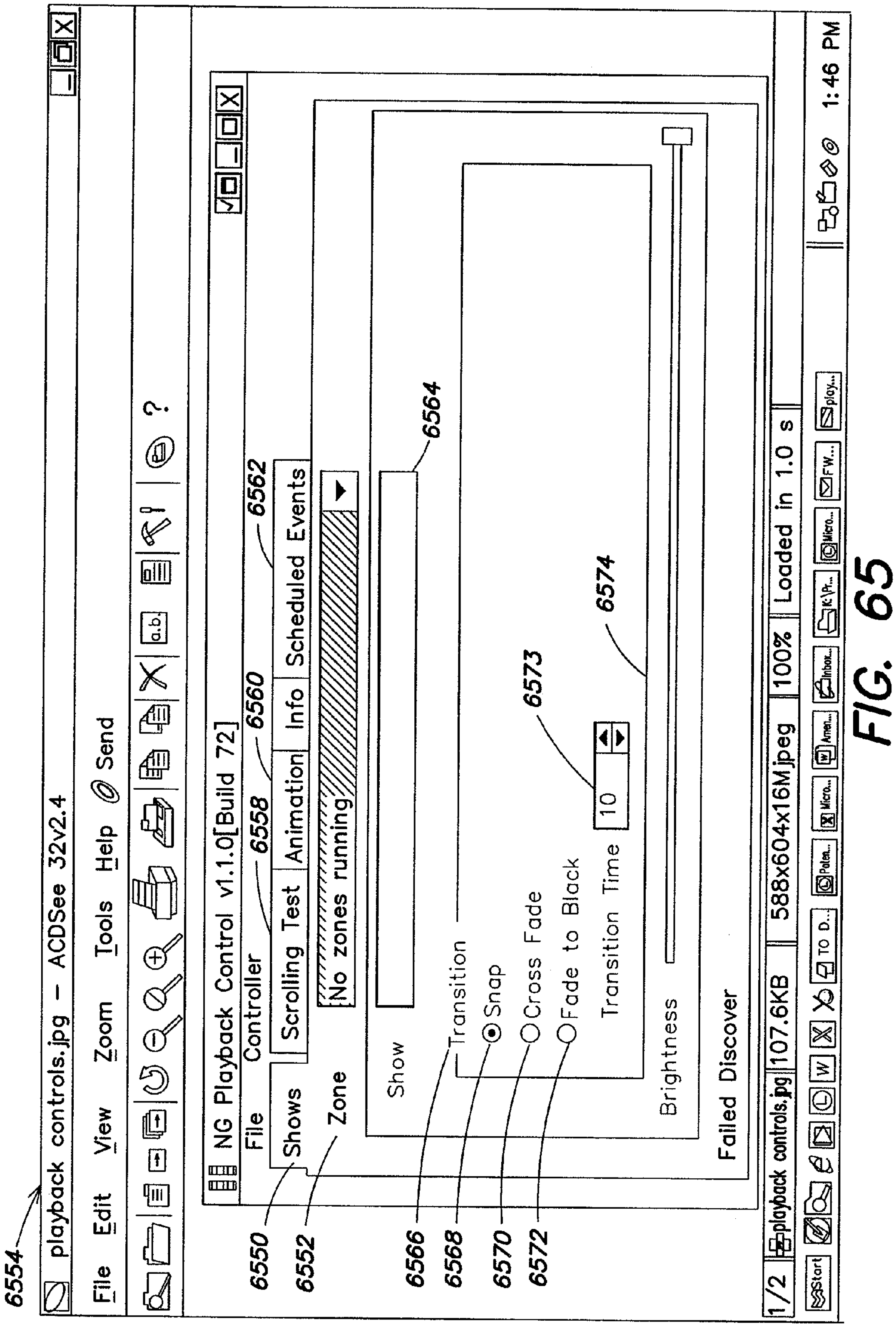
FIG. 65 shows a user interface for a playback system for a light system manager.

Referring to FIG. 65, a playback interface 6554 can be provided that facilitates the playback of lighting effects and shows created by the light system composer 1652, such as by the light system engine 1654 or by another controller. The playback interface 6554 allows a user to select shows with an option 6550, to select scrolling text files using an option 6558, to select animation shows or effects using an option 6560, to pull up information, or to select scheduled events using an option 6562. A user can apply playback to one or more selected zones with the field 6552. A user can select a show for playback using the field 6564. The user can set transition parameters for playback using the transition fields 6566. For example, the user can snap between shows using a snap button 6568, provide a cross-fade using a cross-fade button 6570, or fade to black between shows using a button 6572. A user can set transition timing using a field 6573 and set brightness using a bar 6574.

Many different forms of playback control can be provided. Since the light shows composed by the light show composer 1652 can be exported as XML files, any form of playback or download mechanism suitable for other markup language files can be used, analogous to playback facilities used for MP3 files and the like.

Figure 66:
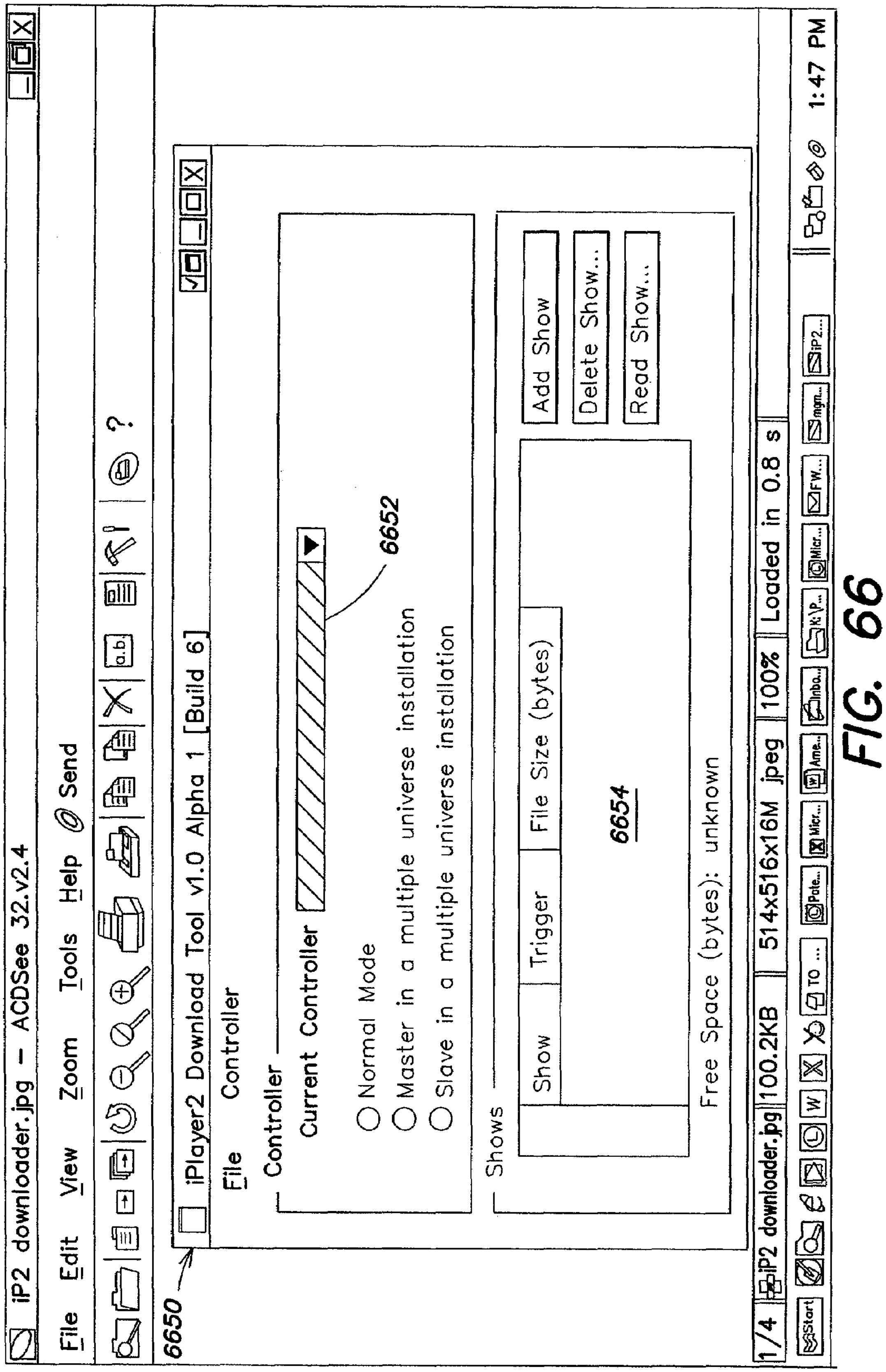
FIG. 66 shows a user interface for a download system for a light system manager.

Referring to FIG. 66, a download tool 6650 can be provided, by which a show can be downloaded to a light system engine 1654. The user can select and enter the name or address of a particular controller in the field 6652. The user can add or delete shows in the field 6654 for downloading to a particular controller, similar to the downloading of MP3 files to an MP3 player.

Figure 67:
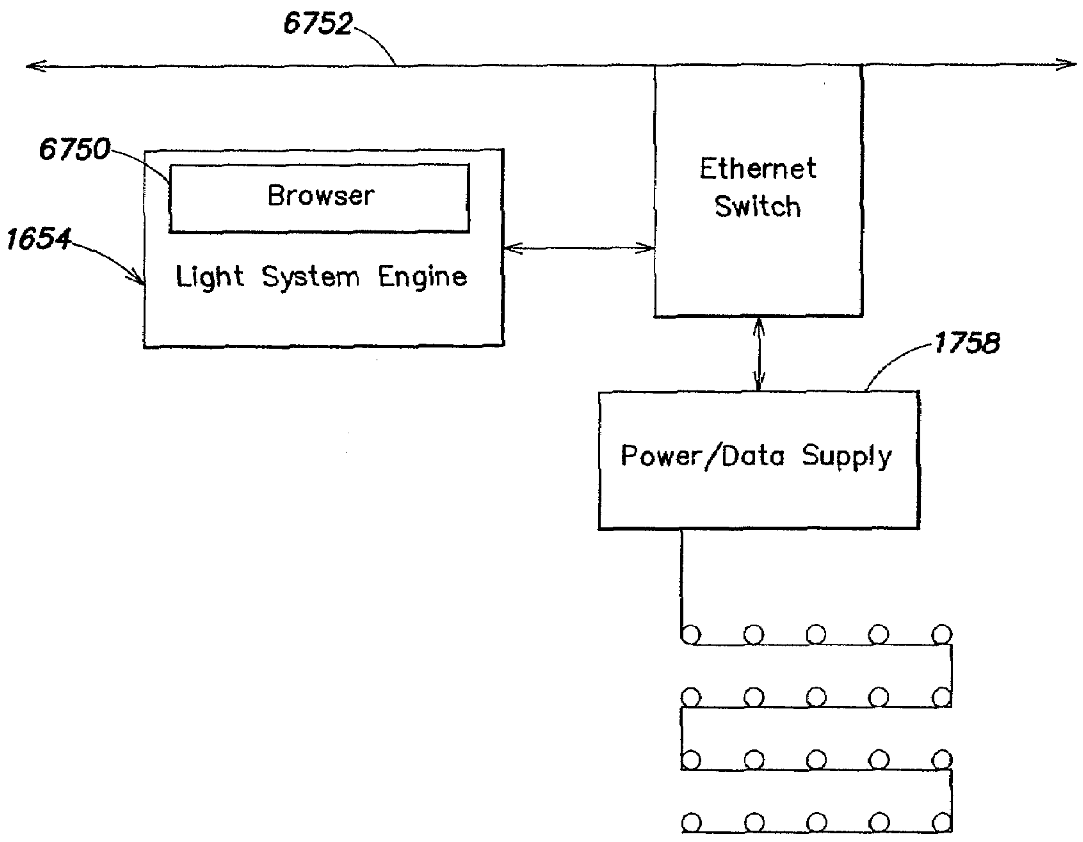
FIG. 67 is a schematic diagram for a web-based interface for supplying control to a light system engine.

Referring to FIG. 67, one form of download of a light show is through a network 6752, such as the Internet. A light system engine 1654 can be supplied with a browser 6750 or similar facility for downloading a lighting show, such as one composed by the light system composer 1652. Because the lighting shows can be transmitted as XML files, it is convenient and fast to pass the files to the light system engine 1654 through a web facility. In embodiments, a user may use an XML parser to edit XML files after they are created by the light show composer 1652, such as to make last minute, on-site changes to a lighting show, such as for a concert or other event.

Figure 68:
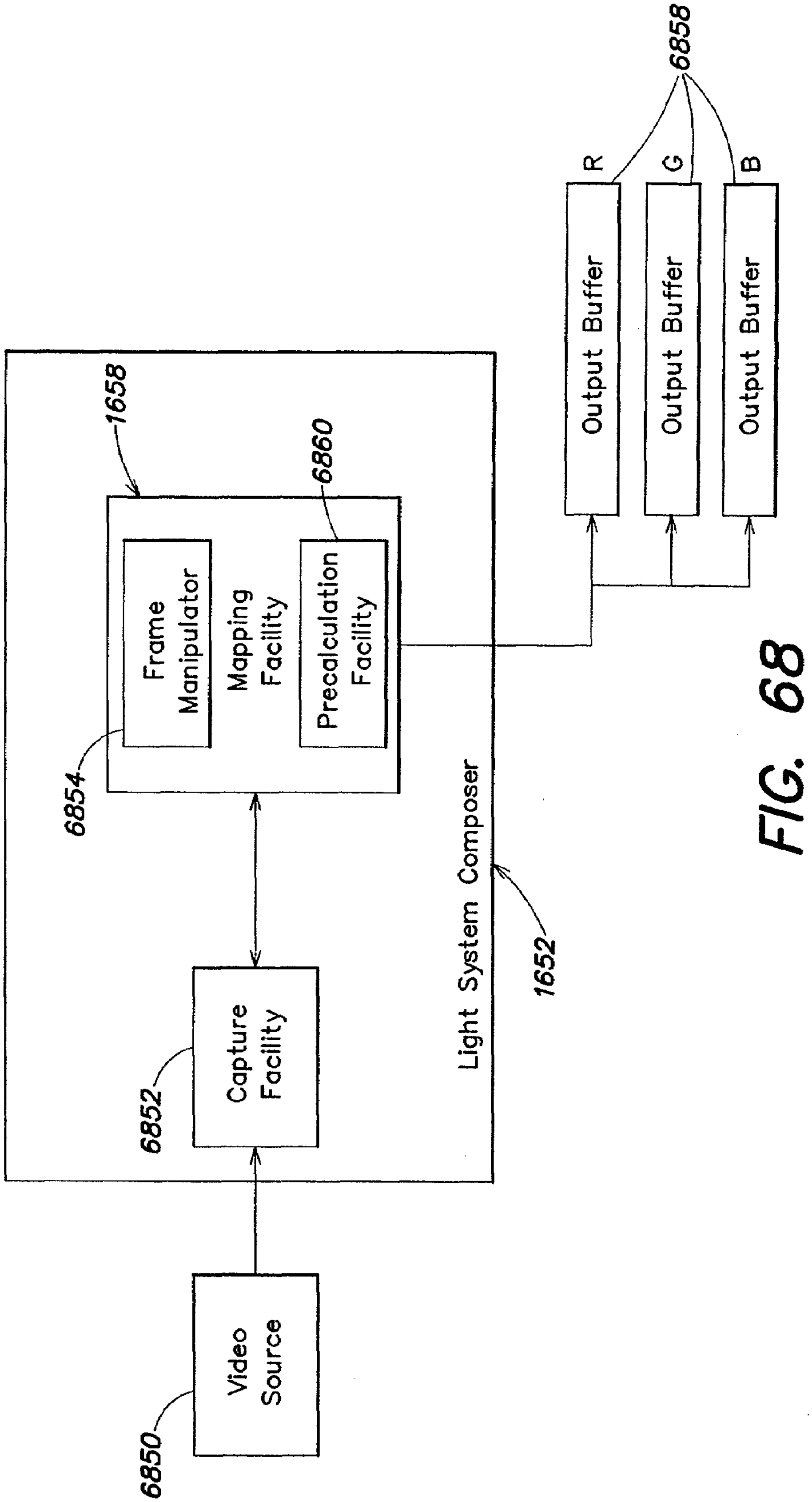
FIG. 68 shows an input to a light system manager in the form of video from video source.

Referring to FIG. 68, in embodiments of the invention input to the light system manager 1650 may take the form of video from a video source 6850. The video source 6850 may be any type of video source, analog or digital, such as Firewire video, broadcast video, streaming video, DV, NTSC video, PAL video, SECAM video, RS-170 format video, MPEG format video, HD or high-definition video, RGB video, component video, or other video signals. The video source 6850 may be a broadcast source, cable, wire, satellite video transmitter, tape, videotape, video camera, television camera, motion picture camera, DVD, flash memory, hard drive, jump drive, or other video source 6850. The video source 6850 can serve as an input to the light system manager 5000. In embodiments the video source 6850 may be fed into the light system composer 1750 or a similar facility for converting the video signal into lighting control signals. In embodiments the light system composer 1750 may include an authoring facility, such as for manipulating video signals and/or lighting control signals to generate effects or to modify effects that respond to video signals. In other embodiments the light system composer 1750 may pass through video signals into lighting control signals without offering a separate user interface or authoring facility.

The light system manager 1650 and/or light system composer 1652 may include a capture facility 6852 for capturing incoming video signals from a video source 6850. The capture facility may take a wide range of forms, depending on the nature of the video source 6850. For example, the capture facility may be a satellite antenna and associated receiver electronics, a cable set-top box, a video card for a PC, a Firewire video facility, a receiver, a video codec, or other video capture facility. The video capture facility 6852 may capture successive frames of video input. In embodiments the video capture facility 6852 may either capture digitized video signals or convert analog video signals into digitized video signals. The digitized video signals may include pixel values for each pixel in the row-column format of a standard video frame, where the pixel values correspond to the brightness of red, green and blue primary colors of a given pixel in the array. The combined red, green and blue values (RGB values) for a given pixel determine the color of the pixel in the video frame according to conventional color-mixing principles.

Once digitized RGB values are obtained for each frame through the capture facility 6852, the values can be handed to a mapping facility 1658, which can map the RGB values of the digitized video to RGB control signals for lighting units 100. For example, an array of video pixels can be mapped to a similar array of lighting units 100 in a one-to-one mapping. In embodiments a subset of the video pixels can be mapped to a lighting unit array, such as to produce a sparse-array video display. In other embodiments the video signals may be mapped to a non-rectangular arrangement of lighting units, such as a lighting display that is wrapped around a non-rectangular object, such as a tree, or the corner of a building or room. Thus, the mapping facility may map pixels of video to real-world lighting arrays in a manner similar to that described in connection with animation effects described above. In embodiments the mapping facility 1658 may include a frame manipulation facility 6854, such as a buffer, such as a ring buffer, for storing and manipulating video frames, to assist in the processing of incoming video signals into lighting control signals.

Once the RGB values of a digitized video frame are mapped to lighting control signals, the control signals can be fed into one or more output buffers 6858, which may hold a stream of such signals to be displayed in turn on lighting units 100 according to the timing of the input video signals (or other timing if the mapping facility 1658 is used to manipulate the video signal, such as to produce slow-motion or fast-motion effects). Each output buffer 6858 can feed a lighting unit 100, such as a red, green or blue lighting unit 100 in an array of lighting units 100. In embodiments the system may include a precalculation facility 6860 for performing any necessary calculations, such as preprocessing or optimizing the stream of bytes of lighting control signals that are fed into the buffers 6858. The precalculation facility 6860 can, for example, precompute the math needed to generate RGB lighting control signals from RGB pixel values, so that the sequence of lighting control signals can be fed into the output buffers 6858. In embodiments once a buffer 6858 has been built, it can be reused for each frame, rather than being built on the fly. Thus, the precalculation facility 6860 can, for example, precalculate that a particular byte from a digital RGB pixel array should be stored in a particular location in memory, namely, the location from which a lighting control signal in a lighting array will be retrieved. In embodiments the precalculation facility 6860 can be used to manipulate video, such as through time-based effects, such as by sending bytes from the incoming video signal to different locations or buffers at different times, rather than sending the data for the same pixel to the same storage location every time.

Figure 69:
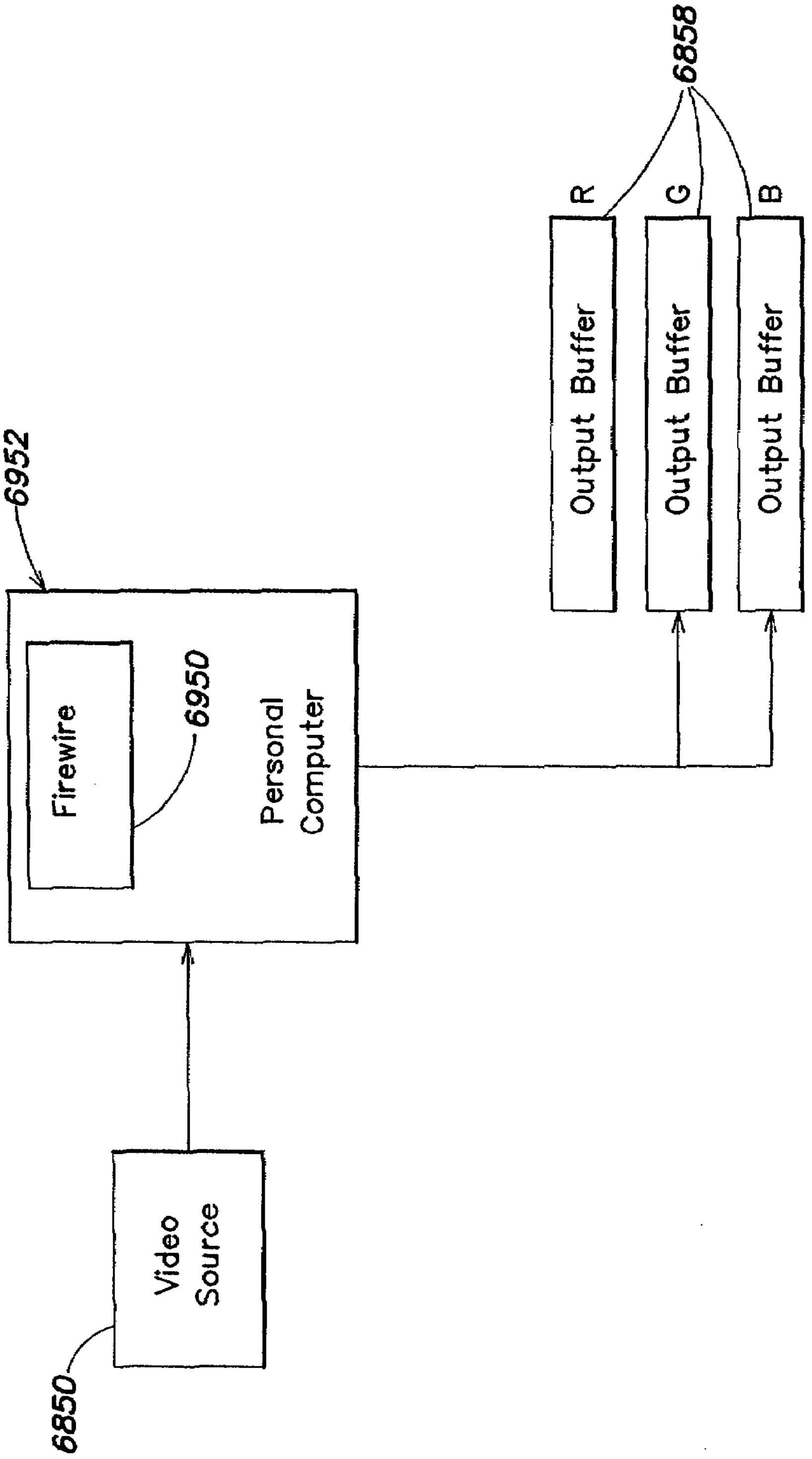
FIG. 69 shows a light system manager including a personal computer configured to receive a high-speed serial data stream.

Various embodiments can be provided that accept video input and produce corresponding lighting control signals. Referring to FIG. 69, in one embodiment, the light system manager 1650 may comprise a personal computer 6952 configured to receive a high-speed serial data stream, such as the stream from the video source 6850. The personal computer 6952 may be equipped, for example, with a Firewire facility 6950, such as a card. The Firewire facility 6950 (which may be any kind of high-speed serial data facility), may output lighting control signals as a series of outgoing signals to a network, such as to output buffers 6858 or to other network facilities, such as Ethernet facilities, as described above. In such an embodiment, data storage is optional and may be absent. In embodiments the personal computer 6952 may be a Unix-type personal computer, such as using the Unix or Linux operating systems.

Figure 70:
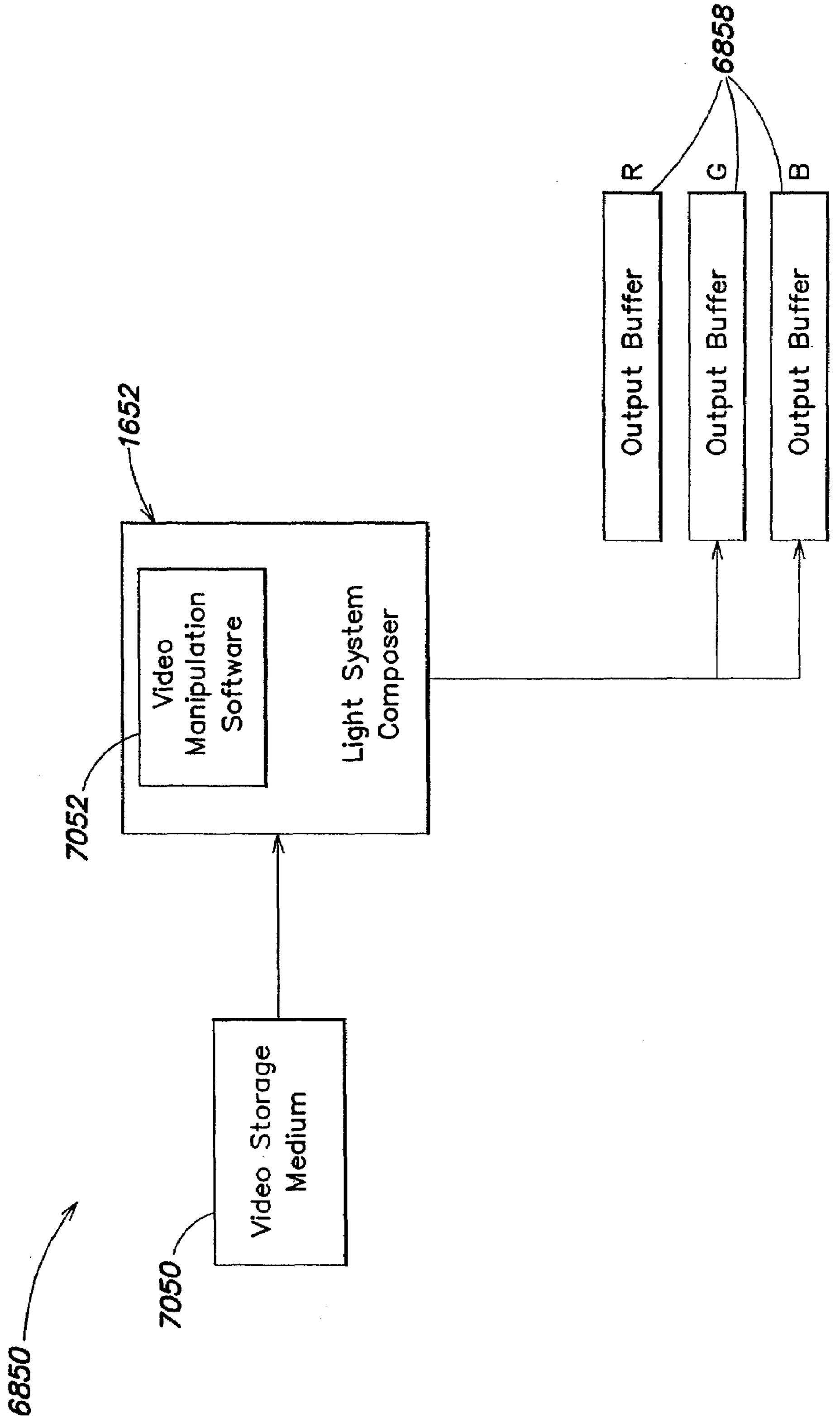
FIG. 70 shows a video source comprising a storage medium.

Referring to FIG. 70, in another embodiment the video source 6850 may comprise a storage medium 7050, such as a disk, cassette, hard disk, DVD, or the like, encoded in a video format, such as Quicktime, MPEG standard, or the like. In such an embodiment, the light system composer 1652 may include real-time video manipulation software 7052, with features such as a scheduling module and one or more triggering modules, such as to schedule and play video segments, such as AppleScript software from Apple Computer of Cupertino, Calif. The scheduling module may be used to schedule and sequence video inputs. Examples of features of the video manipulation software 7052 include timing diagrams, ladder diagrams, Boolean logic, and other features used to play given effects at given times. As in other embodiments, the video input can be mapped, such as by a mapping facility, to lighting control signals, such as to be stored in output buffers 6858. Thus, the user can use conventional video editing software to schedule and manipulate video, edit video, create effects, and the like, and the mapping facility of the light system composer 1652 can map the video output into lighting control signals, such as RGB signals, that are fed to lighting units 100, such as through a series of output buffers 6858. The user can select among multiple video streams, combine streams, create transitions among streams, create cross-fade effects, create dissolving effects, create flyaway effects and use any other effects, such as from stored libraries of effects, all with conventional video manipulation software.

Figure 71:
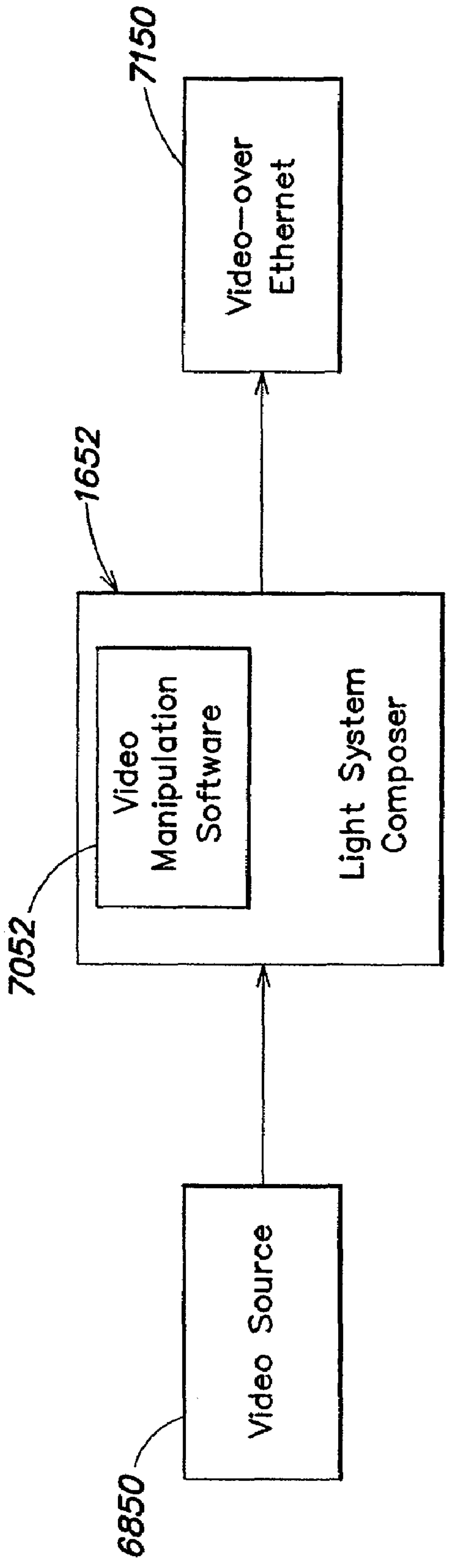
FIG. 71 shows that video manipulation software may be configured to receive input from any type of video source.

Referring to FIG. 71, in embodiments the video manipulation software 7052 may be configured to receive input from any type of video source 6850, such as a stream of video, such as QuickTime-format video. The system can then output video-over-Ethernet signals 7150, such as to one or more power-data systems or other systems that convert the video into lighting control signals. The lighting control signals in various video embodiment can be stored, manipulated and transmitted according to the various embodiments described herein.

While the invention has been described in connection with certain preferred embodiments, other embodiments would be recognized by one of ordinary skill in the art and all such embodiments are encompassed by this disclosure.

The invention claimed is:

1. A method for authoring a lighting show to be generated by a plurality of lighting units, the lighting show including at least one lighting effect, the method comprising acts of:

A) discovering a number of the plurality of lighting units available to generate the lighting show by transmitting at least one query via at least one network communication connection to which the number of the plurality of lighting units are coupled;

B) assigning communication addresses to the discovered number of the plurality of lighting units available to generate the lighting show;

C) displaying a two-dimensional map of points representing a multi-dimensional configuration of the number of the plurality of lighting units available to generate the lighting show, each point in the two-dimensional map representing one lighting unit of the plurality of lighting units;

D) mapping the assigned communication addresses of the number of the plurality of lighting units to respective positions of the points in the two-dimensional map;

E) selecting at least one point of the two-dimensional map to which the at least one lighting effect of the lighting show is applied; and F) selecting the at least one lighting effect for generation by at least one lighting unit corresponding to the at least one point of the two-dimensional map selected in the act E), wherein the at least one lighting effect selected in the act F) is based at least in part on a video from a video source.

2. The method of claim 1, wherein the multi-dimensional configuration includes a two-dimensional configuration of the number of the plurality of lighting units available to generate the lighting show.

3. The method of claim 1, wherein the multi-dimensional configuration includes a three-dimensional configuration of the number of the plurality of lighting units available to generate the lighting show.

4. The method of claim 3, wherein the three-dimensional configuration includes an architectural configuration of the number of the plurality of lighting units disposed in connection with a building.

5. The method of claim 3, wherein the three-dimensional configuration includes a non-rectangular arrangement of the number of the plurality of lighting units wrapped around a non-rectangular object.

6. The method of claim 1, further comprising an act of manipulating a video signal from the video source, wherein the at least one lighting effect selected in the act F) is based on the manipulated video signal.

7. The method of claim 1, wherein the at least one point of the two-dimensional map selected in the act E) includes a plurality of points of the two-dimensional map, wherein the at least one lighting unit includes a plurality of lighting units corresponding to the plurality of points selected in the act E), and wherein the plurality of lighting units substantially reproduce the video when generating the at least one lighting effect.

8. The method of claim 1, wherein the video includes a plurality of frames, wherein each frame of the plurality of frames includes a plurality of pixels in a row-column format, wherein each pixel of the plurality of pixels has RGB pixel values corresponding to a brightness of red, green and blue primary colors of the pixel, and wherein the method further comprises an act of capturing successive frames of the video.

9. The method of claim 8, wherein the at least one point of the two-dimensional map selected in the act E) includes a plurality of points of the two-dimensional map, and wherein the method further comprises an act of mapping the plurality of pixels in the row-column format to the plurality of points of the two-dimensional map in a one-to-one mapping.

10. The method of claim 8, wherein the at least one point of the two-dimensional map selected in the act E) includes a plurality of points of the two-dimensional map, wherein a first quantity of the plurality of pixels is greater than a second quantity of the plurality of points of the two-dimensional map, and wherein the method further comprises an act of mapping a subset of the plurality of pixels to the plurality of points of the two-dimensional map.

11. The method of claim 10, further comprising acts of:

storing the RGB pixel values for a particular pixel of the plurality of pixels in a particular location in memory; and retrieving from the particular location in memory a lighting control signal for a lighting unit corresponding to a point of the plurality of points of the two-dimensional map to which the particular pixel is mapped.

12. The method of claim 10, further comprising acts of:

storing the RGB pixel values for a particular pixel of the plurality of pixels in different memory locations at different times; and retrieving at the different times from a particular same location of the different memory locations a lighting control signal for a lighting unit corresponding to a point of the plurality of points of the two-dimensional map to which the particular pixel is mapped.

13. The method of claim 1, further comprising an act of:

simulating on the two-dimensional map an execution through time of the at least one lighting effect selected in the act F).

14. A light system manager system to facilitate at least authoring of a lighting show to be generated by a plurality of lighting units, the lighting show including at least one lighting effect, the light system manager system comprising:

a mapping facility for discovering a number of the plurality of lighting units available to generate the lighting show by transmitting at least one query via at least one network communication connection to which the number of the plurality of lighting units are coupled, the mapping facility assigning communication addresses to the discovered number of the plurality of lighting units available to generate the lighting show, the mapping facility including:

a first graphical user interface implemented by a computer comprising a display for displaying a two-dimensional map of points representing a multi-dimensional configuration of the number of the plurality of lighting units available to generate the lighting show, each point in the two-dimensional map representing one lighting unit of the plurality of lighting units, wherein the mapping facility maps the assigned communication addresses of the number of the plurality of lighting units to respective positions of the points in the two-dimensional map; and a light system composer for allowing a user to select via the first graphical user interface at least one point of the two-dimensional map to which the at least one lighting effect is applied, the light system composer further including a second graphical user interface for allowing the user to select the at least one lighting effect for generation by at least one lighting unit corresponding to the selected at least one point of the two-dimensional map, wherein the second graphical user interface allows the user to base the at least one lighting effect at least in part on a video from a video source.

15. The system of claim 14, further comprising the plurality of lighting units, wherein the multi-dimensional configuration includes a three-dimensional configuration of the number of the plurality of lighting units available to generate the lighting show.

16. The system of claim 15, wherein the three-dimensional configuration includes an architectural configuration of the number of the plurality of lighting units disposed in connection with a building.

17. The system of claim 15, wherein the three-dimensional configuration includes a non-rectangular arrangement of the number of the plurality of lighting units wrapped around a non-rectangular object.

18. The system of claim 14, wherein the second graphical user interface allows the user to manipulate a video signal from the video source and base the at least one lighting effect on the manipulated video signal.

19. The system of claim 14, further comprising the plurality of lighting units, wherein the at least one point of the two-dimensional map includes a plurality of points of the two-dimensional map corresponding to selected lighting units of the plurality of lighting units, and wherein the selected lighting units substantially reproduce the video when generating the at least one lighting effect.

20. The system of claim 14, wherein the video includes a plurality of frames, wherein each frame of the plurality of frames includes a plurality of pixels in a row-column format, wherein each pixel of the plurality of pixels has RGB pixel values corresponding to a brightness of red, green and blue primary colors of the pixel, and wherein the light system composer captures successive frames of the video.

21. The system of claim 20, wherein the at least one point of the two-dimensional map includes a plurality of points of the two-dimensional map, and wherein the mapping facility maps the plurality of pixels in the row-column format to the plurality of points of the two-dimensional map in a one-to-one mapping.

22. The system of claim 20, wherein the at least one point of the two-dimensional map includes a plurality of points of the two-dimensional map, wherein a first quantity of the plurality of pixels is greater than a second quantity of the plurality of points of the two-dimensional map, and wherein the mapping facility maps a subset of the plurality of pixels to the plurality of points of the two-dimensional map.

23. The system of claim 22, wherein the light system composer includes a memory, wherein the RGB pixel values for a particular pixel of the plurality of pixels are stored in a particular location in memory, and wherein the light system composer retrieves from the particular location in memory a lighting control signal for a lighting unit corresponding to a point of the plurality of points of the two-dimensional map to which the particular pixel is mapped.

24. The system of claim 22, wherein the light system composer includes a memory, wherein the RGB pixel values for a particular pixel of the plurality of pixels are stored in different memory locations at different times, and wherein the light system composer retrieves at the different times from a particular same location of the different memory locations a lighting control signal for a lighting unit corresponding to a point of the plurality of points of the two-dimensional map to which the particular pixel is mapped.

* * * * *